US009176507B2

(12) United States Patent
Haws

(10) Patent No.: US 9,176,507 B2
(45) Date of Patent: Nov. 3, 2015

(54) HOT WATER RECOVERY

(71) Applicant: Spencer Kim Haws, Richland, WA (US)

(72) Inventor: Spencer Kim Haws, Richland, WA (US)

(*) Notice: Subject to any disclaimer, the term of this patent is extended or adjusted under 35 U.S.C. 154(b) by 361 days.

(21) Appl. No.: 13/864,943

(22) Filed: Apr. 17, 2013

(65) Prior Publication Data

US 2013/0228233 A1    Sep. 5, 2013

Related U.S. Application Data

(63) Continuation-in-part of application No. 13/276,635, filed on Oct. 19, 2011.

(60) Provisional application No. 61/637,173, filed on Apr. 23, 2012, provisional application No. 61/405,359, filed on Oct. 21, 2010.

(51) Int. Cl.
G05D 23/13 (2006.01)
F24D 17/00 (2006.01)
F24D 19/10 (2006.01)
E03B 7/04 (2006.01)

(52) U.S. Cl.
CPC ............ *G05D 23/1306* (2013.01); *E03B 7/045* (2013.01); *F24D 17/00* (2013.01); *F24D 17/0026* (2013.01); *F24D 17/0094* (2013.01); *F24D 19/1051* (2013.01); *Y10T 137/6416* (2015.04); *Y10T 137/6497* (2015.04)

(58) Field of Classification Search
CPC ............ G05D 23/13; G05D 23/1306; G05D 23/1313; F24D 17/00; F24D 17/0094; F24D 19/1051; E03B 7/045; Y10T 137/6497

USPC .................... 137/337; 236/12.1, 12.11, 12.13
See application file for complete search history.

(56) References Cited

U.S. PATENT DOCUMENTS

| | | | |
|---|---|---|---|
| 2,838,073 A | 6/1958 | DiMattia et al. |
| 2,918,090 A | 12/1959 | DeWitt |
| 3,847,307 A | 11/1974 | Hosek |
| 4,181,156 A | 1/1980 | Zahid |
| 4,321,943 A | 3/1982 | Haws |
| 4,450,829 A | 5/1984 | Morita et al. |
| 4,518,007 A | 5/1985 | Haws |
| 4,606,325 A | 8/1986 | Lujan, Jr. |

(Continued)

FOREIGN PATENT DOCUMENTS

FR   2947615 A1   1/2011
WO   2010/103521   9/2010

OTHER PUBLICATIONS

Cuta, F. "Hot Water Saver—Documenting the Correspondence Between Our Two Calculations of Energy Savings", Battelle Study Final Report, Apr. 22, 1985, 5 pages.

(Continued)

*Primary Examiner* — Marc Norman
(74) *Attorney, Agent, or Firm* — Paul W. Mitchell; Remembrance Newcombe; Rainier Patents, P.S.

(57) ABSTRACT

The concepts relate to reducing energy loss associated with hot water systems. One example is manifest as a selective hot water isolation device that is configured to be connected in fluid flowing relation with a first water line and a second water line and where the selective hot water isolation device is configured to control water cross-over from the second water line into the first water line based upon water flow through the first water line.

4 Claims, 58 Drawing Sheets

(56) References Cited

U.S. PATENT DOCUMENTS

| | | |
|---|---|---|
| 4,628,902 A | 12/1986 | Comber |
| 4,672,990 A | 6/1987 | Robillard |
| 4,697,614 A | 10/1987 | Powers |
| 4,798,224 A | 1/1989 | Haws |
| 4,930,551 A | 6/1990 | Haws |
| 4,945,942 A | 8/1990 | Lund |
| 5,042,524 A | 8/1991 | Lund |
| 5,205,318 A | 4/1993 | Massaro et al. |
| 5,261,443 A | 11/1993 | Walsh |
| 5,277,219 A | 1/1994 | Lund |
| 5,347,956 A | 9/1994 | Hughes |
| 5,351,712 A | 10/1994 | Houlihan |
| 5,385,168 A | 1/1995 | Lund |
| 5,452,740 A | 9/1995 | Bowman |
| 5,584,316 A | 12/1996 | Lund |
| 5,586,572 A | 12/1996 | Lund |
| 5,606,996 A | 3/1997 | Sugimura |
| 5,775,372 A | 7/1998 | Houlihan |
| 5,799,827 A | 9/1998 | D'Andrade |
| 5,806,511 A | 9/1998 | Hart |
| 5,819,785 A | 10/1998 | Bardini |
| 5,829,475 A | 11/1998 | Acker |
| 5,860,452 A | 1/1999 | Ellis |
| 5,887,616 A | 3/1999 | Ikeda et al. |
| 6,039,067 A | 3/2000 | Houlihan |
| 6,347,748 B1 | 2/2002 | Lyons |
| 6,418,969 B1 | 7/2002 | Bertagna |
| 6,536,464 B1 | 3/2003 | Lum et al. |
| 6,588,377 B1 | 7/2003 | Fuller et al. |
| 6,745,723 B1 | 6/2004 | Hicks et al. |
| 6,920,844 B1 | 7/2005 | Ismert |
| 6,935,357 B2 * | 8/2005 | Taylor et al. .................. 137/110 |
| 6,962,162 B2 | 11/2005 | Acker |
| 7,073,528 B2 | 7/2006 | Kempf et al. |
| 7,077,155 B2 | 7/2006 | Giammaria |
| 7,140,382 B2 | 11/2006 | Kempf et al. |
| 7,198,059 B2 | 4/2007 | Kempf |
| 7,287,707 B2 | 10/2007 | Kempf |
| 7,475,703 B2 | 1/2009 | Kempf |
| 7,487,923 B2 | 2/2009 | Willsford et al. |
| 7,648,078 B2 | 1/2010 | Kempf |
| 7,690,395 B2 | 4/2010 | Jonte et al. |
| 7,740,182 B2 | 6/2010 | Lum |
| 7,779,857 B2 | 8/2010 | Acker |
| 2003/0032854 A1 | 2/2003 | Palmer |
| 2005/0034774 A1 | 2/2005 | Lombari et al. |
| 2006/0022062 A1 | 2/2006 | Morris |
| 2006/0144455 A1 | 7/2006 | Meyers et al. |
| 2007/0114297 A1 | 5/2007 | Burningham |
| 2008/0035303 A1 | 2/2008 | Fuller |
| 2008/0230126 A1 | 9/2008 | Acker |
| 2008/0272116 A1 | 11/2008 | Martucci et al. |
| 2011/0139269 A1 | 6/2011 | Rogers |
| 2012/0097746 A1 | 4/2012 | Haws |
| 2012/0118414 A1 | 5/2012 | McMurtry |
| 2013/0327790 A1 | 12/2013 | Ryan |

OTHER PUBLICATIONS

Skumatz, L. et al., "Assessment of Savings and Operating Characteristics of the Hot Water Saver: Residential Test Analysis", Battelle Study, Dec. 31, 1983, 48 pages.

Notice of Incomplete Reply mailed Dec. 1, 2011 from U.S. Appl. No. 13/276,635, 2 pages.

Response to Notice of Incomplete Reply filed Dec. 5, 2011 from U.S. Appl. No. 13/276,635, 4 pages.

Requirement for Restriction/Election mailed Jun. 3, 2014 from U.S. Appl. No. 13/276,635, 6 pages.

Response filed Jul. 10, 2014 to Restriction/Election mailed Jun. 3, 2014 from U.S. Appl. No. 13/276,635, 9 pages.

Non-Final Office Action mailed Aug. 13, 2014 from U.S. Appl. No. 13/276,635, 7 pages.

Response filed Nov. 12, 2014 from U.S. Appl. No. 13/276,635, 8 pages.

Non-Final Office Action mailed Dec. 29, 2014 from U.S. Appl. No. 13/276,635, 6 pages.

Applicant Initiated Interview Summary mailed Feb. 11, 2015 from U.S. Appl. No. 13/276,635, 3 pages.

Response filed Mar. 17, 2015 from U.S. Appl. No. 13/276,635, 9 pages.

Final Office Action mailed Apr. 28, 2015 from U.S. Appl. No. 13/276,635, 10 pages.

Response filed Jul. 23, 2015 from U.S. Appl. No. 13/276,635, 11 pages.

International Search Report and Written Opinion dated Mar. 5, 2013 from PCT Patent Application No. PCT/US2011/056896, 18 pages.

International Preliminary Report on Patentability dated Apr. 23, 2013 and transmitted May 2, 2013 from PCT Patent Application No. PCT/US2011/056896, 11 pages.

Notice of Division of Application mailed Jun. 1, 2015 from Chinese Patent Application No. 201180043700.3, 2 pages.

Requirement for Restriction/Election mailed Jun. 11, 2015 from U.S. Appl. No. 13/912,078, 7 pages.

Response filed Jul. 16, 2015 to Restriction Requirement mailed Jun. 11, 2015 from U.S. Appl. No. 13/912,078, 7 pages.

U.S. Appl. No. 61/384,206, filed Sep. 17, 2010, entitled "Automatic Hot Water Recovery Apparatus,", 10 pages.

U.S. Appl. No. 61/405,359, filed Oct. 21, 2010, entitled "Hot Water Recovery", 31 pages.

Utility U.S. Appl. No. 13/912,078, filed Jun. 6, 2013, entitled "Hot Water Recovery Apparatus", 56 pages.

Non-Final Office Action mailed Aug. 5, 2015 from U.S. Appl. No. 13/276,635, 7 pages.

Non-Final Office Action mailed Aug. 3, 2015 from U.S. Appl. No. 13/912,078, 10 pages.

* cited by examiner

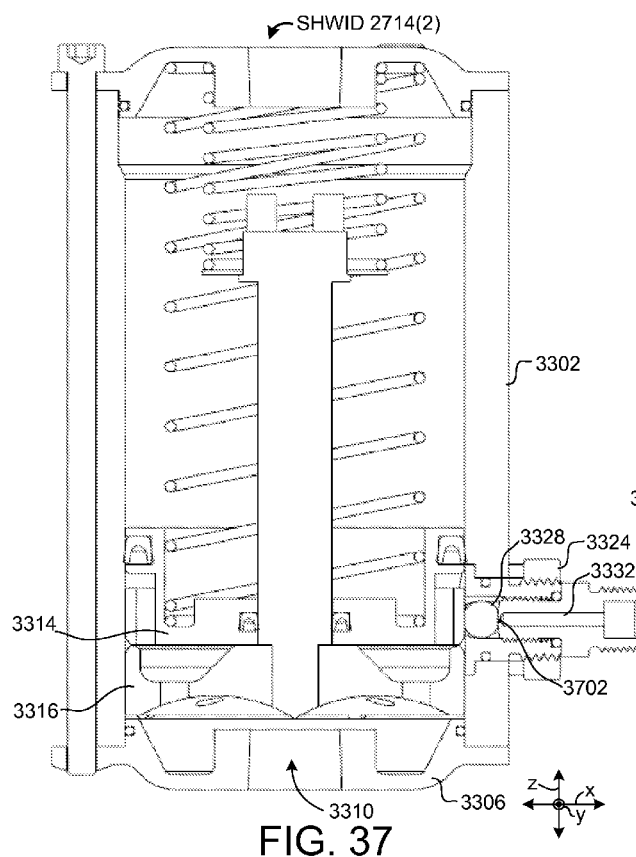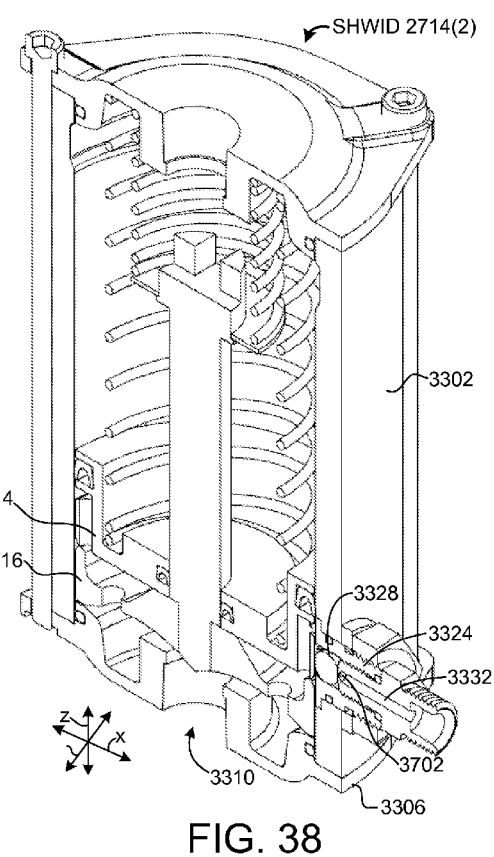
FIG. 37
FIG. 38

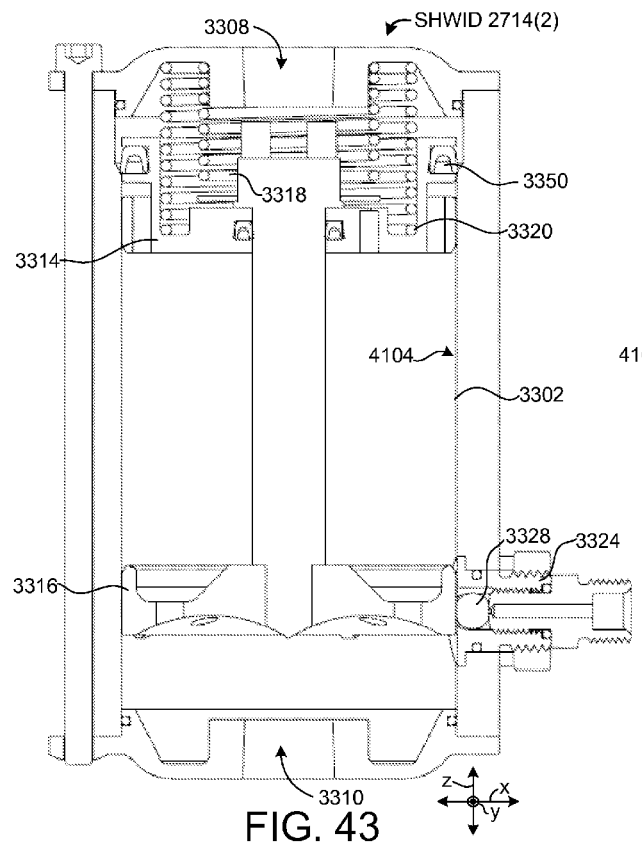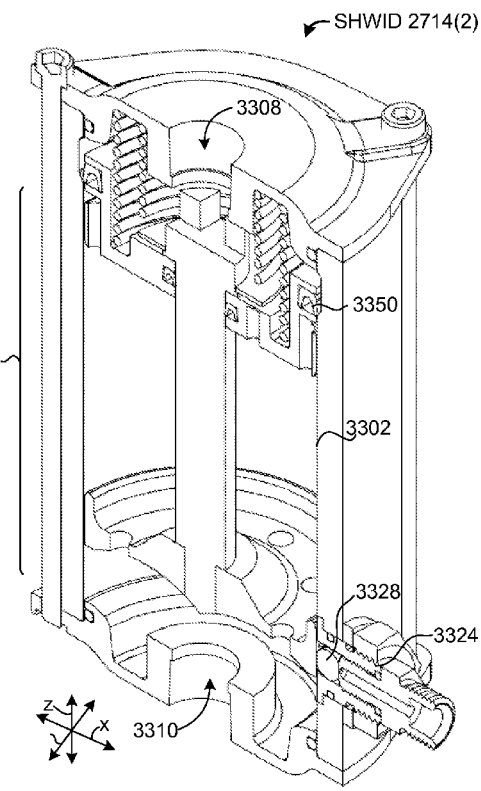
FIG. 43
FIG. 44

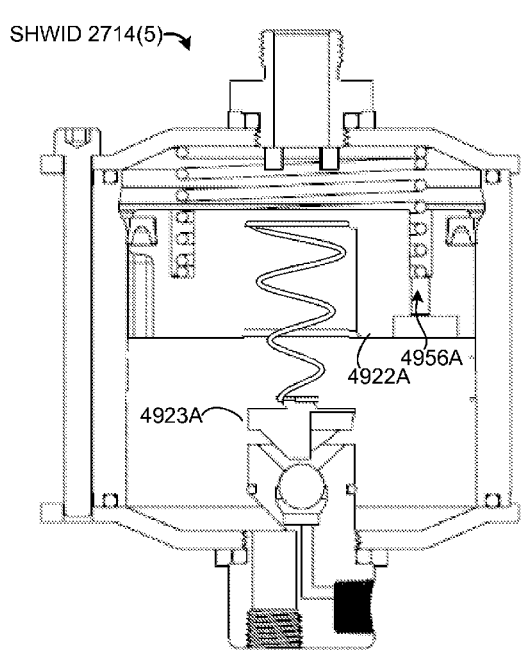
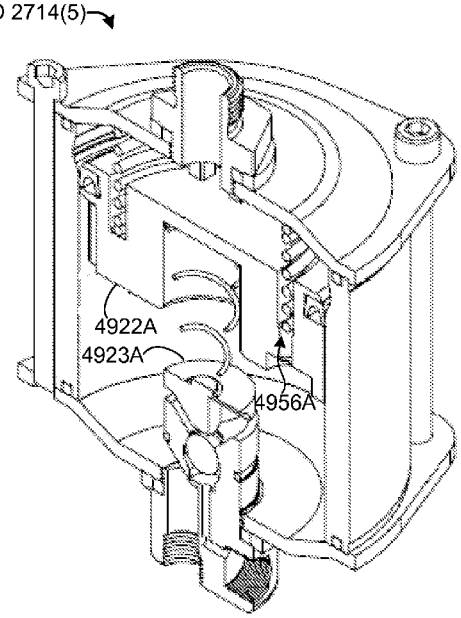
FIG. 81
FIG. 82

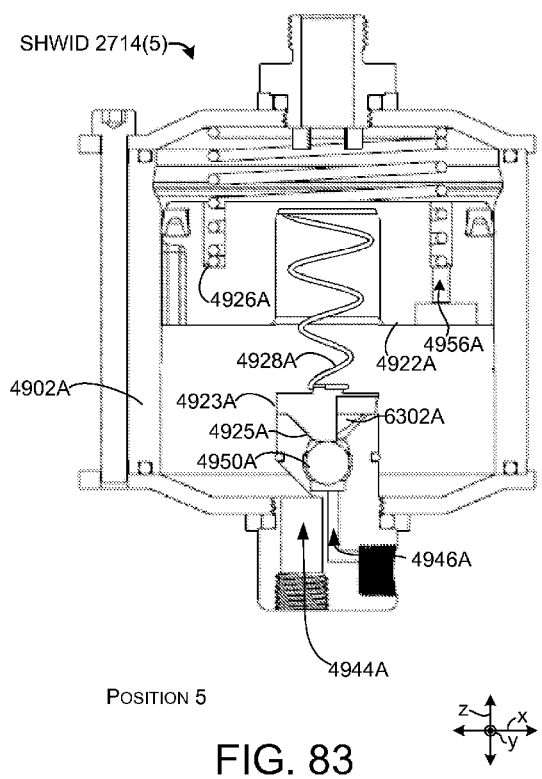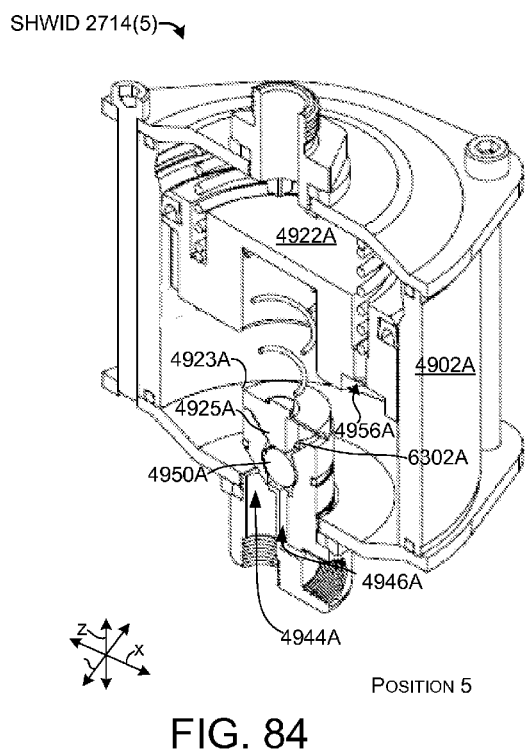
FIG. 83
FIG. 84

HOT WATER RECOVERY

PRIORITY

This utility application is a Continuation-In-Part of, and claims priority from, U.S. Utility application Ser. No. 13/276,635 filed on 2011-10-19 and Provisional Application No. 61/405,359 filed on 2010-10-21, which are incorporated by reference in their entirety. This application is also a non-provisional of, and claims priority from, U.S. Provisional Application No. 61/637,173 filed on 2012-04-23, which is also incorporated by reference in its entirety.

FIELD OF THE INVENTION

The patent relates to energy savings, especially energy savings associated with hot water and hot water heaters.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings.

FIGS. 28-33, 37, 39, 41, 43, 45, 47, 49, 53, 54, 56, 58, 60, 61, 63, 65, 67, 68, 72, 73, 75, 76, 78, 79, 81, 83, 85, and 86 show sectional views of selective hot water isolation devices in accordance with some implementations.

FIGS. 34, 38, 40, 42, 44, 46, 48, 50, 55, 57, 59, 62, 64, 66, 69, 74, 77, 80, 82, 84, and 87 show cut-away perspective views of selective hot water isolation devices in accordance with some implementations.

DETAILED DESCRIPTION

Overview

Figure 1:
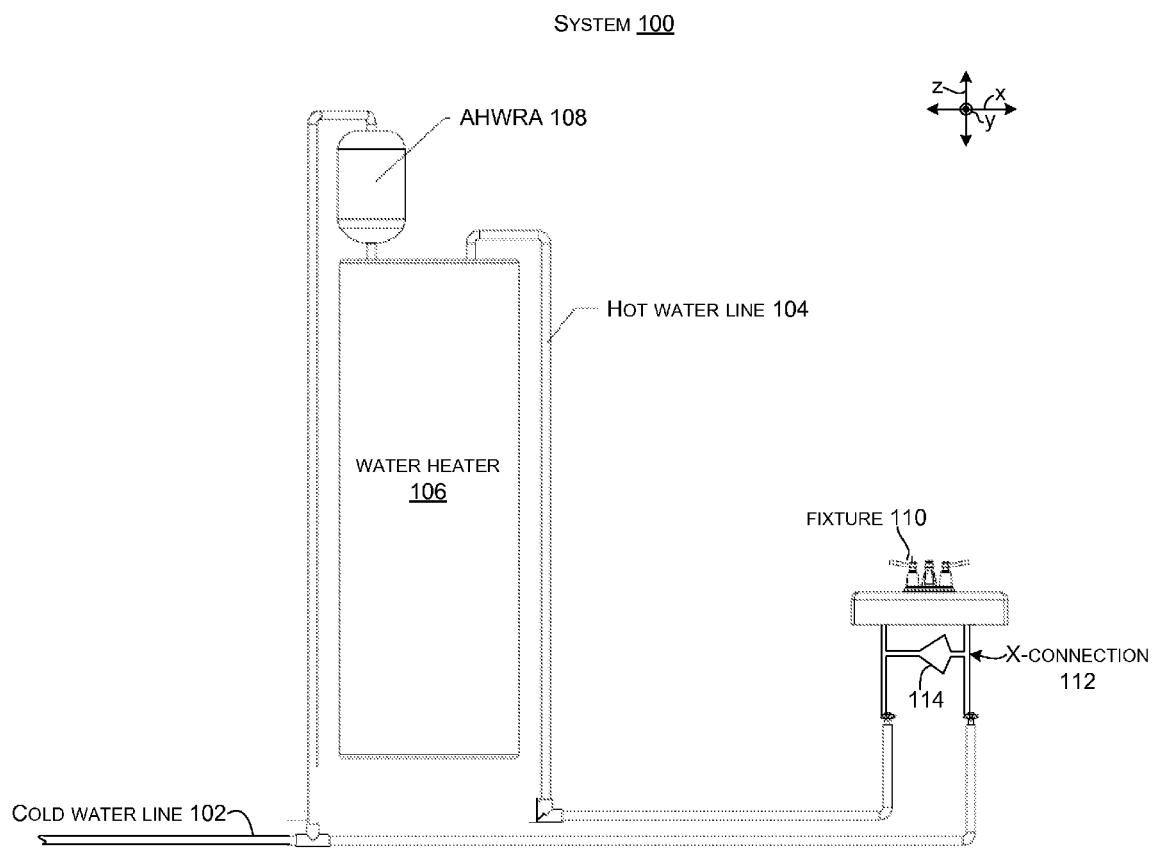
FIGS. 1 and 27 show systems in which the present hot water recovery concepts can be applied in accordance with some implementations.

The present description relates to saving energy by recovering hot water so that energy in the hot water is not lost to the environment. One aspect of this energy savings is an automatic hot water recovery apparatus. Another aspect is a selective hot water isolation device.

In one scenario, the automatic hot water recovery apparatus can be installed in a water system to reduce energy consumption. The water system can include an unheated supply (cold water). Some of the cold water can be supplied to a 'hot water tank' or 'water heater'. An end use device or fixture, such as a faucet, can be supplied with a hot water line from the water heater and a cold water line from the unheated supply. A one way cross-over device can be installed proximate to the end use device so that in some circumstances water can flow from the cold water line to the hot water line, but not vice versa.

The automatic hot water recovery apparatus can be integrated into the water supply system proximate to the water heater. The automatic hot water recovery apparatus can receive cold water at a cold water inlet port from the supply and emit water at an outlet port for receipt by the water heater. The automatic hot water recovery apparatus can decrease energy use by reducing energy loss from hot water that is 'stranded' between the hot water heater and the end use device or fixture. Stated another way, after a user runs the hot water at the fixture, the automatic hot water recovery apparatus can cause hot water in the hot water line to be drawn back into the hot water heater and thereby reduce heat loss.

In one implementation, under a first set of conditions, such as when a user opens the hot and cold taps on the fixture, an elastomeric bladder of the automatic hot water recovery apparatus is stretched from a first configuration to a second configuration by water movement from the water inlet towards the water outlet. Under a second set of conditions, such as when the user closes the taps, the elastic or resilient nature of the elastomeric bladder to return to its original first configuration can reverse the flow and draw water back into the automatic hot water recovery apparatus from the outlet port. This action can in turn draw hot water from the hot water pipe back into the water heater.

Another aspect of the discussion relates to novel one way cross-over devices termed 'selective hot water isolation devices'. As mentioned above, hot water recovery systems can connect hot and cold water lines at a distant point of use from the water heater using a one way cross-over device. As hot water is used, cold water flows through this cross-over connection into the hot water pipe, slowly filling it with cold water as the stranded hot water is drawn back into the water heater.

The amount of energy that these systems can recover is considerable. However, existing systems have some limitations. First, when only hot water is being drawn, cold water is able to flow into the hot water line, slightly compromising the temperature of the hot water. The temperature is reduced not only at the fixture where the crossover is located but at all of the hot water fixtures in the system. This occurrence can have an especially deleterious effect on automatic dishwashers and/or automatic clothes washing machines that rely on high water temperatures to clean effectively. Secondly, the existing systems can only recover the stranded hot water in one pipe. For example, in nearly all existing systems the hot water line has a tee (or "T") near the water heater, sending hot water to different parts of the system. Suppose the kitchen is 30 feet in one direction and a bathroom is 25 feet in another direction and another bathroom or laundry room is some distance in yet another direction. The existing recovery systems can only return the stranded hot water sent to one of those outlets.

The present hot water recovery concepts can reduce and/or eliminate inadvertent cold water cross-over through the use of the selective hot water isolation devices. These hot water recovery concepts can also be applied to end use devices (e.g. fixtures) in a system such that the cold water cross-over can occur relative to an individual fixture through which hot water (or mixed hot and cold water) is actually flowing (or has recently flowed). So for example, where a system includes multiple fixtures, when a user uses a particular fixture, cold water cross-over can occur proximate to that fixture to recover hot water in pipes supplying that fixture while cold water cross-over connections at the unused fixtures can be reduced or avoided. Alternatively or additionally, cold water cross-over may be reduced or eliminated during the actual use so that a higher hot water temperature is maintained. In such a case, cold water cross-over may be delayed until hot water flow stops and/or until a period of time after hot water flow stops.

First System Example

FIG. 1 shows a system 100 to which the present hot water recovery concepts can be applied. Of course, system 100 is provided for purposes of explanation and the present concepts can be applied to other systems, such as system 2700 discussed below relative to FIG. 27. System 100 includes a cold water line 102, a hot water line 104, water heater 106, and an automatic hot water recovery apparatus (AHWRA) 108. The AHWRA is positioned in fluid flowing relation to the cold water line 102 proximate to water heater 106.

System 100 also includes end use device or fixture 110. In this case, fixture 110 is manifest as a faucet, but other types of fixtures, such as dish washers and/or clothes washers can be employed. From one perspective a fixture can be thought of as any device that offers the ability to control the flow of hot and cold water. In this case, a cold water cross-over connection (x-connection) 112 is provided proximate fixture 110. The cold water cross-over connection 112 can function to allow cold water to flow to the hot water line, but block water from the hot water line flowing to the cold water line. For instance, the cold water cross-over connection 112 can employ a one-way valve 114 to control the water flow. Scenarios in which cold water could flow from the cold water line 102 to the hot water line 104 are described below.

Automatic Hot Water Recovery Apparatus Examples

FIGS. 2-7 collectively illustrate a first elastomeric automatic hot water recovery apparatus 108(1). FIGS. 8-13 collectively illustrate a second automatic hot water recovery apparatus 108(2). FIGS. 14-20 collectively illustrate a third automatic hot water recovery apparatus 108(3). FIGS. 21-26 collectively illustrate a fourth automatic hot water recovery apparatus 108(4).

FIGS. 2-7 collectively show automatic hot water recovery apparatus 108(1). In this example, the automatic hot water recovery apparatus includes a vessel 202 that defines a cold water inlet port 204 and a water outlet port 206. The vessel 202 is surrounded by insulation 208 as feasible. The automatic hot water recovery apparatus also includes a bladder 210, a guide tube 212, a piston 214, and a spring 216. The bladder can be elastomeric in nature to aid the operation of the automatic hot water recovery apparatus as will be described below.

The guide tube 212 has upper guide tube holes 218, flow slots 220, and lower guide tube holes 222 formed therein. The piston 214 and the spring 216 are positioned around the guide tube 212. An upper seal 224 is fitted to an upper portion of the piston 214. A lower seal 226 is positioned on the guide tube 212. The piston can slide along the guide tube 212 during operation of the automatic hot water recovery apparatus 108(1) as will be explained below. A portion of the piston can define a piston cavity 228 between the piston and the guide tube 212. A bleed hole 230 is positioned through a lower portion of the guide tube. Also, an upper terminus or end 232 of the bladder is secured to the guide tube 212 and a lower terminus or end 234 of the bladder is secured to the piston. In this case, the upper end 232 is bulbous and is received in a corresponding annular cavity 236 of the guide tube. Similarly, the lower end 234 is a bulbous portion that is received in a corresponding cavity 238 of the piston.

Figure 2:
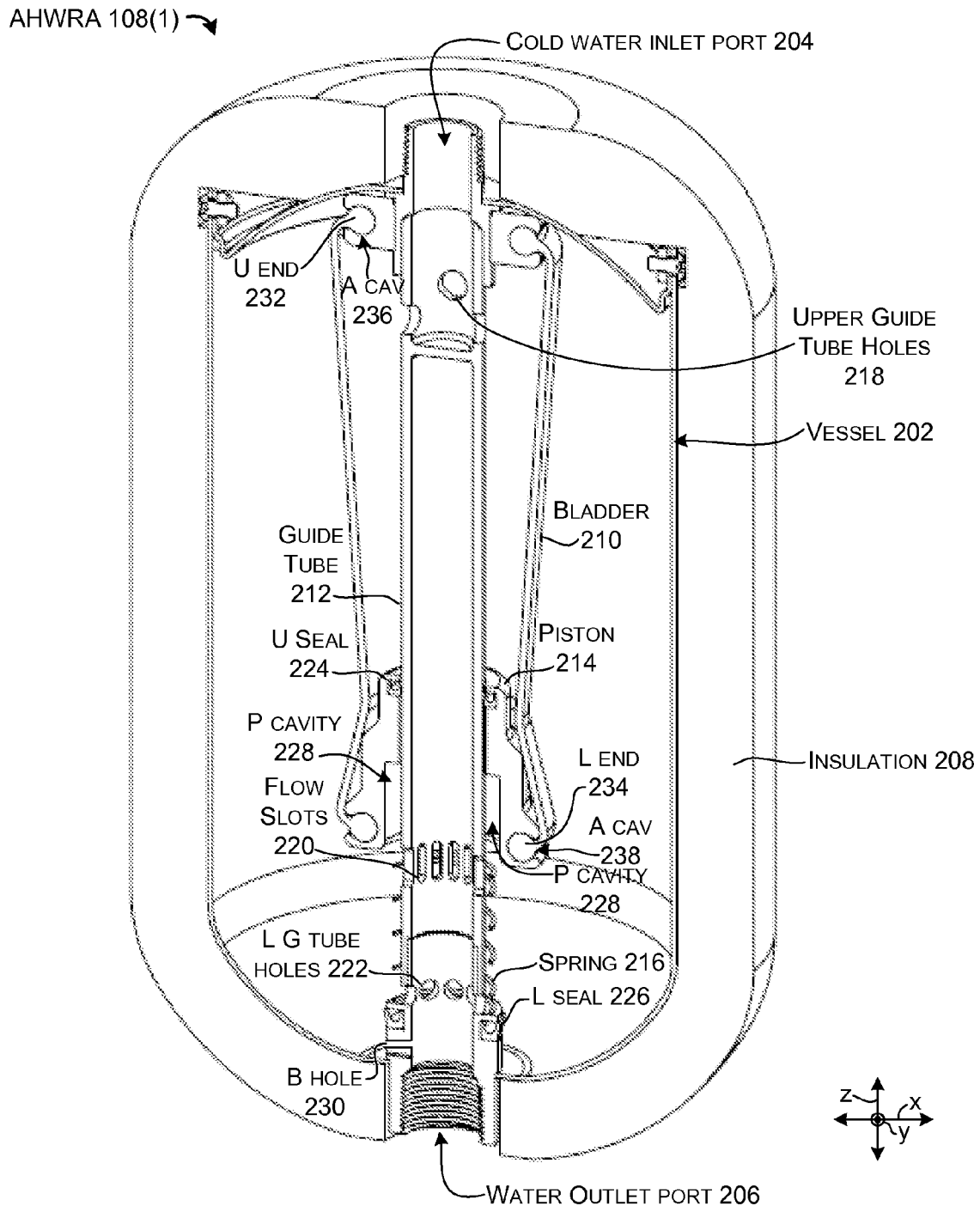
FIGS. 2-26 show sectional views of automatic hot water recovery apparatuses in accordance with some implementations.

In operation, FIG. 2 can be thought of as a steady state or rest position where hot water has not been used recently. At this point, water pressure at the cold water inlet port 204 and the water outlet port 206 is generally equal and no water is flowing through the automatic hot water recovery apparatus 108(1). The bladder 210 can be characterized as being in a resting or non-stretched configuration. The bladder can be stretched from this configuration but has a resilient bias to return to this configuration.

Figure 3:
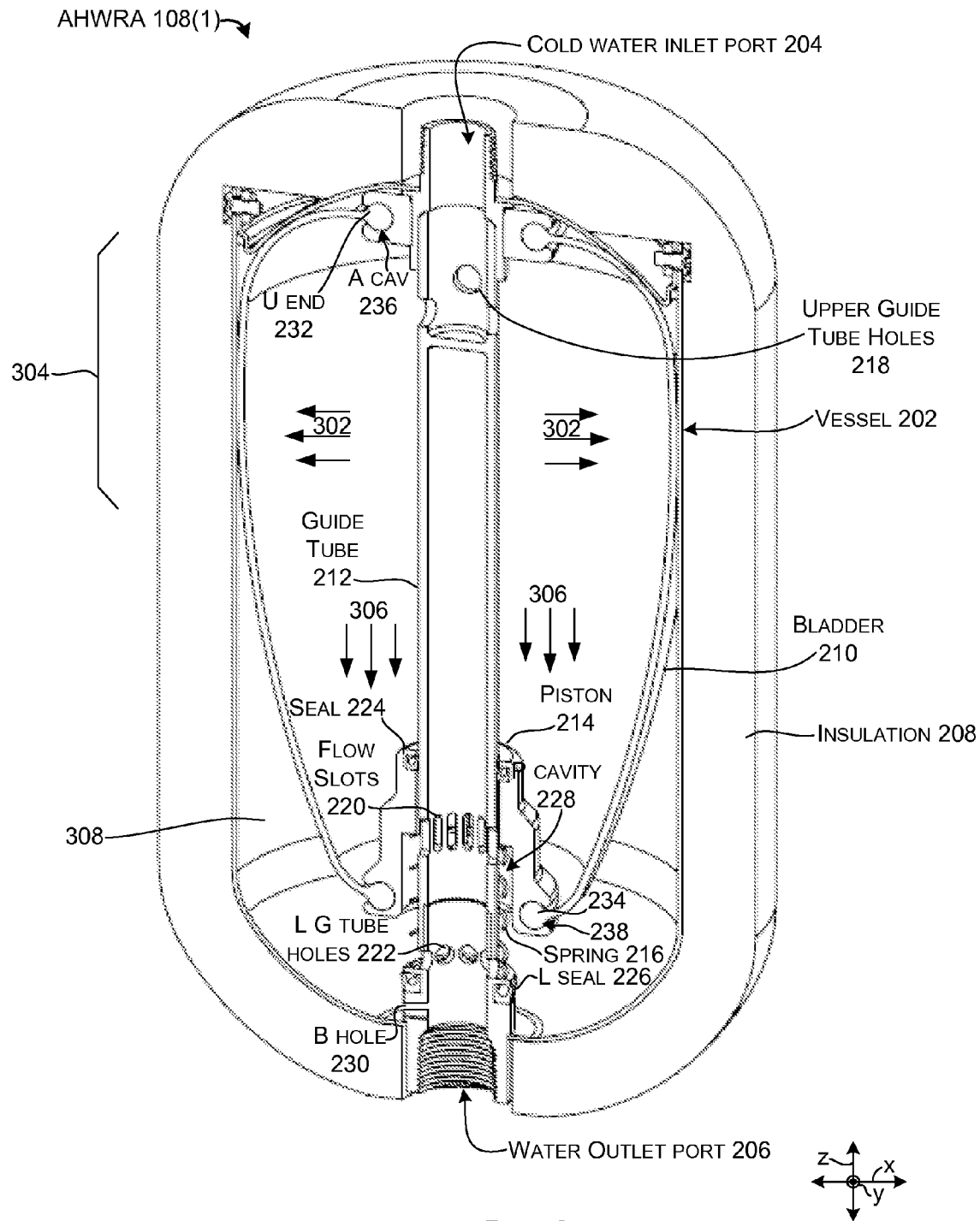

In FIG. 3, the hot water is turned on (such as at fixture 110 of FIG. 1). In such a case, water pressure drops at the water outlet port 206. This allows water to flow in through the cold water inlet port 204 through the upper guide tube holes 218 into bladder 210. The incoming water starts to fill the bladder which causes the bladder to stretch as the resilient bias of the bladder is overcome by the difference in water pressure between the inside and outside of the bladder.

In some cases, the AHWRA 108(1) can be configured to cause the bladder 210 to expand in a specific manner. In this case, spring 216 can create more resistance to vertical expansion/movement (parallel to the z-reference axis) and thereby promote horizontal expansion of the bladder (parallel to the x and y-reference axes) as represented by arrows 302. Stated another way, the automatic hot water recovery apparatus can be configured to promote expansion of the bladder orthogonal to a length of the guide tube 212 before the bladder expands along the length of the guide tube. In either case, as an upper region 304 of the bladder expands horizontally and contacts the vessel 202, further expansion is prevented and vertical expansion occurs. This vertical expansion moves the piston 214 downward along the guide tube 212 toward the water outlet port 206 as indicated by arrows 306. As the bladder 210 expands, water that is within the vessel 202 but outside the bladder (e.g., in space 308) flows through the lower guide tube holes 222, into the guide tube 212, and out the water outlet port 206 toward the water heater (FIG. 1).

Figure 4:
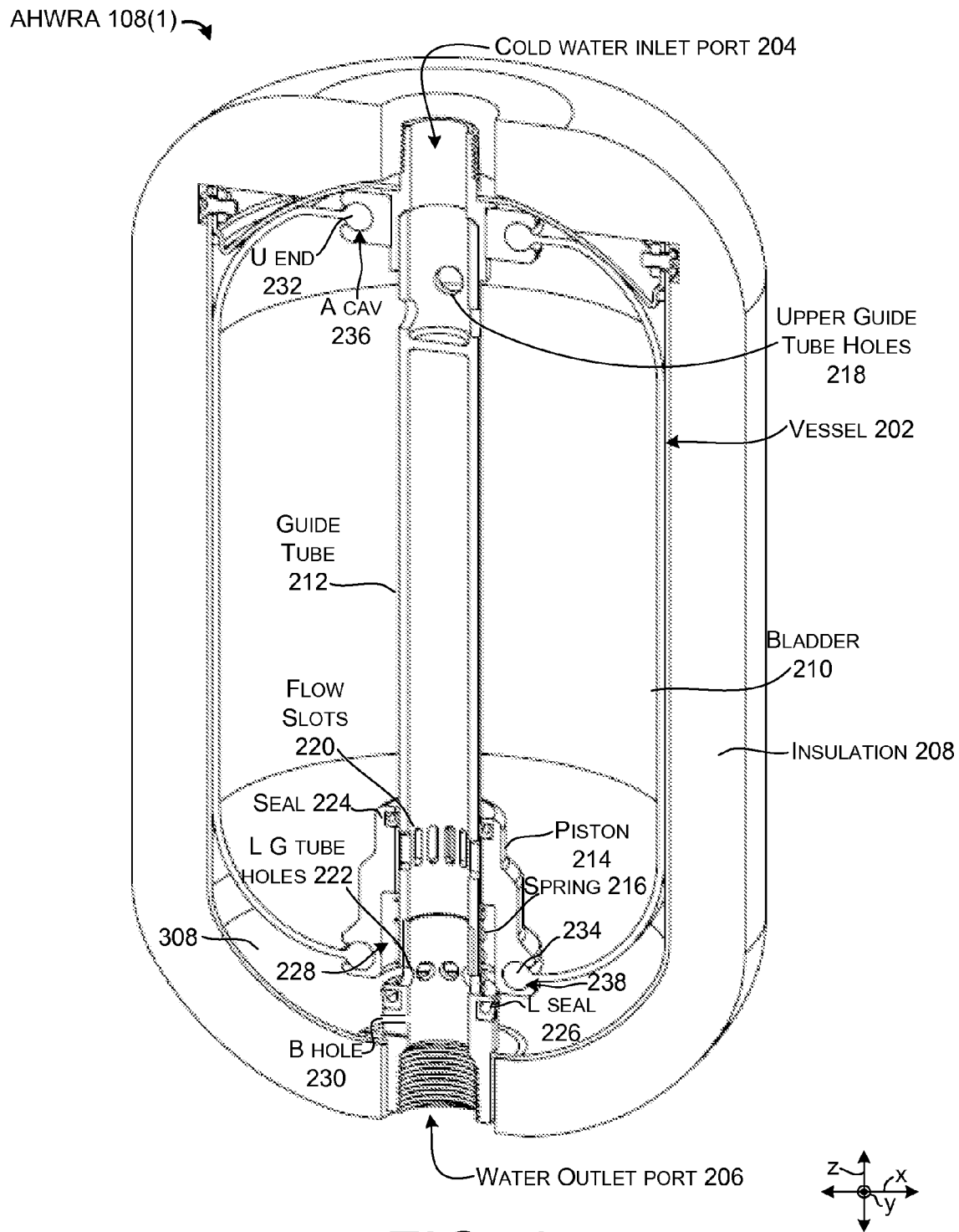

FIG. 4 shows bladder 210 expanding due to water pressure from the water entering the bladder from the cold water inlet port 204. At this point the bladder is stretching vertically and has partially compressed spring 216.

Figure 5:
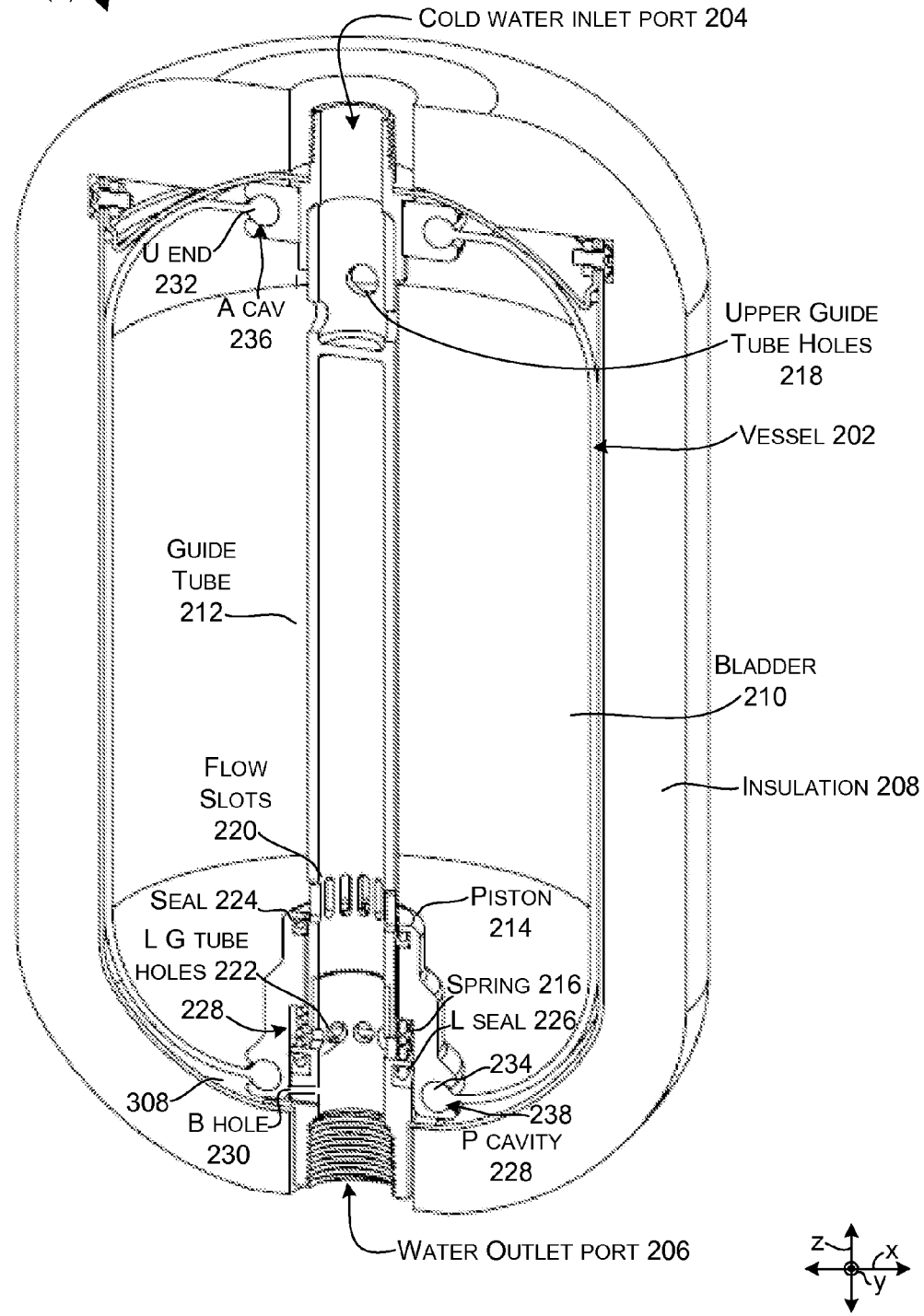

FIG. 5 shows bladder 210 expanded by water until the bladder generally conforms to the inside of the vessel 202. At this point, the flow slots 220 are exposed to the inside of the bladder since the upper seal 224 is now below the flow slots. Further, spring 216 that provided resistance to the downward movement of the piston 214 (and hence the bladder) is compressed. Accordingly, water that flows into the bladder from the cold water inlet port 204 can pass through the flow slots 220 into the guide tube 212 and out the water outlet port 206. At this point, the space outside the bladder but within the vessel is isolated when the lower seal 226 contacts the piston cavity 228. The piston and the bladder remain in this position as the water freely flows through the unit from the cold water inlet port 204 and out the water outlet port 206. Thus, the bladder 210 generally conforms to the volume defined by the vessel 202 while the water flows through the bladder. Note also, that in this implementation water flow through the bladder does not occur until the bladder is stretched to generally conform to the volume defined by the inside of the vessel 202.

Figure 6:
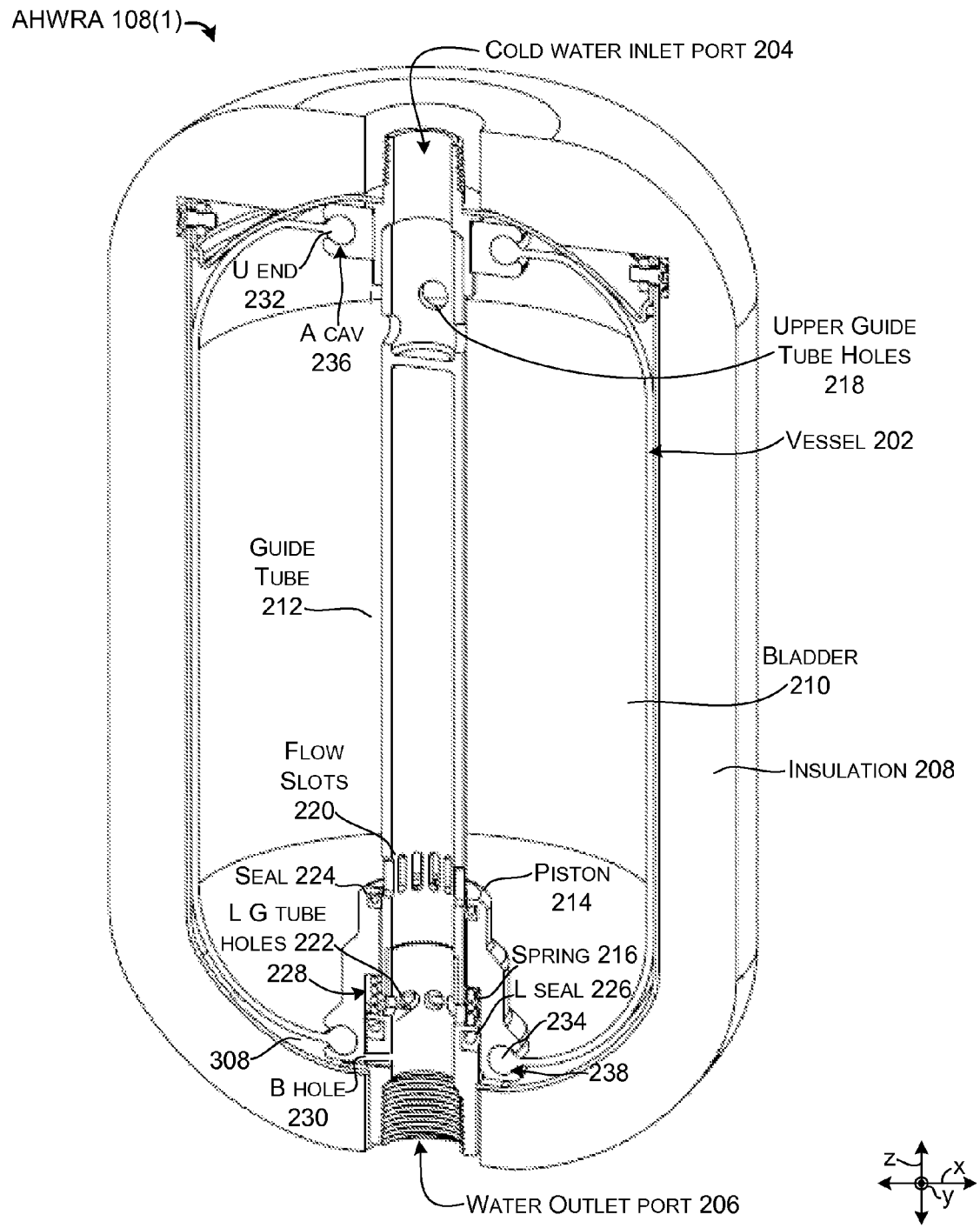

FIG. 6 shows the automatic hot water recovery apparatus 108(1) when the hot water is turned off and hot water flow stops. At this point, the pressure in the cold water inlet port 204 and the water outlet port 206 equalize. This implementation can delay drawing water backwards (e.g. from the water outlet port 206 toward the cold water inlet port 204) so that hot water remains readily available to the user. For instance, the user may be running the hot water intermittently as he shaves and brushes his teeth. In this implementation, the delay feature is provided by the fact that the bladder 210 is prevented from collapsing because the space 308 outside of the bladder is isolated except for the bleed hole 230. The rate of collapse can be controlled by the small flow through the bleed hole. In summary, this feature allows hot water to be (immediately) available to the user for a short period of time after each hot water draw.

Figure 7:
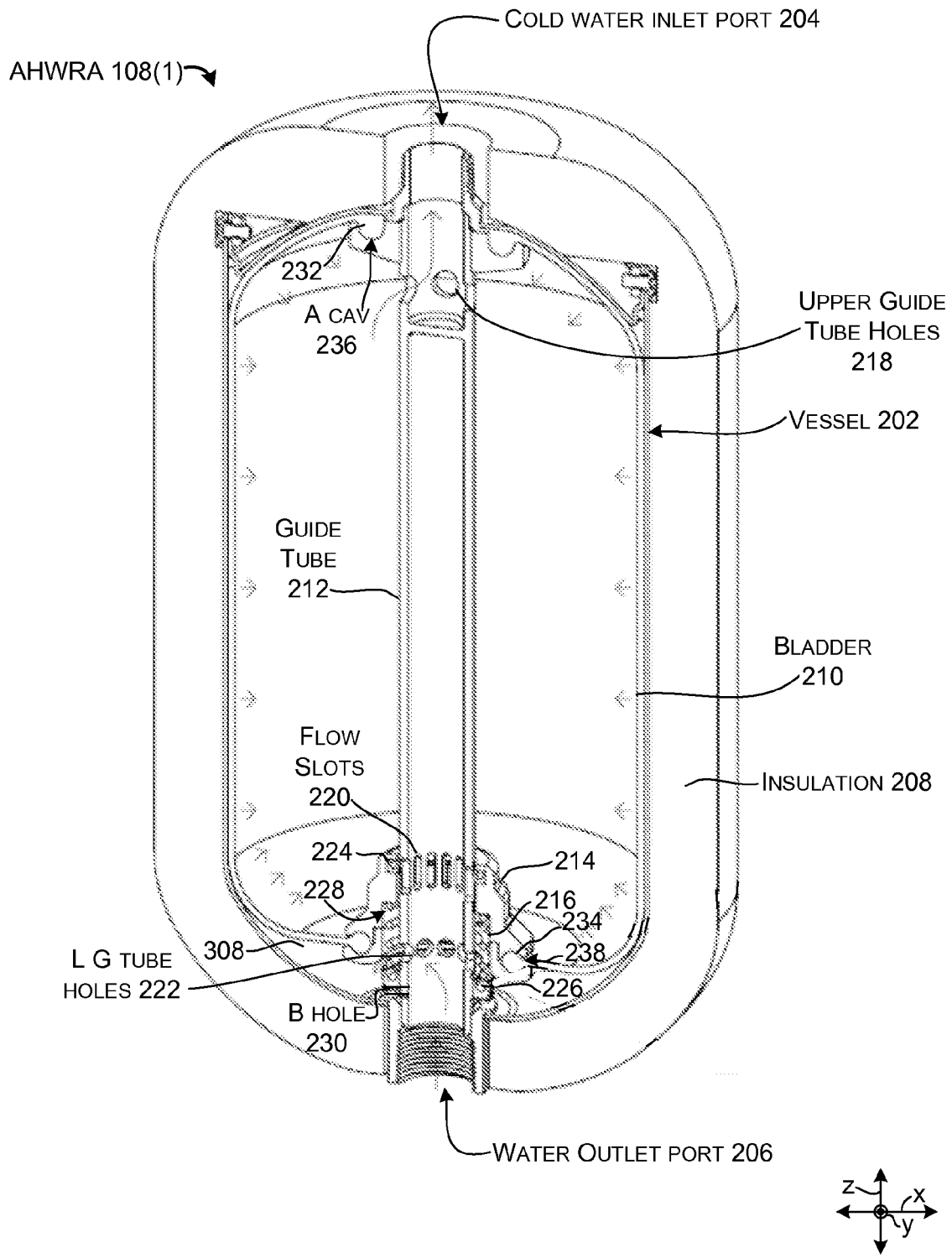

As seen in FIG. 7, when the lower seal 226 loses contact with the piston cavity 228, water is able to flow through the lower guide tube holes 222 into the space 308 outside the bladder 210 (e.g., between the bladder and the vessel 202). As the bladder collapses (due to its resilient bias), the flow in the pipes reverses and water is pulled into the outlet port 206 while water in the bladder is forced out the cold water inlet port 204. This action can pull heated water back into the water heater from the hot water line extending from the hot water heater to the fixture. This scenario leverages the cross-over connection 112 introduced above relative to FIG. 1. As the AHWRA 108(1) draws water back along the hot water line and back into the water heater, the pressure in the hot water line is lower than pressure in the cold water line. The cross-over connection 112 allows cold water to flow from the cold water line into the hot water line to replace the volume of water that is drawn back by the AHWRA. The energy contained in the heated water that is drawn back into the water heater would otherwise be lost as this water cooled in the hot water line. Of course, some heat loss can occur from the water heater, but the water heater has less relative surface area and tends to be better insulated than the hot water pipes.

FIGS. 8-13 collectively illustrate another automatic hot water recovery apparatus 108(2). In this example, the automatic hot water recovery apparatus includes a vessel 802 that defines a cold water inlet port 804 and a water outlet port 806. The vessel 802 is surrounded by insulation 808 as feasible. In this case the vessel 802 includes an elongate portion 810 and first and second end caps 812 and 814. The end caps and the elongate portion can be threaded or otherwise be securable to one another, either in a fixed or removable fashion.

The automatic hot water recovery apparatus 108(2) can also include a bladder 816, a guide tube 818, and a piston 820. The guide tube has guide tube holes 822, flow slots 824, and a bleed hole 826 formed therein. Further, note that the guide tube 818 has a partition 828 that blocks fluid flow through the guide tube. The guide tube holes 822 are positioned above the partition 828 and the flow slots 824 are positioned below the partition. Thus, the guide tube holes 822 are in fluid flowing relation with the cold water inlet port 804 and the flow slots 824 are in fluid flowing relation with the water outlet port 806.

The bladder 816 and piston 820 are positioned around the guide tube 818. An upper end 830 of the bladder is secured to first end cap 812 with a nut 832 that is threaded (or otherwise secured to) the cold water inlet port 804 to trap the upper end 830 between the first end cap 812 and the nut 832. A lower end 834 of the bladder is secured to the piston 820. In this case, the lower end 834 of the bladder is stretched around the piston and fitted into a recess 836 on the piston. The elastic nature of the bladder tends to seal around the recess and hold the lower end of the bladder in place.

An upper one way seal 838 is positioned on guide tube 818 and a lower one way seal 840 is positioned on piston 820. One form of one way seal is a cup seal. Cup seals tend to allow some water flow in one direction while generally blocking water flow in the other direction. In this case, upper one way seal 838 can allow upward water flow while blocking downward water flow. Similarly, lower one way seal 840 is configured to allow upward water flow but block downward water flow. Note also, that in this implementation, an inside diameter of the piston is not uniform. For instance, the piston can have a lower portion 842 with a relatively smaller inside diameter, a middle portion 844 with a relatively larger diameter, and an upper portion 846 with a diameter that is larger than the lower portion 842, but smaller than the middle portion 844.

Figure 8:
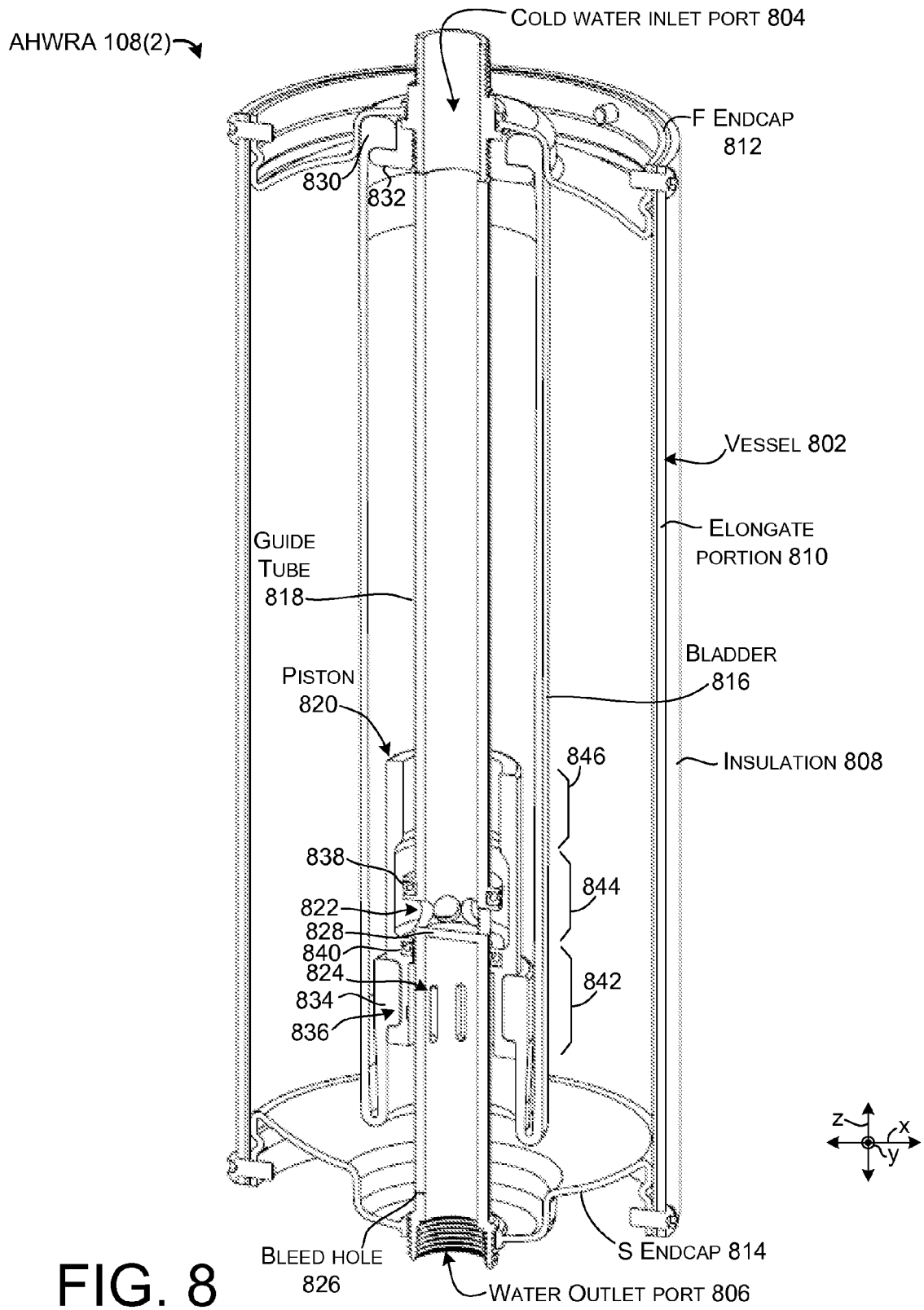

In operation, beginning with FIG. 8, assume that the system is in a static condition with no water flow and cold water inlet port 804 and water outlet port 806 are at equal pressure.

Figure 9:
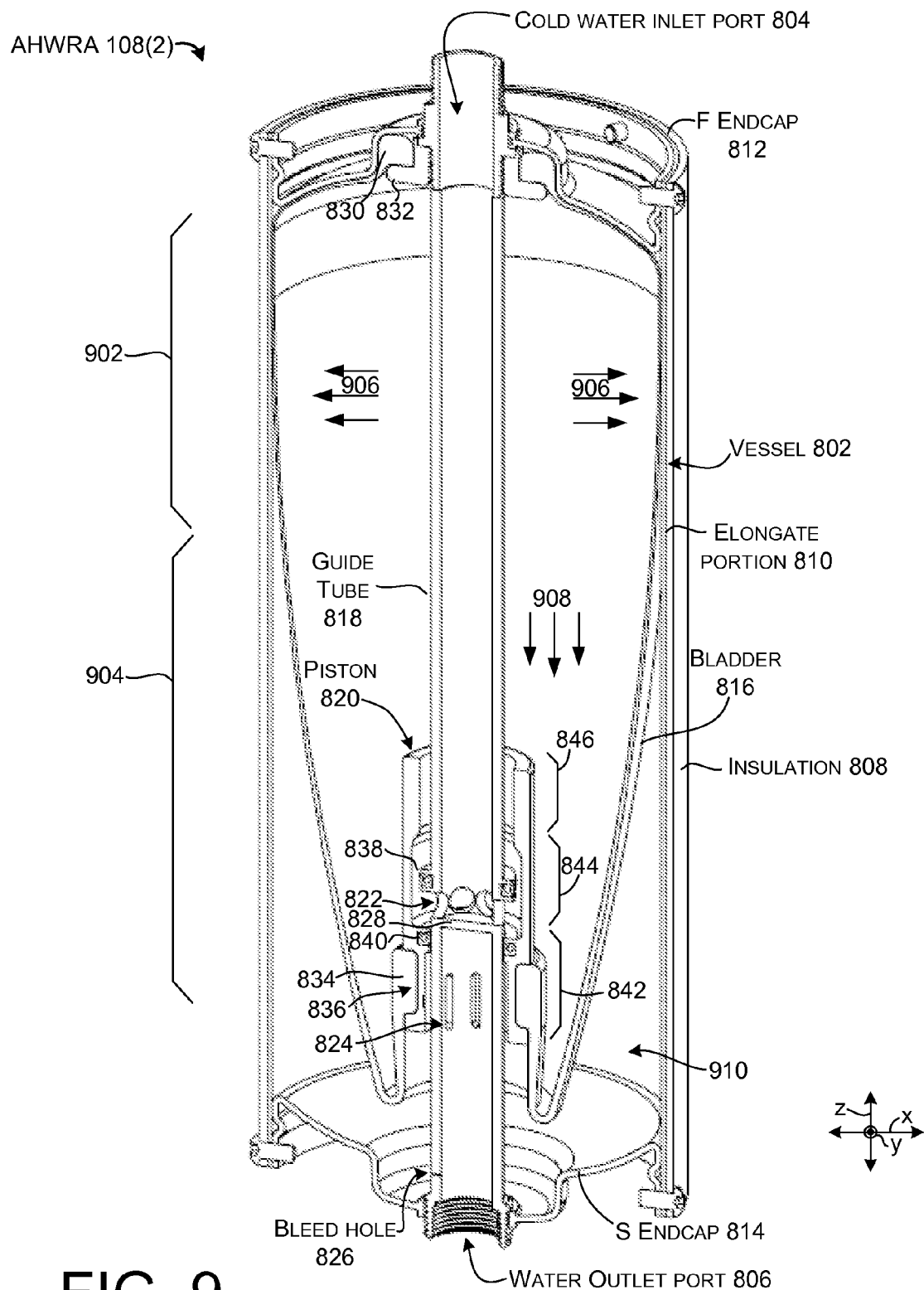

FIG. 9 shows the automatic hot water recovery apparatus 108(2) as water is drawn from the hot water fixture (FIG. 1). For instance, this could occur when the user turns on the hot water at the fixture. At this point, the water pressure drops at the water outlet port 806 and thus creates a pressure differential between the cold water inlet port 804 and the water outlet port 806. Accordingly, water flows from the cold water inlet port 804 into the bladder 816. More specifically, the water flows from the cold water inlet port 804 into and through the guide tube 818 until blocked by partition 828. The water can flow out the guide tube holes 822 into a space between the guide tube and the middle portion 844 of the piston 820. The water can then flow upwardly between the guide tube and the upper portion 846 and into the bladder 816.

In some cases, the bladder 816 can be configured to expand in a specific manner. For instance, the bladder 816 may be constructed to have a non-uniform thickness. For example, the bladder can be tapered between an upper region 902 and a lower region 904. In another example the upper region 902 of the bladder may be thinner than the lower region 904. Such a configuration can promote horizontal expansion of the bladder as indicated by arrows 906 (e.g., parallel to the x and y references axes) rather than vertical expansion as indicated by arrows 908 (e.g., parallel to the z reference axis). In either case, as the upper region 902 of the bladder expands horizontally and contacts the vessel 802, further expansion is prevented and vertical expansion occurs.

To summarize, in this implementation, the bladder 816 is configured to promote horizontal expansion of the bladder before vertical expansion. As a result the upper region 902 of the bladder tends to fill first. Eventually, the lower part of the bladder starts to fill. The shape of the lower region 904 of the bladder moves the piston 820 downward as the bladder fills. The downward movement causes the piston to slide down the guide tube 818 toward the flow slots 824. Expansion of the bladder 816 causes water in space 910 (outside bladder 816, but inside vessel 802) to flow through the flow slots 824 into the guide tube 818 and out the outlet port 806 toward the water heater.

Figure 10:
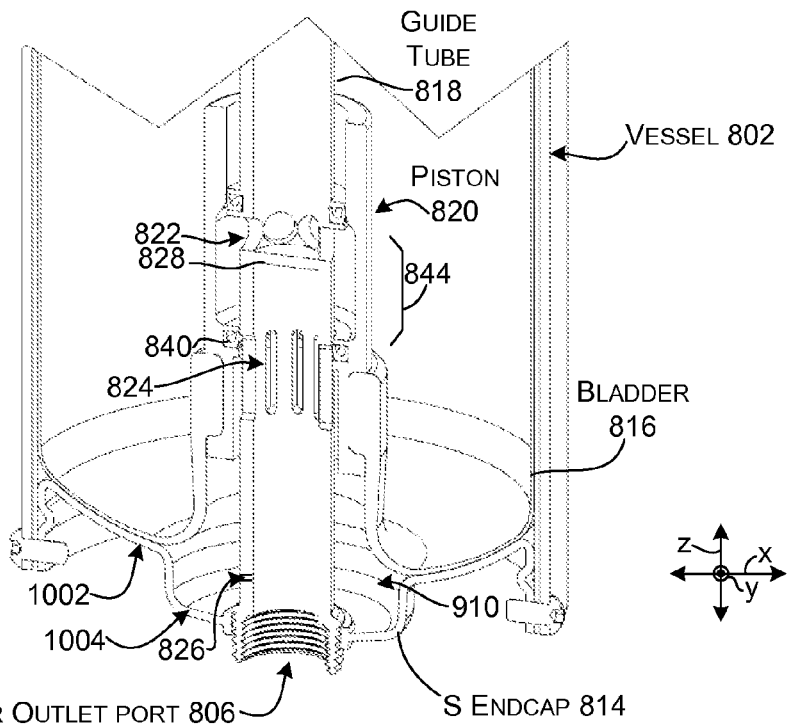

FIG. 10 shows AHWRA 108(2) at a subsequent point where the water flowing into the bladder 816 extends the bladder downward until the bladder contacts a raised portion 1002 of the second end cap 814, but not a cavity portion 1004. At this point water from the cold water inlet port (804, FIG. 9) continues to flow into the guide tube 818 and out the guide tube holes 822 to fill the bladder, but this water generally cannot flow downward past lower cup seal 840. The expanding bladder continues to force water in space 910 into the guide tube 818.

Figure 11:
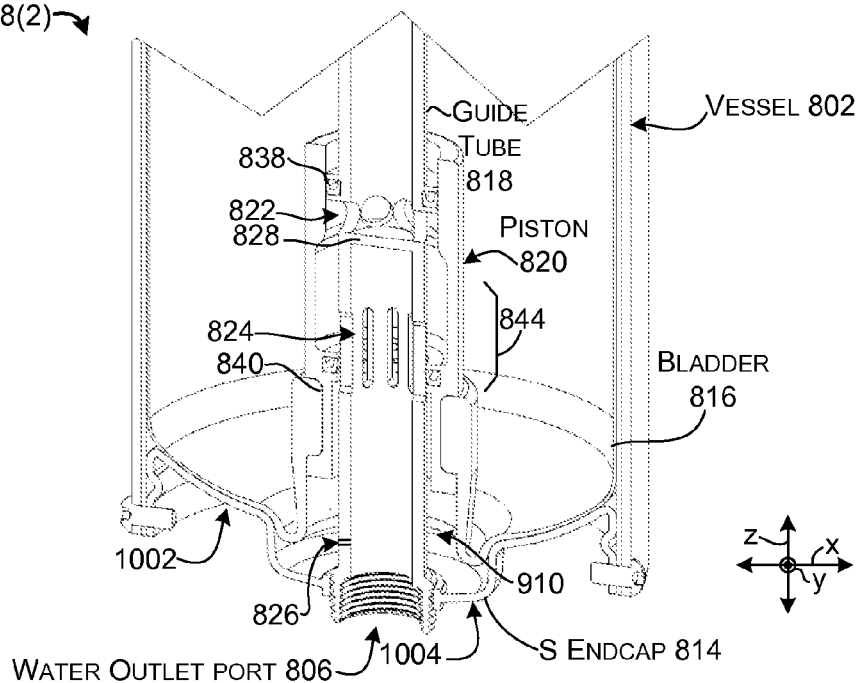

FIG. 11 shows a later point where continued water flow into the bladder 816 has pushed the piston 820 fully downward along the guide tube 818 and forced the bladder into the cavity portion 1004 of the second end cap 814. (The bladder can be seen generally fully conforming to the cavity in FIG. 12). Water can now effectively circumvent the guide tube's partition 828 by flowing out of the guide tube holes 822 and between the piston 820 and the guide tube 818 (at middle portion 844) and back into the guide tube via the flow slots 824. This water can then flow out the water outlet port 806 toward the water heater. This configuration is maintained while hot water use continues. Note that as the piston 820 travels downward and isolates the flow slots 824 from space 910, any water remaining inside space 910 can pass upwardly through the lower one way seal 840 and into the flow slots 824 or through the bleed hole 826 to allow the bladder to fully expand to conform to the vessel 802 and the end caps 812 (FIG. 9) and 814. At this point the bladder 816 is prevented from collapsing by the upper seal 838 blocking water flowing out of the bladder and the isolation of space 910 (with the exception of the bleed hole 826). Thus, the bladder 816 maintains a volume generally defined by the inside of the vessel 802 and the end caps 812 and 814 while water flows through the AHWRA 108(2).

As mentioned above, the water in the generally fully expanded bladder 816 can be isolated from the water flow of FIG. 11 by the upper seal 838. At this point water can travel from the cold water inlet port 804 (FIG. 9), down the guide tube 818, out the guide tube holes 822, along the middle portion 844 of the piston 820, through the flow slots 824, back into the guide tube 818, and out the water outlet port 806 without entering the bladder 816.

Figure 12:
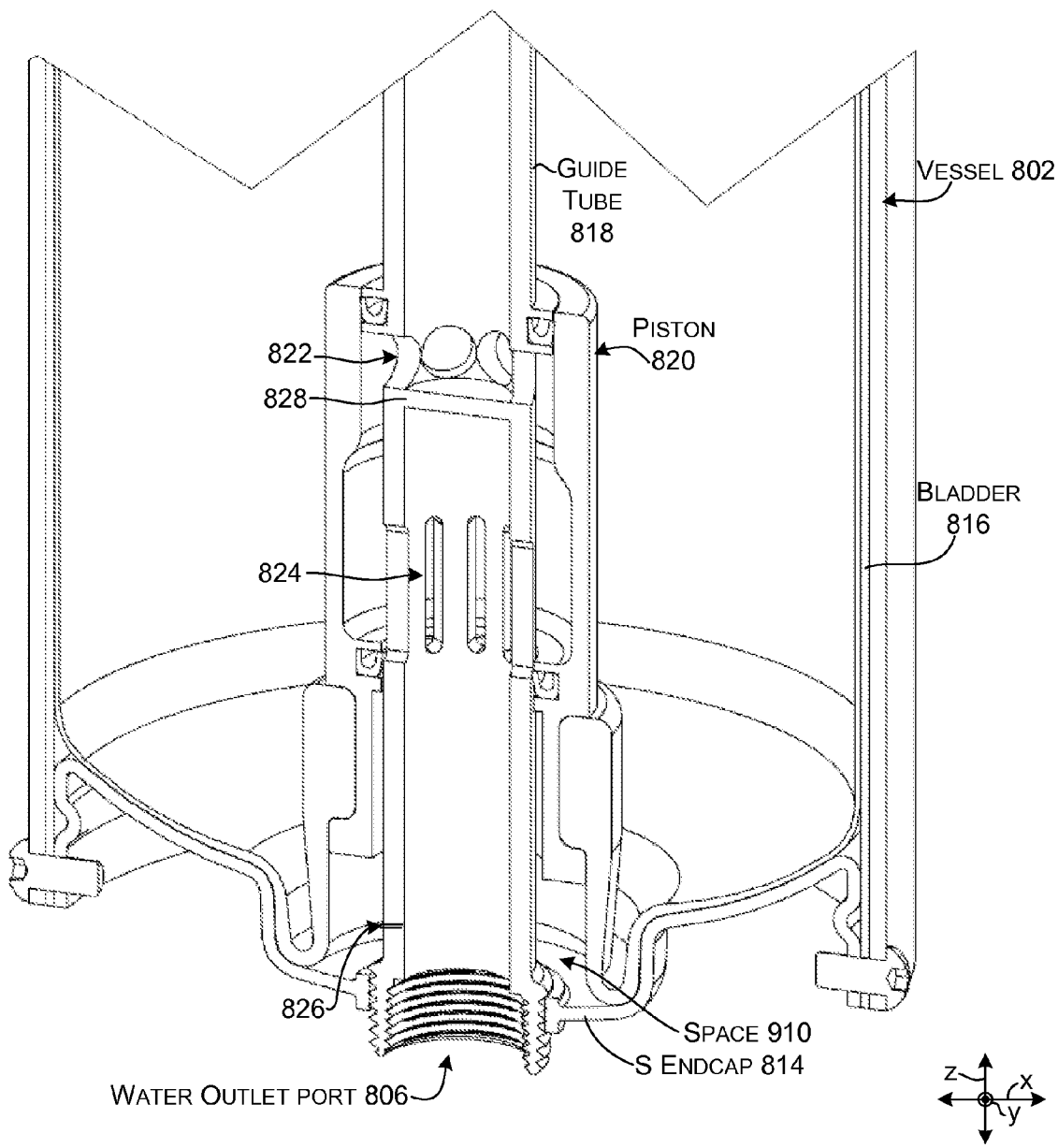

FIG. 12 shows another point after hot water use is discontinued. When the hot water use is discontinued, the pressure in the cold water inlet port 804 (FIG. 9) and the water outlet port 806 equalizes. The bladder 816 is temporarily prevented from collapsing because the space 910 outside the bladder is isolated except for the bleed hole 826. The rate of collapse is controlled by the small flow through the bleed hole. This feature temporarily prevents cold water from entering the hot water line at the point of use so that hot water is available for a short time after each hot water draw. The duration of delay can be defined and/or adjusted based upon the cross-sectional area of the bleed hole 826. (Note, the delay can be eliminated if desired by greatly enlarging the bleed hole.) In summary, the bladder is resiliently biased to contract, but the contraction is hindered by the partial vacuum that is caused in space 910. Water can only slowly flow through the bleed hole to fill the space. Thus, alternatively or additionally to providing the delay function, the bleed hole can be thought of as providing controlled isolation of space 910. Stated another way, in this implementation, the space 910 is isolated from the water that is flowing through the AHWRA 108(2) as discussed relative to FIG. 11. The bleed hole 826 can help to maintain the bladder 816 in the generally fully expanded configuration during the water flow of FIG. 11 and then control the collapse of the bladder by controlling the rate of water flow back into space 910.

Figure 13:
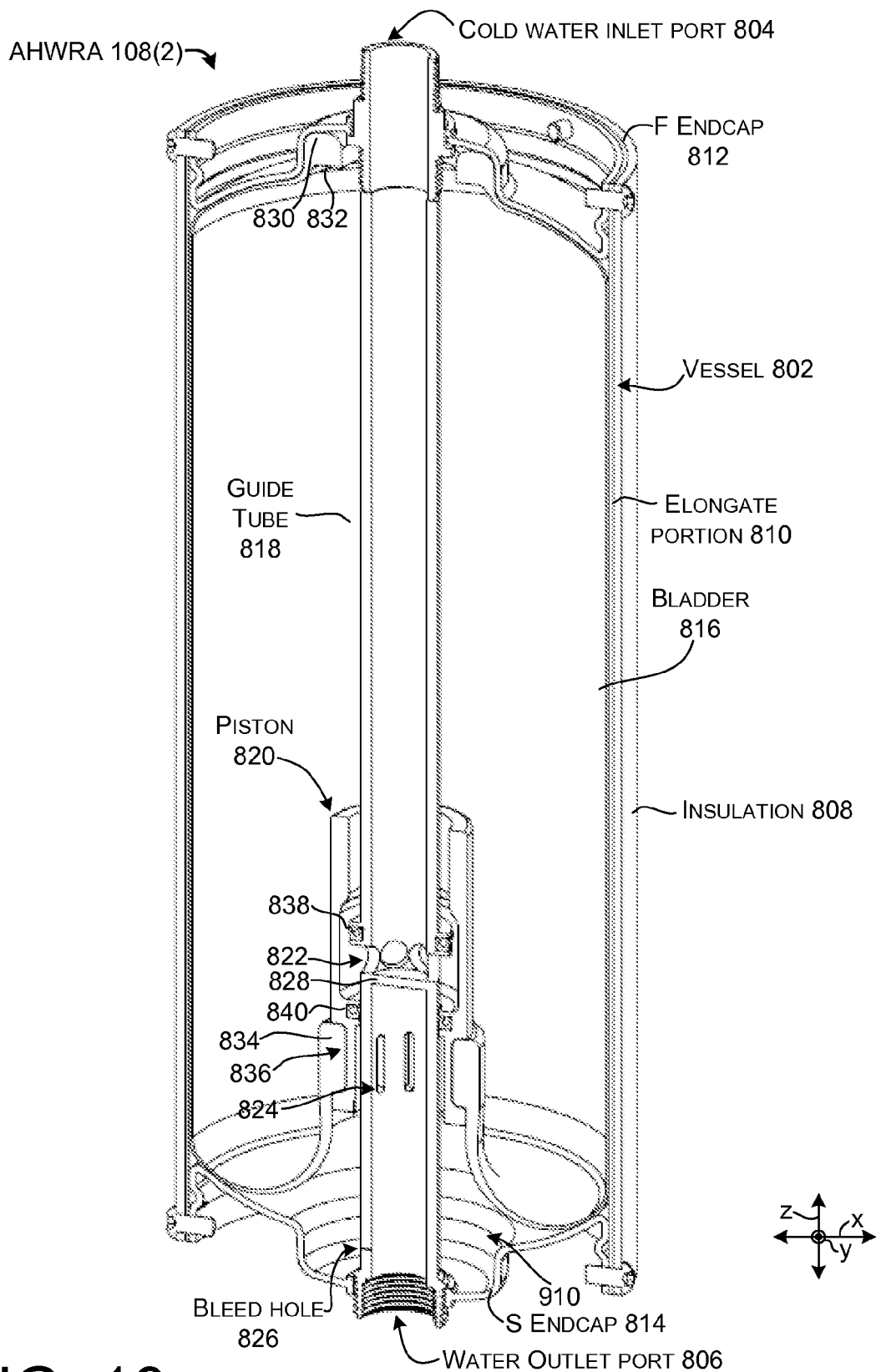

FIG. 13 shows a subsequent view of AHWRA 108(2) after the delay discussed above relative to FIG. 12. The delay is caused by the space 910 being slowly filled by water that passes through the bleed hole 826. As water passes through the bleed hole 826 and fills space 910, the piston 820 can slowly move upward. Eventually the piston moves far enough upward that the lower cup seal 840 contacts the flow slots 824. At this point water can flow up the water outlet port 806 into the guide tube 818 through the flow slots 824 into space 910. The flow slots have a much greater cross-sectional area than the bleed hole and so a much greater volume of water per unit time can now enter space 910. Because of this greater availability of water to fill space 910, the bladder 816 can now contract much faster than before the flow slots were exposed. The bladder contracting to its original biased configuration expels water from within the bladder out the inlet port 804 and pulls water into space 910 and this in turn pulls a corresponding volume of hot water back into the water heater. The volume of water drawn back into the hot water can be determined by the difference in volume of space 910 in the at-rest configuration such as FIG. 9 and the fully expanded configuration of FIG. 11. The hot water that is drawn back into the water heater can reduce heat loss when compared to leaving that hot water in the hot water pipe for an extended period of time.

FIGS. 14-20 collectively illustrate another AHWRA 108 (3). The AHWRA includes a vessel 1402 that include first and second end caps 1404 and 1406. The first end cap couples a cold water inlet port 1408 to a volume 1410 within a bladder 1412. Another volume or space 1414 is defined between the bladder 1412 and the vessel 1402. A guide tube 1416 is connected through the second end cap 1406 to a water outlet port 1418. Fluid slots 1420 are formed in the guide tube 1416. A piston 1422 is positioned around the guide tube 1416. A cap 1424 limits upward travel of the piston 1422 and the second end cap 1406 limits downward travel of the piston. The bladder 1412 is secured to the first end cap 1404 and the piston 1422. In some cases the lower end of the bladder 1412 can form the piston 1422. In other cases, the piston 1422 can be distinct from the bladder 1412 and the lower end of the bladder can be secured to the piston 1422. The piston can form or include upper and lower seals 1426 and 1428, respectively, around the guide tube 1416. The guide tube can include a bleed hole 1430. Insulation 1432 can be positioned around the vessel 1402.

Figure 14:
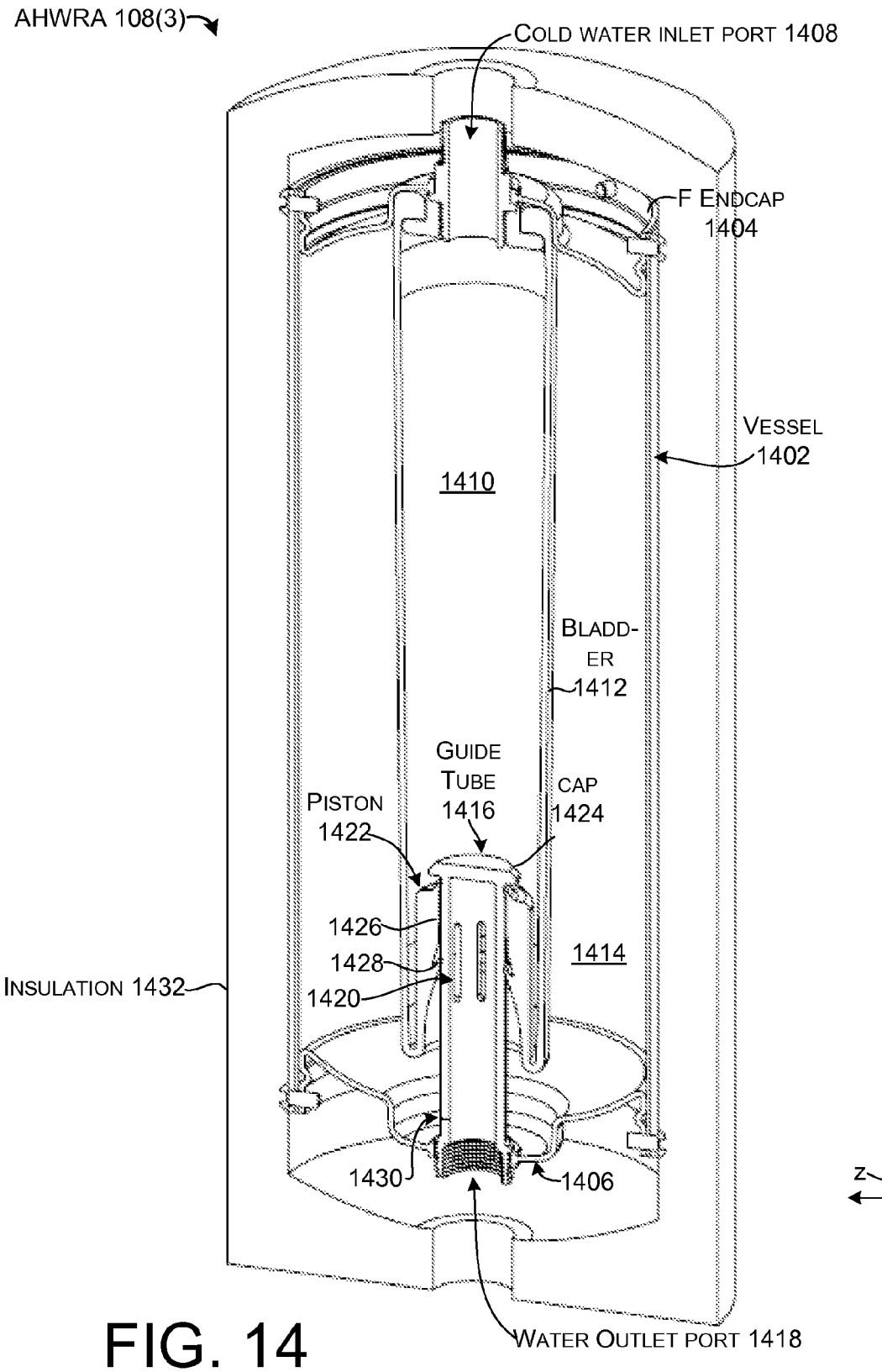

FIG. 14 shows the AHWRA 108(3) in a resting configuration where inlet (cold water inlet port 1408) and outlet (water outlet port 1416) pressures are equal.

Figure 15:
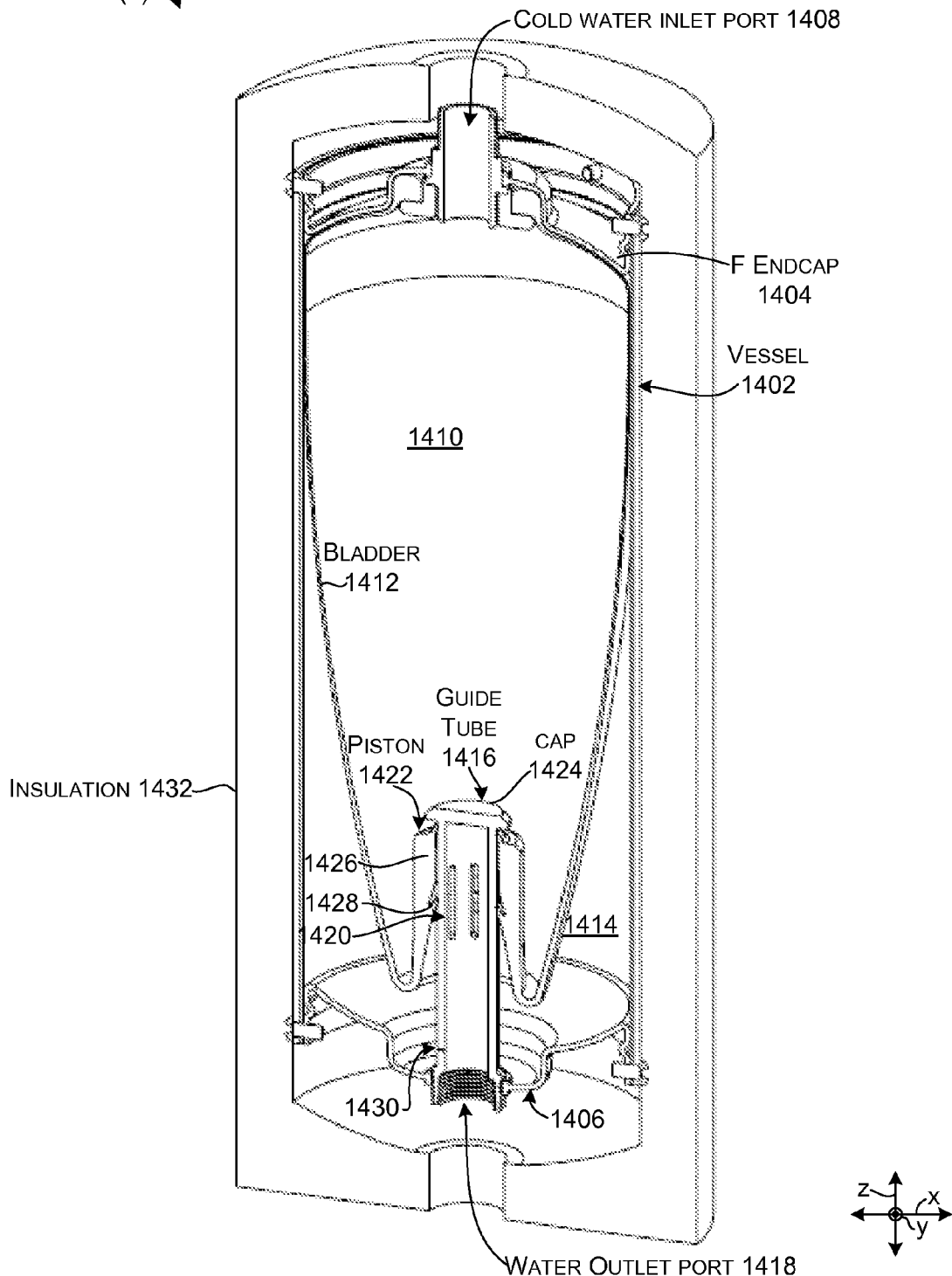

FIG. 15 shows the AHWRA 108(3) after hot water is turned on. Water pressure drops at the water outlet port 1418. Water is flowing from space 1414 through the fluid slots 1420, down the guide tube 1416 and out the water outlet port 1418. Thus, the volume of space 1414 decreases. This decreases pressure outside the bladder 1412 and water flows through the cold water inlet port 1408 into the bladder and expands volume 1410. The upper portion of the bladder 1412 expands due to the inflowing water. In this case, the upper portion of the bladder expands first because the upper portion is thinner than a lower portion of the bladder and thus offers less resistance to expansion.

Figure 16:
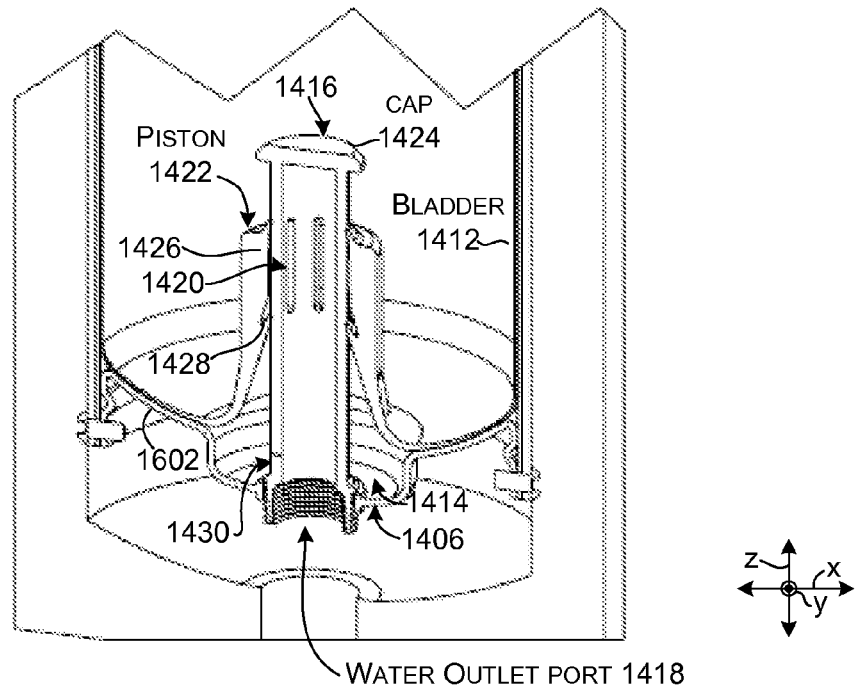

FIG. 16 shows a subsequent view where the bladder 1412 continues to fill, the bladder expands vertically and moves the piston 1422 downward toward the flow slots 1420 in the guide tube 1416. Water in space 1414 flows through the flow slots 1420 and out of the guide tube 1416 and the water outlet port 1418. As the piston moves lower, the flow slots are blocked by lower seal 1428. In some cases, the lower seal can be configured to allow water to flow upward, but not downward. For instance a cup seal can be utilized, or an angled 'wiper seal'. This configuration can allow water in space 1414 to continue to evacuate past the seal and into the guide tube 1416. Some water may also pass from space 1414 through the bleed hole 1430. The bladder eventually contacts an upper portion 1602 of the second end cap 1406.

Figure 17:
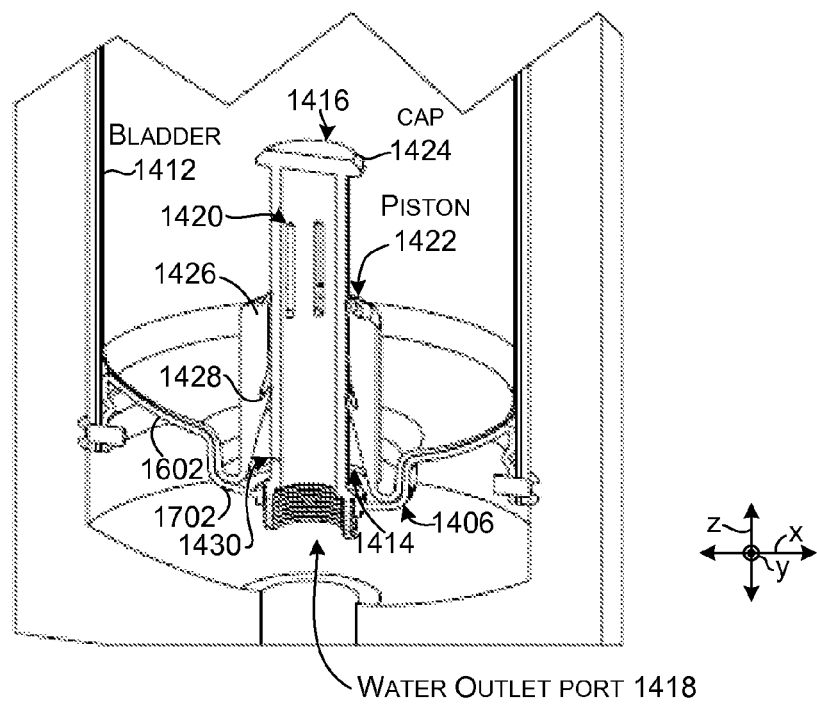

FIG. 17 shows water continuing to expand bladder 1412 and force the bladder to conform to a cavity 1702 in the second end cap 1406. The piston 1422 also 'bottoms out' against the cavity and further downward movement is stopped. At this point the volume of space 1414 is greatly reduced.

Figure 18:
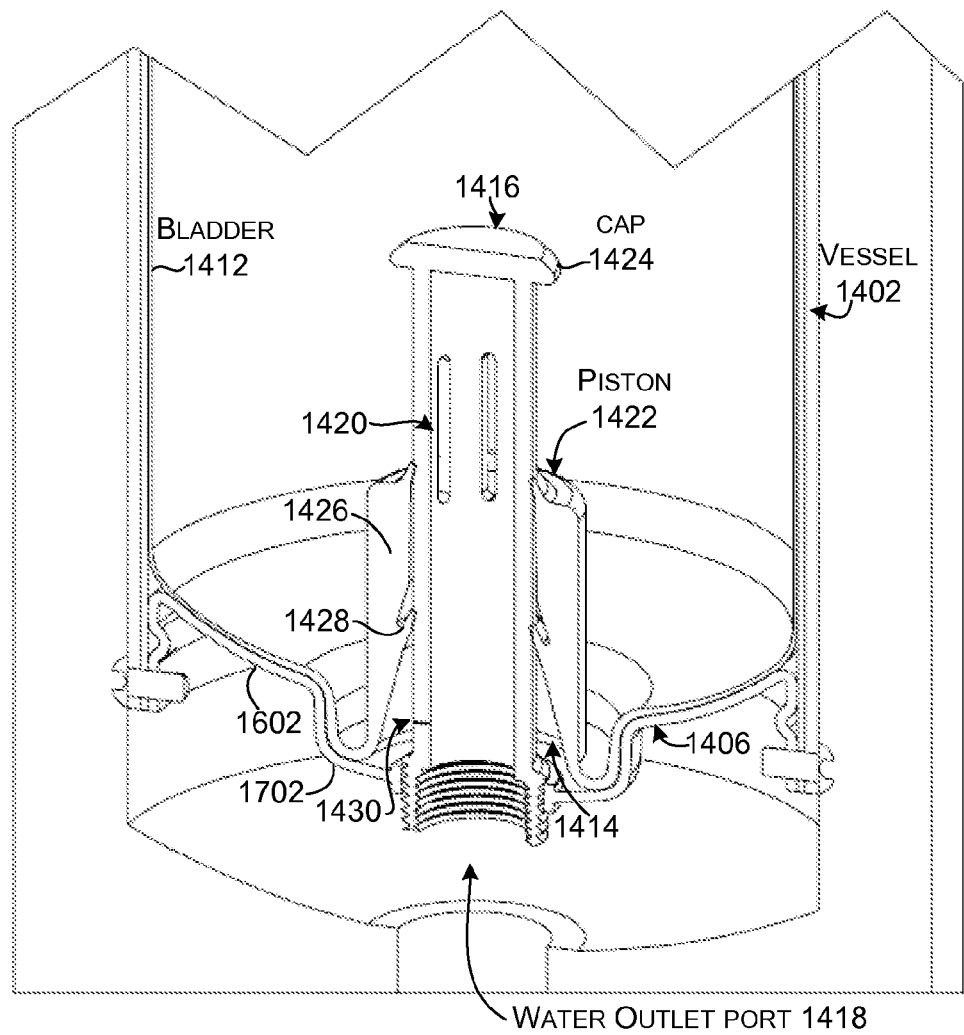
Figure 19:
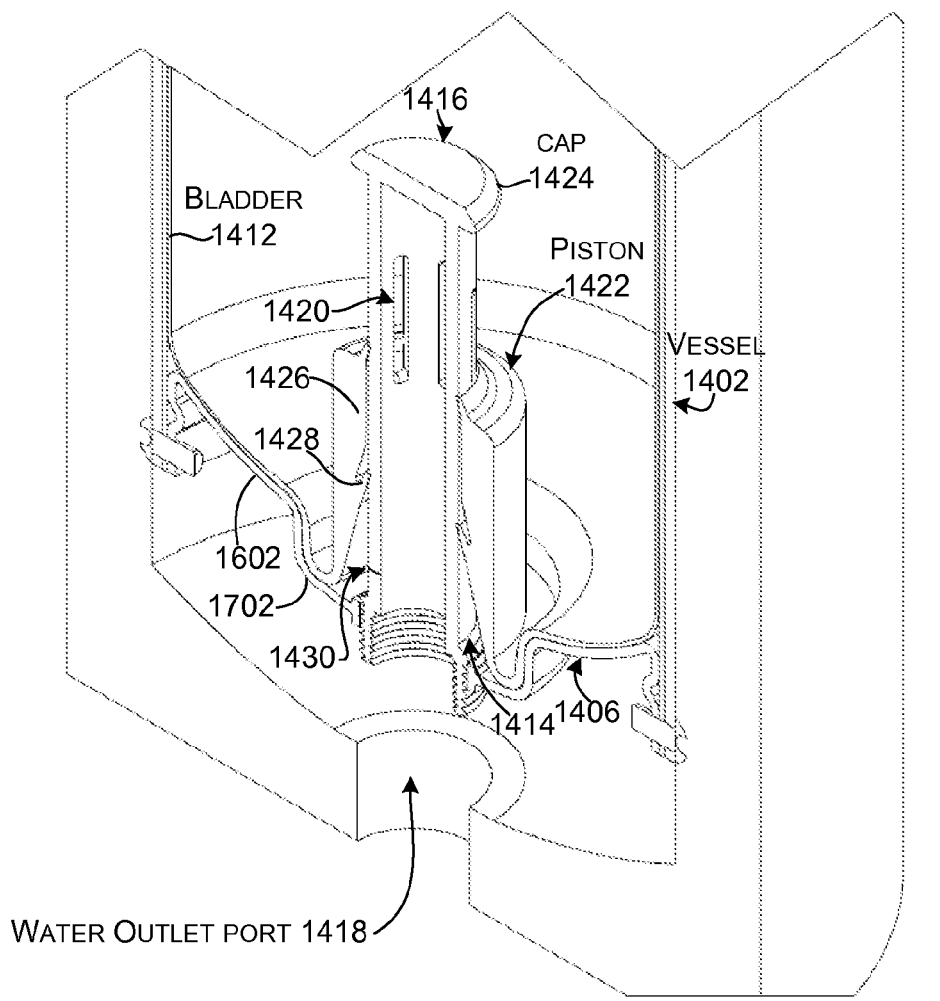

FIGS. 18 and 19 show two slightly different views when equilibrium is reached where water from outside the bladder 1412 (e.g., space 1414) is able to escape past the lower seal 1428 into the water outlet port 1418. The piston 1422 and the bladder 1412 remain in this position as the water freely flows through the AHWRA 108(3) while hot water is being used.

The bladder generally conforms to the inside dimensions defined by the vessel 1402 and end caps 1404 and 1406 while hot water is being used.

When the hot water flow is discontinued the pressure in the inlet and outlet ports (1408 and 1418) equalize. The bladder 1412 is prevented from collapsing because space 1414 outside the bladder is isolated except for the bleed hole 1430. The rate of collapse is controlled by the small flow through the bleed hole. This feature allows hot water to be available to the user for a short period of time after each hot water draw.

Figure 20:
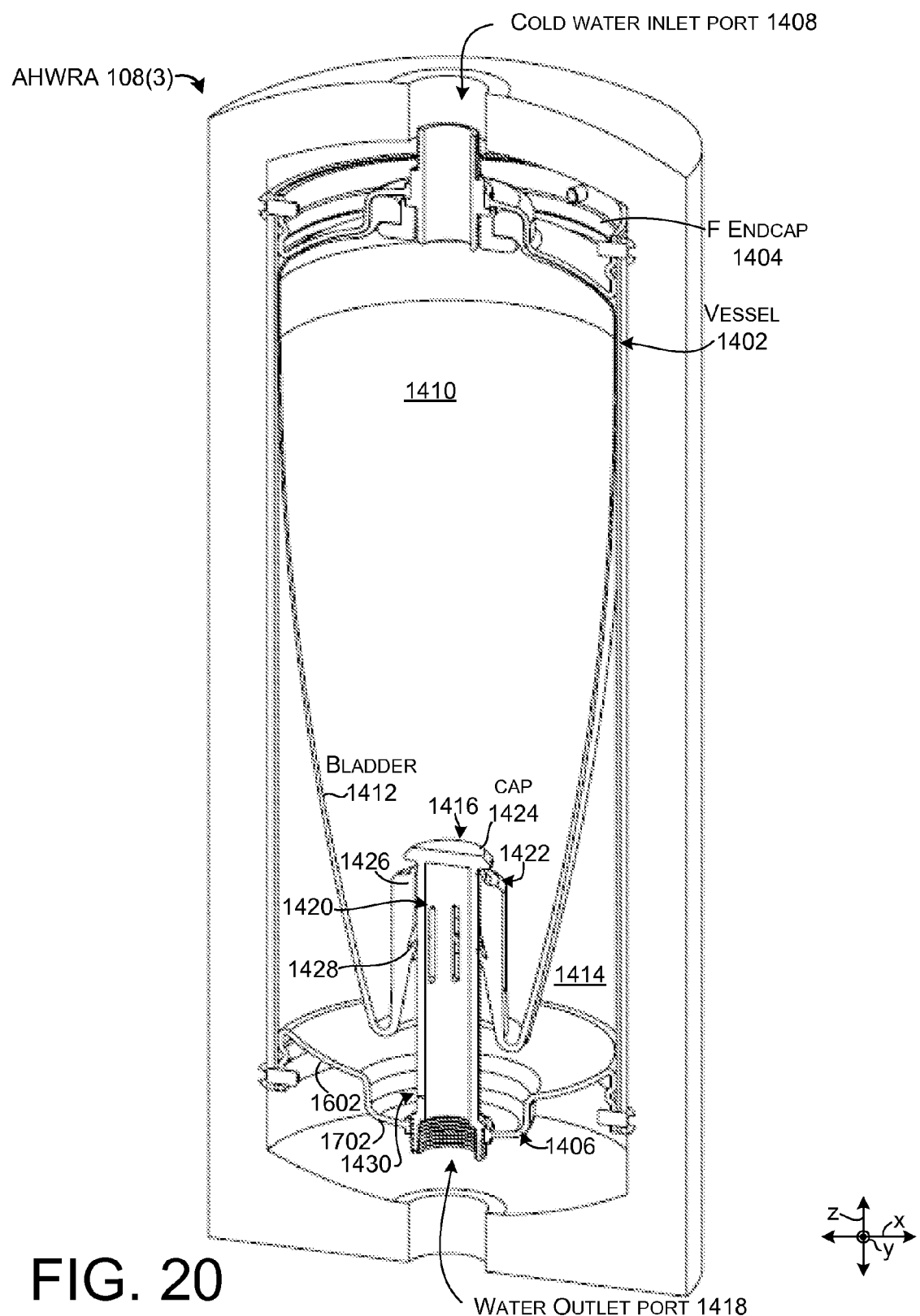

FIG. 20 shows a subsequent point where enough water has flowed through bleed hole 1430 for the bladder 1412 to move upward until the lower seal 1428 contacts the flow slots 1420. This allows water to flow through the flow slots 1420 into the space 1414 outside the bladder 1412. The collapsing bladder continues to pull water back into water outlet port 1418 from the water heater. This results in water from the hot water pipe being pulled back into the water heater and the heat that otherwise would be lost is drawn back into the water heater.

FIGS. 21-26 collectively illustrate another AHWRA 108 (4). The AHWRA includes a vessel 2102 that include first and second end caps 2104 and 2106. The first end cap couples a cold water inlet port 2108 to a volume 2110 within a bladder 2112. Another volume or space 2114 is defined between the bladder 2112 and the vessel 2102. A guide tube 2116 is connected through the second end cap 2106 to a water outlet port 2118. Fluid slots 2120 are formed in the guide tube 2116. A piston 2122 is positioned around the guide tube 2116. A cap 2124 limits upward travel of the piston 2122 and the second end cap 2106 limits downward travel of the piston. The bladder 2112 is secured to the first end cap and the piston 2122. In some cases the lower end of the bladder 2112 can form the piston 2122. The piston can form or include upper and lower seals 2126 and 2128, respectively, around the guide tube 2116. The guide tube can include a bleed hole 2130. Insulation 2132 can be positioned around the vessel 2102. Note that AHWRA 108(4) is quite similar to AHWRA 108(3) described above relative to FIGS. 14-20 except for the piston 2122. In AHWRA 108(3) the lower portion of the bladder is thickened and can be molded in a manner that the bladder forms the piston and the upper and lower seals. In AHWRA 108(4), the piston 2122 is distinct from the bladder 2112. The piston includes two grooves which contain the upper and lower seals 2126 and 2128 and a recess that receives the lower end of the bladder 2112 in a stretch fit manner. Hence, once the bladder is stretched over the piston and into the recess during assembly, the elastic nature of the bladder and the wider areas above and below the recess tend to retain the bladder around the piston.

Figure 21:
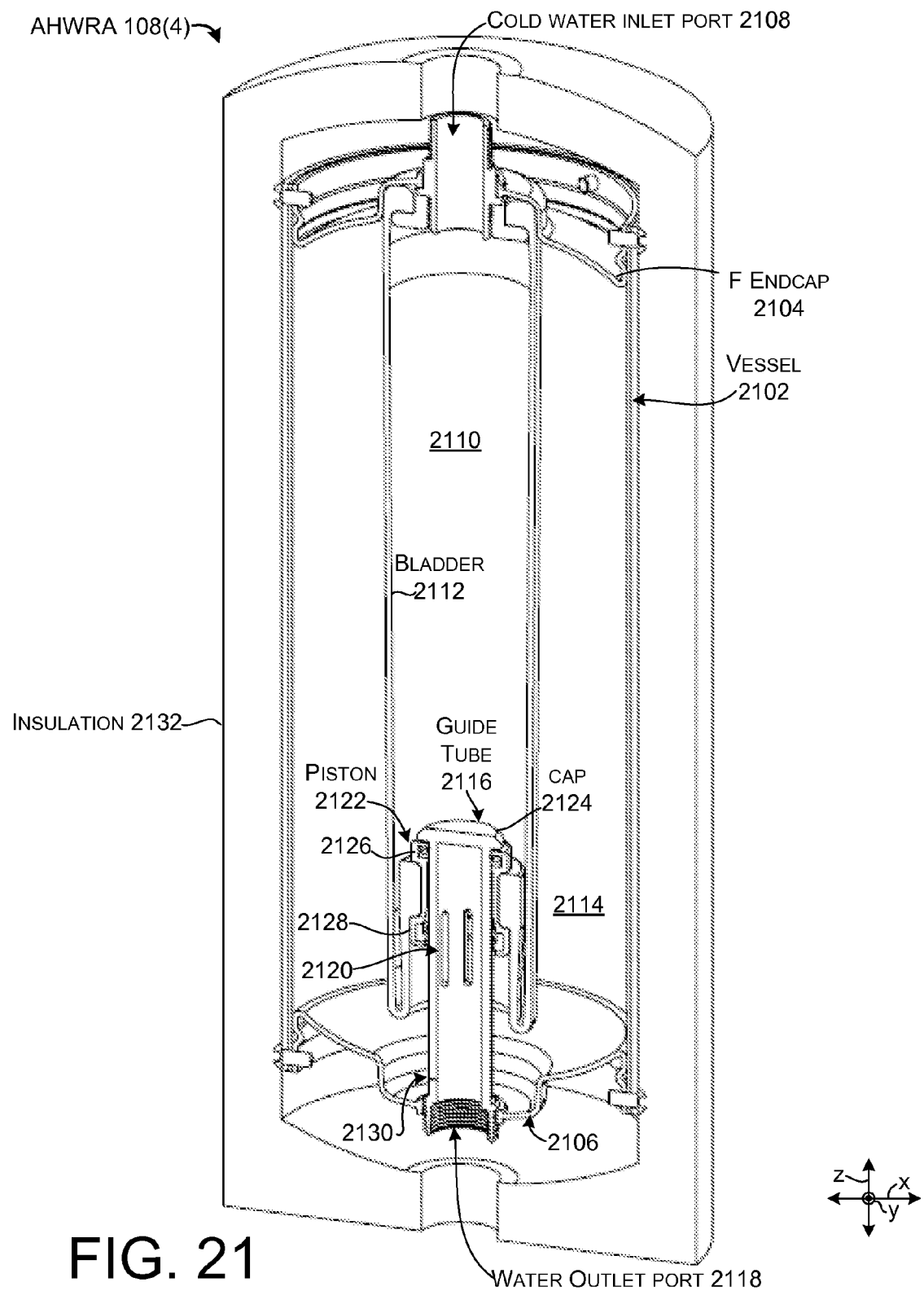

FIG. 21 shows the AHWRA 108(4) in a resting configuration where inlet (cold water inlet port 2108) and outlet (water outlet port 2118) pressure are equal.

Figure 22:
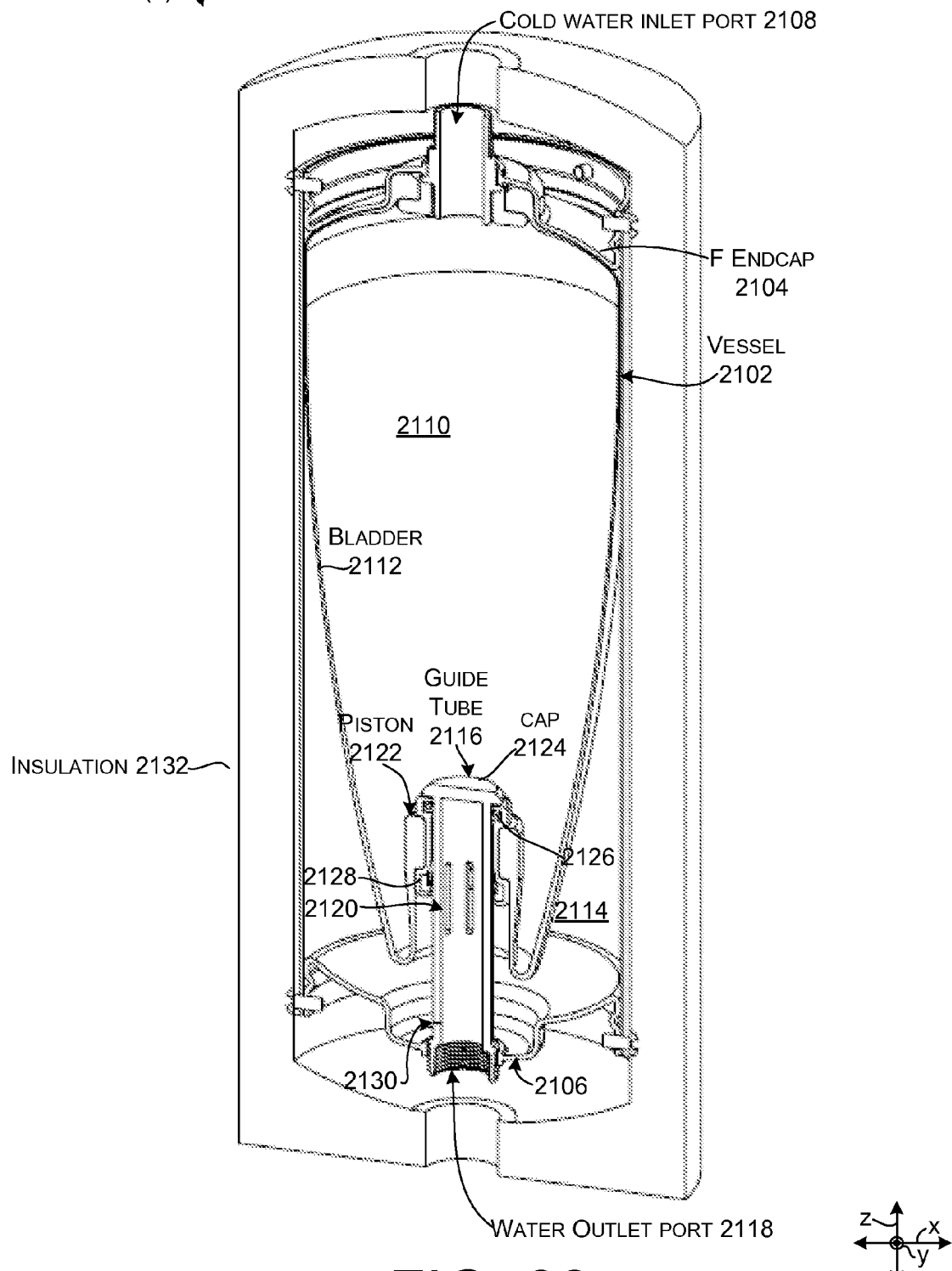

FIG. 22 shows the AHWRA 108(4) after hot water is turned on. Water pressure drops at the water outlet port 2118. Water is flowing from space 2114 through the fluid slots 2120, down the guide tube 2116 and out the water outlet port 2118. Thus, the volume of space 2114 decreases. This decreases pressure outside the bladder 2112 and water flows through the cold water inlet port 2108 into the bladder and expands volume 2110. The upper part of the bladder expands due to the inflowing water. In this case, the bladder is manufactured to have a thinner bladder wall in the upper part than the lower part. This configuration can cause the upper portion of the bladder to expand first in a generally horizontal manner.

Figure 23:
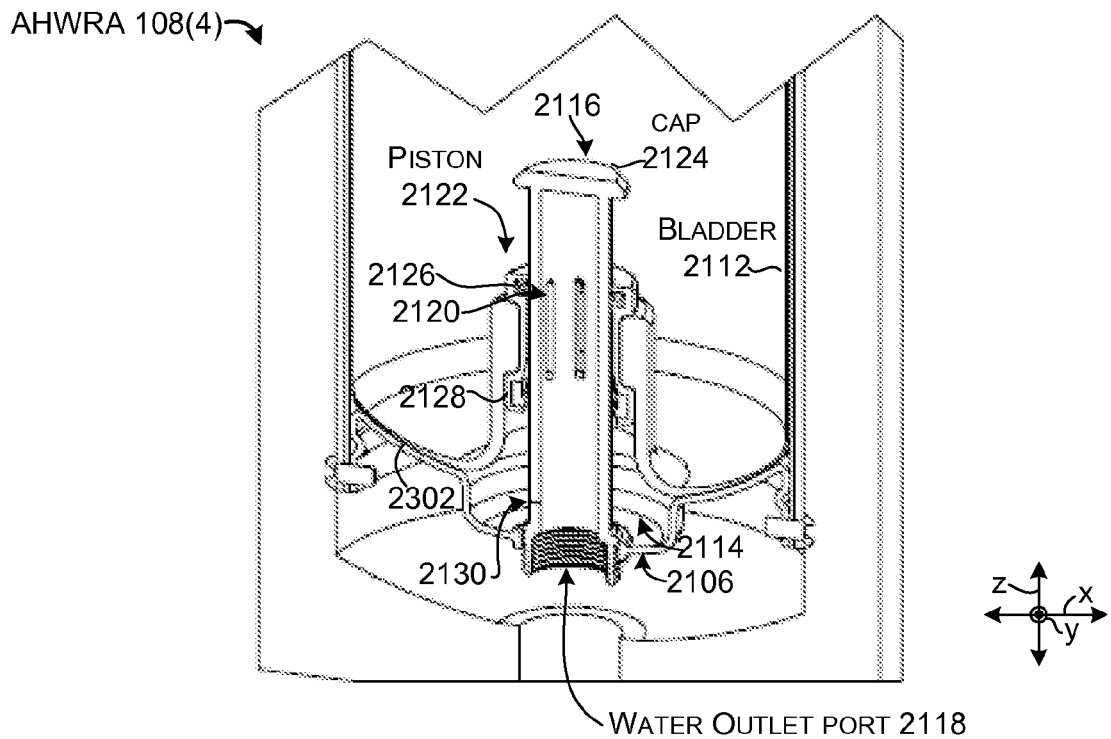

FIG. 23 shows a subsequent view where the bladder 2112 continues to fill, the bladder expands vertically and moves the piston 2122 downward toward the flow slots 2120 in the guide tube 2116. Water in space 2114 flows through the flow slots 2120 and out of the guide tube 2116 and the water outlet port 2118. As the piston 2122 moves lower, the flow slots are blocked by lower seal 2128. In some cases, the lower seal 2128 can be configured to allow water to flow upward, but not downward. For instance a cup seal can be utilized, or an angled 'wiper seal'. This configuration can allow water in space 2114 to continue to evacuate past the seal and into the guide tube 2116. Some water may also pass from space 2114 through the bleed hole 2130. The bladder may eventually contact an upper portion 2302 of the second end cap 2106.

Figure 24:
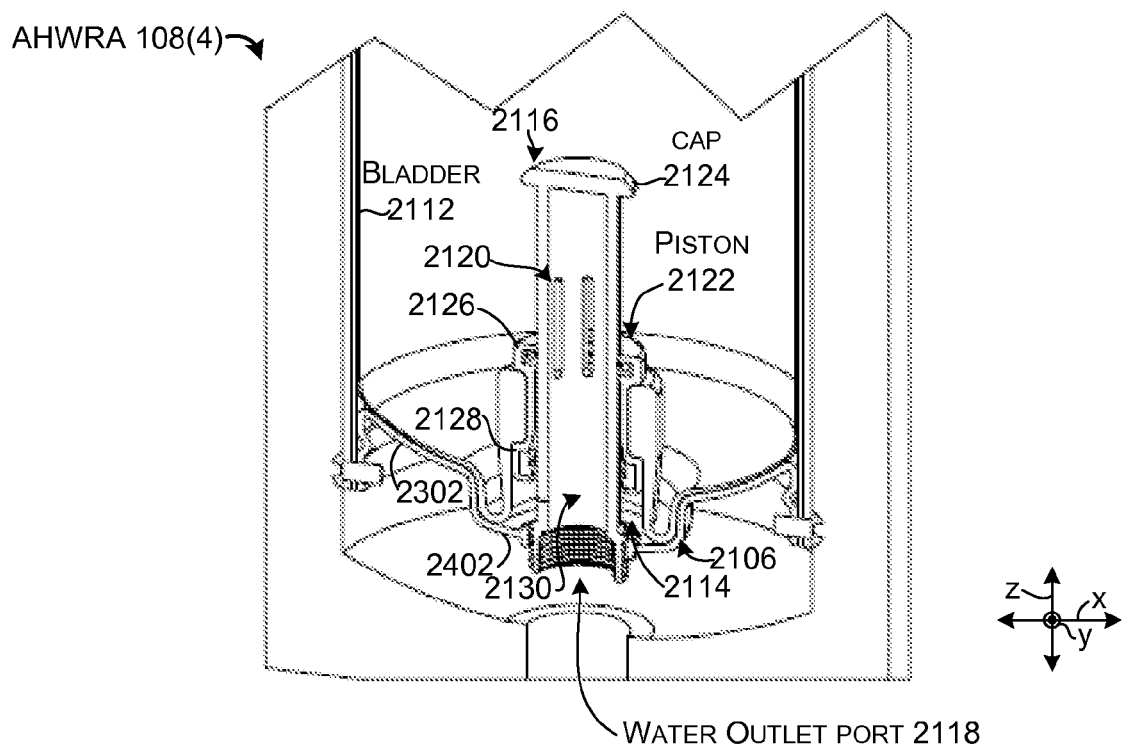

FIG. 24 shows water continuing to expand bladder 2112 and force the bladder to conform to a cavity 2402 in the second end cap 2106. The piston 2122 also 'bottoms out' against the cavity and further downward movement is stopped. At this point the volume of space 2114 is greatly reduced.

Figure 25:
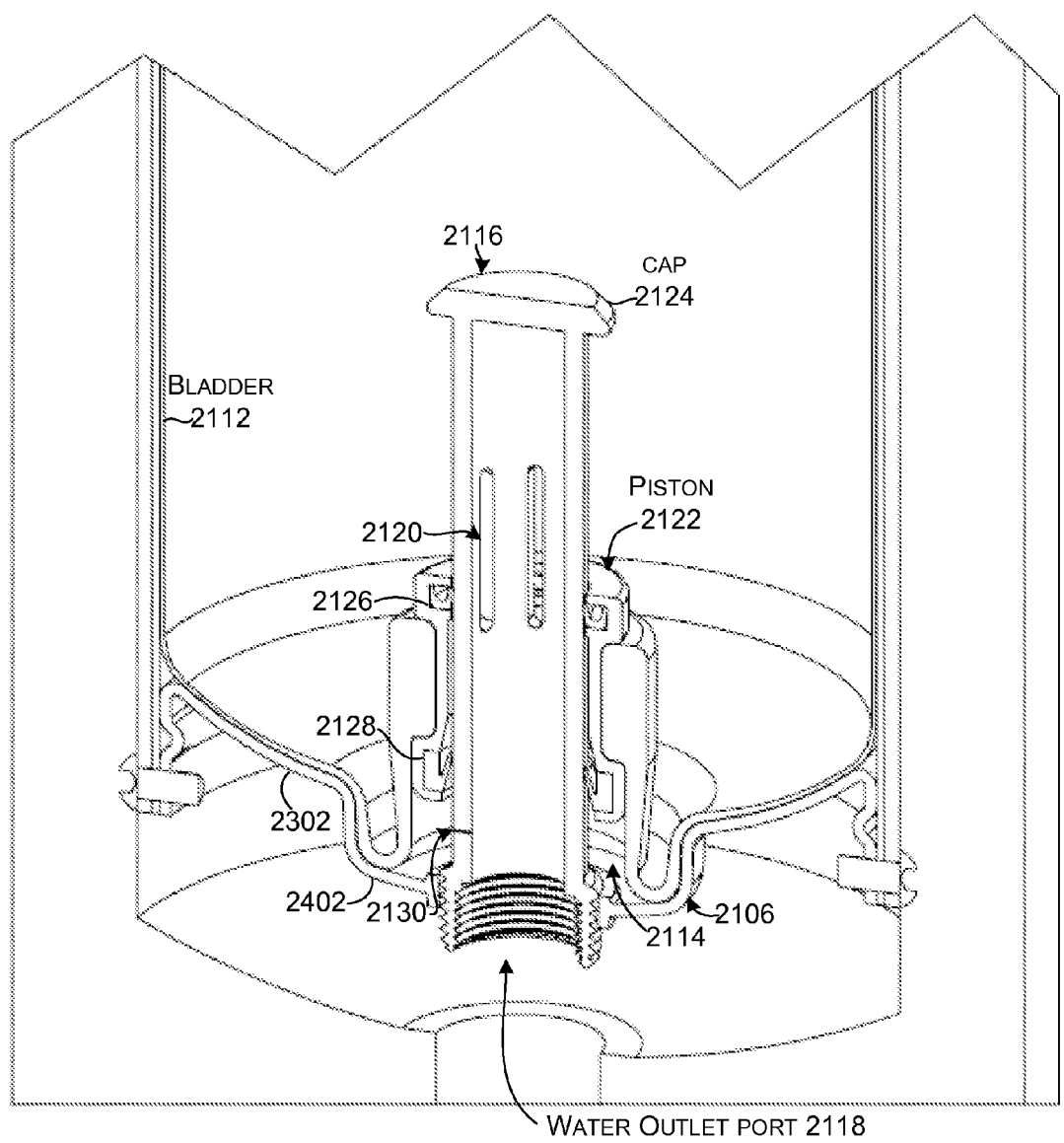

FIG. 25 shows AHWRA 108(4) when the hot water flow is discontinued and the pressure in the inlet and outlet ports equalize. The bladder 2112 is prevented from collapsing because space 2114 outside the bladder is isolated except for the bleed hole 2130. The rate of collapse is controlled by the small flow through the bleed hole. This feature allows hot water to be available to the user for a short period of time after each hot water draw.

Figure 26:
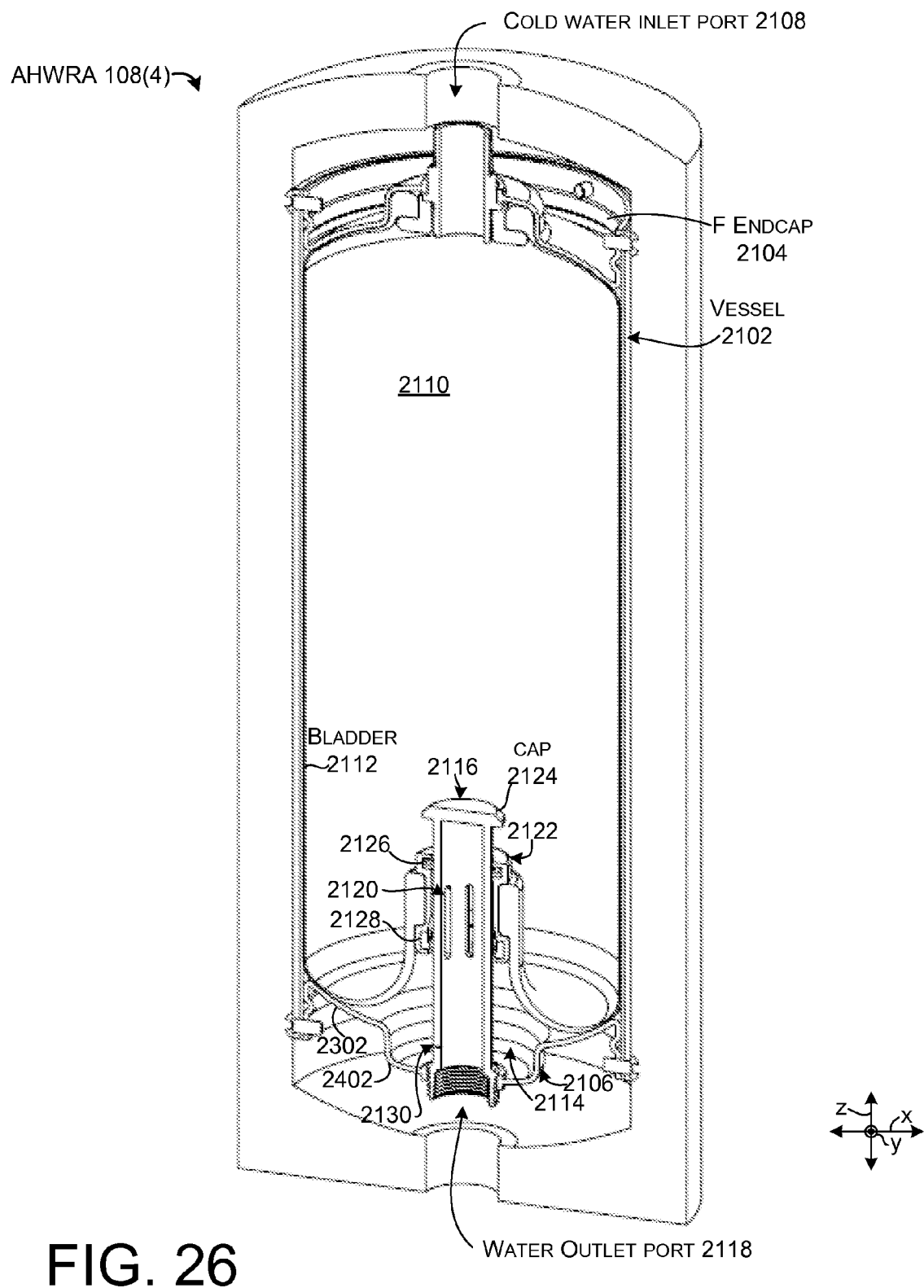

FIG. 26 shows a subsequent point where enough water has flowed through bleed hole 2130 for the bladder 2112 to move upward until the lower seal 2128 contacts the flow slots 2120. This allows water to flow through the flow slots into the space 2114 outside the bladder 2112. The collapsing bladder continues to pull water back into water outlet port 2118 from the water heater. This results in water from the hot water pipe being pulled back into the water heater and the heat that otherwise would be lost is drawn back into the water heater.

In summary several examples of AHWRAs are described above. AHWRA concepts conveyed in these examples include a delayed drawback option. The delayed drawback feature can be employed in a AHWRA that utilizes an elastomeric bladder or with other types of AHWRAs.

Second System Example

Figure 27:
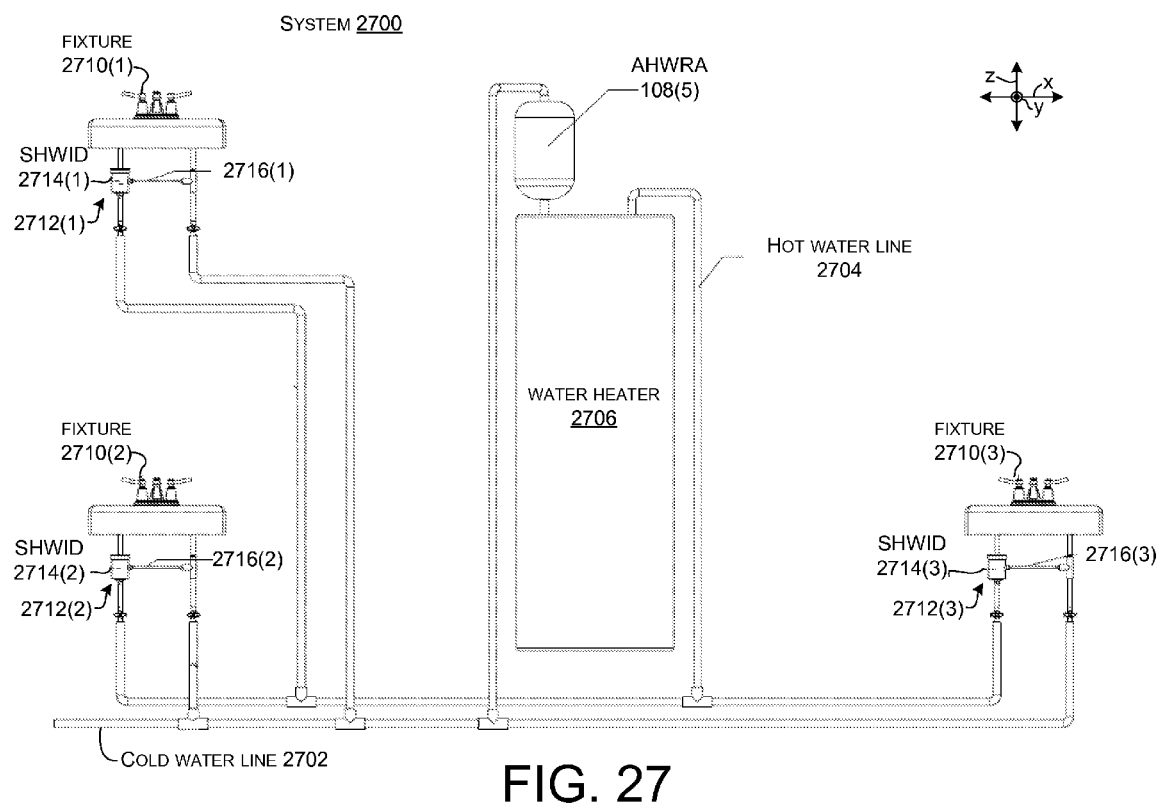
Figure 28:
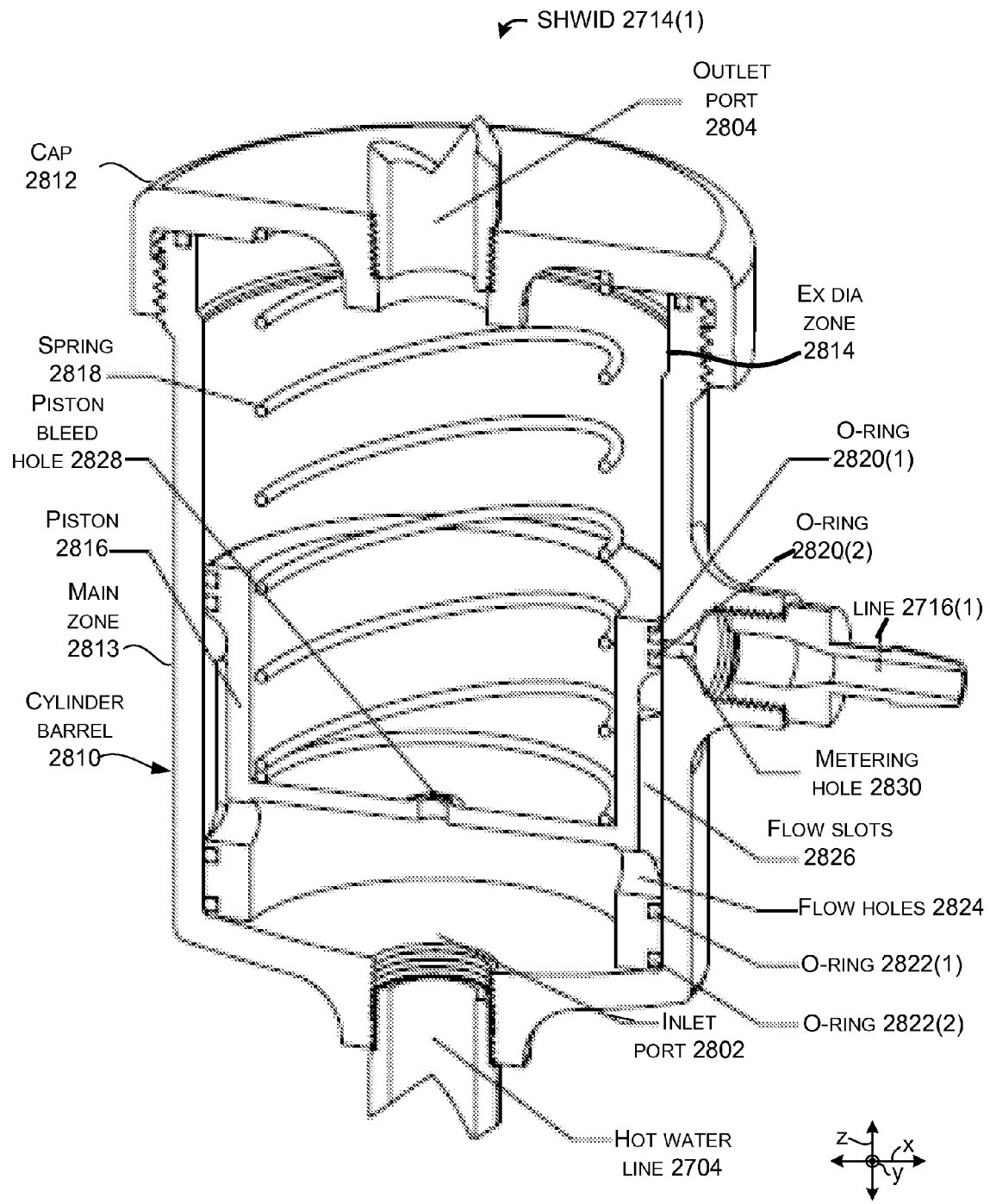

FIG. 27 shows a system 2700 to which the present hot water recovery concepts can be applied. Of course, system 2700 is provided for purposes of explanation and the present concepts can be applied to other systems. System 2700 includes a cold water line 2702, a hot water line 2704, water heater 2706, and an automatic hot water recovery apparatus (AHWRA) 108(5)). The hot water recovery apparatus is positioned in fluid flowing relation to the cold water line 2702 proximate to water heater 2706.

System 2700 also includes end use devices or fixtures 2710(1), 2710(2), and 2710(3), manifest as three faucets. Of course, other types of end use devices, such as dish washers and/or clothes washers can be employed. A cold water cross-over connection 2712 can be located proximate to one or more of the fixtures. In this example cold water cross-over connections are positioned proximate to each of the fixtures. Specifically, cold water cross-over connection 2712(1) is positioned proximate to fixture 2710(1), cold water cross-over connection 2712(2) is positioned proximate to fixture 2710(2), and cold water cross-over connection 2712(3) is positioned proximate to fixture 2710(3). In this case, the cold water cross-over devices are manifest as selective hot water isolation devices (SHWID) 2714(1), 2714(2), and 2714(3) and corresponding cold water cross-over lines 2716(1), 2716 (2), and 2716(3), respectively. The selective hot water isolation devices are positioned in fluid controlling relation between the cold water line and the hot water line proximate to the fixtures such that the selective hot water isolation devices can selectively allow water to flow from the cold water line into the cold water cross-over line through the selective hot water isolation device and into the hot water line. For instance, under a specific set of conditions, selective hot water isolation device 2714(1) can selectively allow water to flow from cold water line 2702 into the cold water cross-over line 2716(1) through the selective hot water isolation device 2714(1) and into the hot water line 2704. These conditions can include a first condition where hot water flows through the selective hot water isolation device for use at the corresponding fixture 2710(1). A second condition can be the cessation of the hot water flow through the selective hot water isolation device after hot water has been used at the corresponding fixture 2710(1).

Briefly, in operation, if hot water is drawn at fixture 2710(1), for instance, cold water can be allowed to flow to the hot water line 2704 by selective hot water isolation device 2714(1). However, cold water can be prevented from entering the hot water line 2704 through selective hot water isolation devices 2714(2) and 2714(3). Similarly, if hot water is drawn at fixture 2710(2) cold water can be allowed to flow to the hot water line 2704 by selective hot water isolation device 2714(2) but cold water can be prevented from entering the hot water line 2704 through hot water isolation devices 2714(1) and 2714(3). Further functioning of the selective hot water isolation devices is described below relative to FIGS. 28-48.

Selective Hot Water Isolation Device Examples

FIGS. 28-32 collectively illustrate example selective hot water isolation device 2714(1) in more detail. FIGS. 33-48 collectively illustrate second example selective hot water isolation device 2714(2) in more detail. FIGS. 49-67 collectively illustrate another example selective hot water isolation device 2714(4) and FIGS. 68-87 collectively illustrate still another example selective hot water isolation device 2714(5).

FIGS. 28-32 show sectional views of selective hot water isolation device 2714(1) and taken collectively illustrate the operation of the selective hot water isolation device. In this case, the selective hot water isolation device extends from a water heater end (e.g., inlet port) 2802 to a fixture end (e.g., outlet port) 2804 and couples to a cold water cross-over line (2716(1), FIG. 27). This selective hot water isolation device includes a cylinder barrel 2810 and a cap 2812. The cylinder barrel includes a main zone 2813 and an enlarged diameter upper zone 2814. A piston 2816 is positioned in the cylinder barrel 2810 and is biased by a spring 2818. Piston 2816 includes an upper pair of piston o-rings 2820(1) and 2820(2) and a lower pair of piston o-rings 2822(1) and 2822(2) as well as flow holes 2824, flow slots 2826, and piston bleed hole 2828. Piston 2816 can have an outside diameter that corresponds to an inside diameter of main zone 2813 such that the o-rings can create a seal therebetween. The selective hot water isolation device 2714(1) further includes a metering hole 2830.

Figures 29, 30:
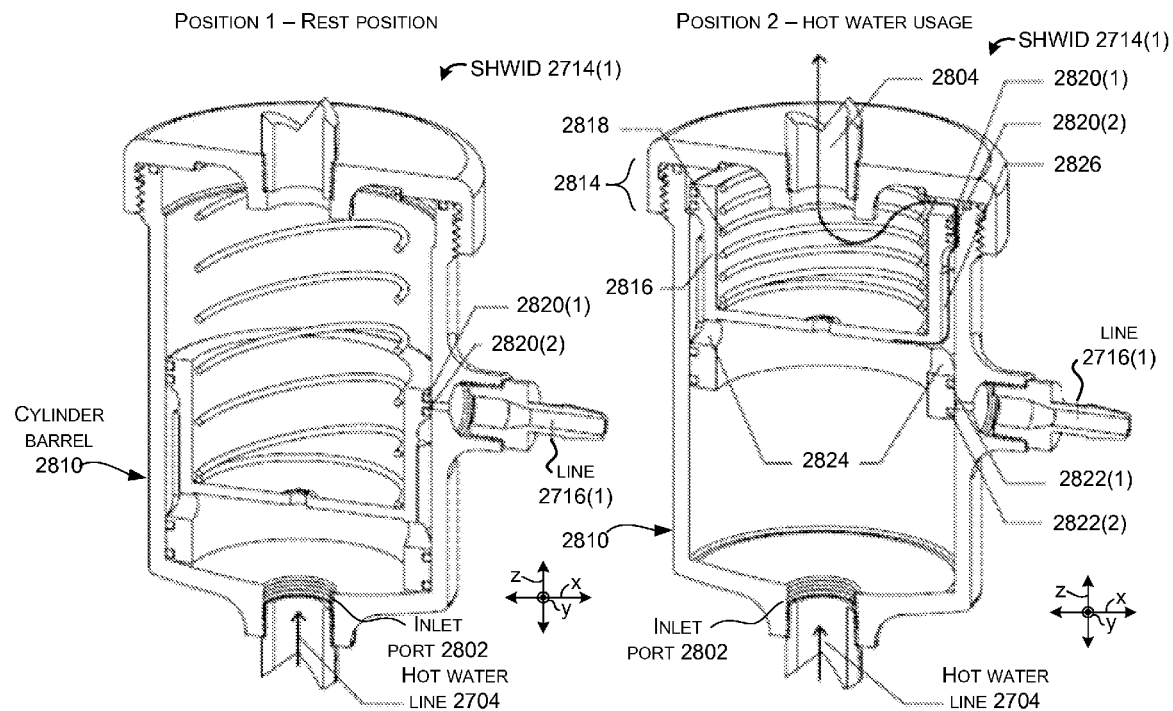

For purposes of explanation, FIGS. 29-32 show selective hot water isolation device 2714(1) in four operational positions (not all elements are labeled in each FIG. to avoid clutter). FIG. 29 shows Position 1 where the selective hot water isolation device 2714(1) is in the rest position. In this case, water from the cold water crossover line 2716(1) is prevented from flowing into the selective hot water isolation device by upper piston o-rings 2820(1) and 2820(2).

FIG. 30 shows Position 2 of selective hot water isolation device 2714(1) during hot water usage. In this case, when the hot water fixture (2710(1), FIG. 27) above the selective hot water isolation device is turned on, the piston 2816 moves upward and compresses the spring 2818. Water in the hot water line (2704, FIG. 27) freely flows through the flow holes 2824, through the flow slots 2826, around the upper o-rings 2820(1) and 2820(2) via the enlarged diameter upper zone 2814 of cylinder barrel 2810 and through the outlet port 2804 to the fixture. Water from the cold water crossover line 2716(1) is prevented from flowing into the selective hot water isolation device by the two lower piston o-rings 2822(1) and 2822(2).

Figure 31:
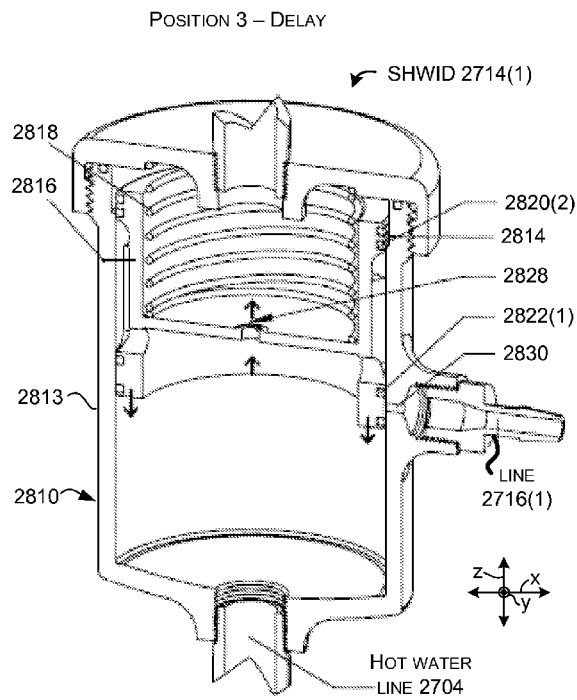

FIG. 31 shows Position 3 relating to cross-over delay of selective hot water isolation device 2714(1). In this case, when the hot water fixture is closed, the piston 2816 is forced downward by the spring 2818 until the o-ring 2820(2) contacts a top of the main zone 2813 of the cylinder barrel 2810. From this point the piston 2816 moves downward slowly. The rate of descent of the piston can be controlled by the restricted flow through the piston bleed hole 2828. Water from the cold water crossover line 2716(1) is prevented from flowing into the selective hot water isolation device until the o-ring 2822(1) gets past the metering hole 2830. The space between the o-ring 2822(1) and the metering hole 2830 serves to delay the cold water from entering the hot water isolation device, giving the user the opportunity to use hot water repeatedly, before the hot water line 2704 begins filling with cold water.

Figure 32:
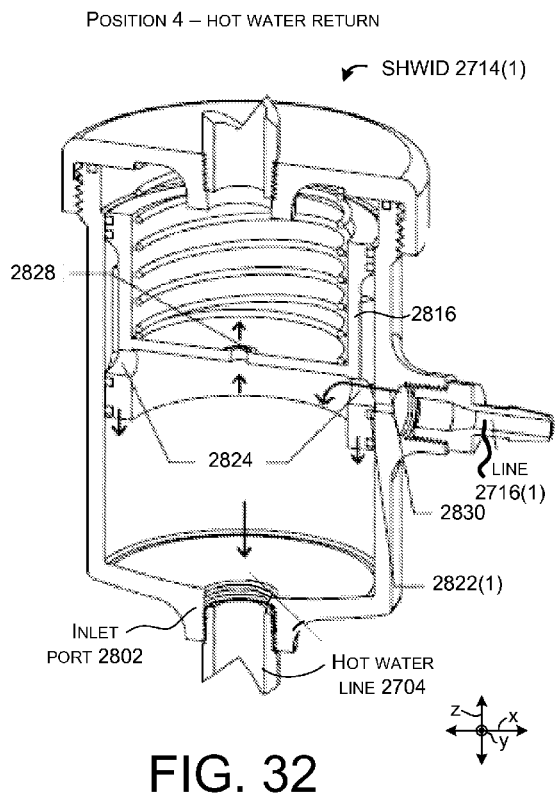

FIG. 32 shows Position 4 of selective hot water isolation device 2714(1) that involves hot water return. In this case, hot water return begins when the o-ring 2822(1) gets past the crossover metering hole 2830. Cold water is drawn by the automatic hot water recovery apparatus 108(5) (FIG. 27) through the metering hole 2830, through the lower piston flow holes 2824, and through the inlet port 2802 toward the water heater. The restricted flow through the bleed hole 2828 in the piston 2816 provides a sufficient period of time to enable the automatic hot water recovery apparatus 108(5) (FIG. 27) to return much or all of the stranded hot water in the hot water line 2704 (FIG. 27) to the water heater 2706 (FIG. 27) before the piston 2816 returns to the rest position of FIG. 29.

In summary, the above described selective hot water isolation device 2714(1) is one implementation of the present concepts. The selective hot water isolation device can be installed at any or all points of water use. In some implementations, the selective hot water isolation device only allows cold water to enter a hot water line when the cold water is needed to recover hot water. The selective hot water isolation device 2714(1) can isolate each hot water outlet, enabling a single automatic hot water recovery apparatus to draw back the hot water from pipes extending in different directions, allowing the recovery of the stranded hot water in the entire system. Alternatively or additionally, the selective hot water isolation device 2714(1) can provide a delay after hot water use before allowing the cold water cross-over to commence.

Figure 33:
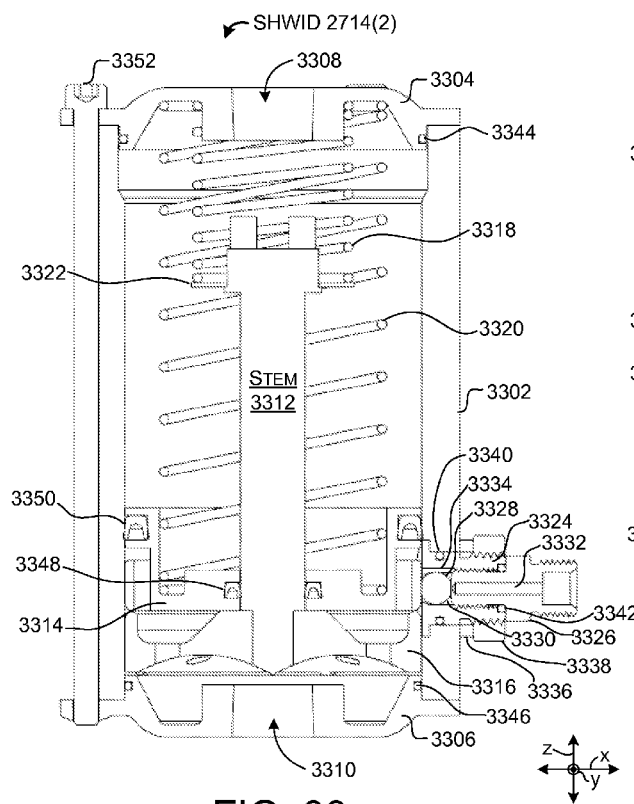
Figure 34:
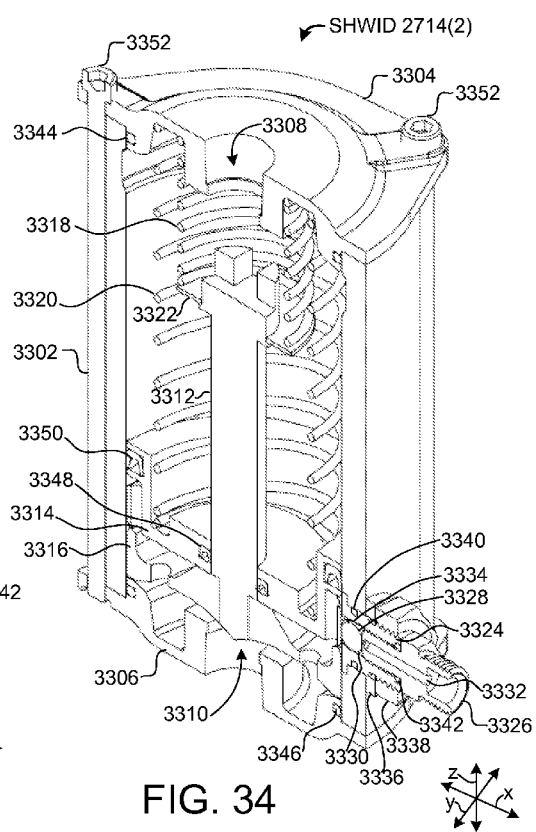
Figure 35:
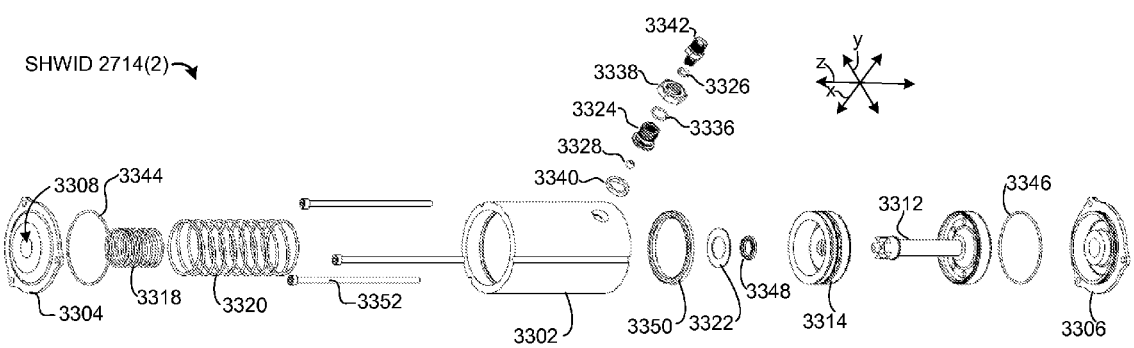
FIGS. 35, 51, and 70 show exploded perspective views of selective hot water isolation devices in accordance with some implementations.
Figure 36:
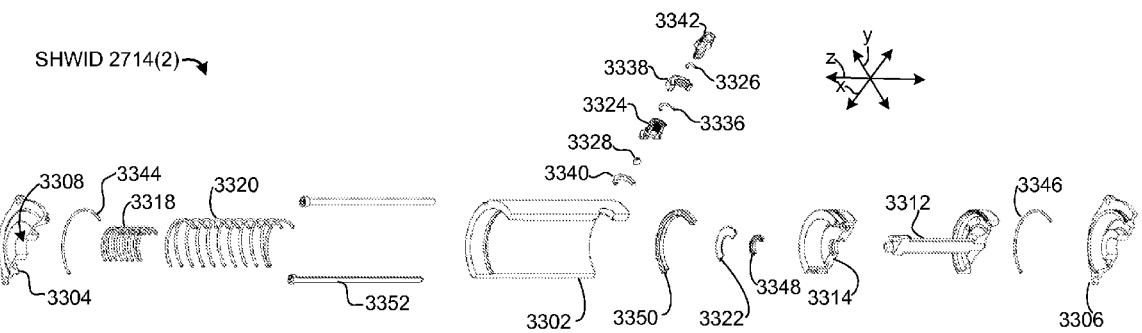
FIGS. 36, 52, and 71 show cut-away exploded perspective views of selective hot water isolation devices in accordance with some implementations.

FIGS. 33-48 show selective hot water isolation device 2714(2) and taken collectively illustrate the operation of the selective hot water isolation device. Further, the reader may have difficulty visualizing all of the components of selective hot water isolation device 2714(2) from a single view so several views are offered concurrently. FIG. 33 is a sectional view of the selective hot water isolation device, FIG. 34 is a cut-away perspective view. FIG. 35 is an exploded perspective view and FIG. 36 is a cut-away exploded perspective view. The remaining FIGS. are pairs of corresponding sectional and perspective views that illustrate various points of operation of the selective hot water isolation device 2714(2).

Selective hot water isolation device 2714(2) includes a cylindrical barrel 3302. First and second end caps 3304 and 3306 are secured at opposing ends of the barrel 3302. First end cap 3304 defines an outlet port 3308 that can be positioned toward the fixture. Second end cap 3306 defines an inlet port 3310 that can be positioned toward the water heater. Positioned within the barrel are a stem 3312, top and bottom pistons 3314 and 3316. A bottom piston spring 3318 is nested inside a top piston spring 3320. The bottom piston spring 3318 is retained between the first end cap 3304 and a stem lifter 3322 that extends radially outward from the stem 3312. The top piston spring 3320 is retained between the first end cap 3304 and the top piston 3314. A cross-over port 3324 is received in the barrel 3302. The cross-over port 3324 includes a cross-over adapter 3326 that is configured to receive the cross-over line (2716(2), FIG. 27). A ball 3328 is positioned in a space 3330 between a fluid passageway 3332 formed by the cross-over port 3324 and the inside of the barrel 3302 (e.g., the volume in which the pistons 3314 and 3316, and stem 3312 occupy). A second passageway 3334 is formed in the cross-over port 3324 proximate to the ball 3328. The cross-over port 3324 can be secured to the barrel 3302 with a washer 3336 and a nut 3338. A cross-over seal 3340 is positioned between the barrel 3302 and the cross-over port 3324. A cross-over port seal 3342 is positioned between the cross-over port 3324 and the cross-over port adapter 3326. Also, a first end cap seal 3344 is positioned between the first end cap 3304 and the barrel 3302 and a second end cap seal 3346 is positioned between the barrel 3302 and the second end cap 3306. A stem seal 3348 is positioned between the stem 3312 and the top piston 3314 and a barrel seal 3350 is positioned between the top piston 3314 and the barrel 3302. One or more bolts 3352 may be utilized to secure the first and second end caps 3304 and 3306 to the barrel 3302.

FIGS. 37-48 illustrate operating states of the selective hot water isolation device 2714(2). The elements of the selective hot water isolation device 2714(2) are designated above relative to FIGS. 33-36. As such, for ease of explanation only those elements which are discussed relative to individual FIGS. 37-48 are designated with particularity.

FIGS. 37 and 38 show the selective hot water isolation device 2714(2) in a resting or steady state configuration. At this point or position, the bottom piston 3316 is in contact with the inlet port 3310 and the second end cap 3306. The top piston 3314 is in contact with the bottom piston 3316. The top piston 3314 is also in contact with ball 3328 and applying a force on the ball parallel to the x-reference direction. The force on the ball blocks the fluid passageway 3332 so that no water flows from the cross-over line (FIG. 27) into the barrel 3302 of the selective hot water isolation device 2714(2). In this case, the ball 3328 can be a deformable ball such as a rubber ball. Unless acted upon by either of the top or bottom pistons (3314 and 3316) the ball 3328 protrudes slightly into the inside of the barrel 3302. In this configuration when one of the pistons pushes upon the ball 3328 parallel to the x-reference direction, the ball is pressed against a terminus 3702 of the passageway 3332 and the ball 3328 thereby blocks any (substantial) water flow from the terminus 3702 into the barrel 3302. Other configurations could utilize another type of valve mechanism. For instance, the ball could be rigid and the cross-over port 3324 could be somewhat deformable to allow slight movement of the ball parallel to the x reference axis when acted upon by an individual piston.

Figure 39:
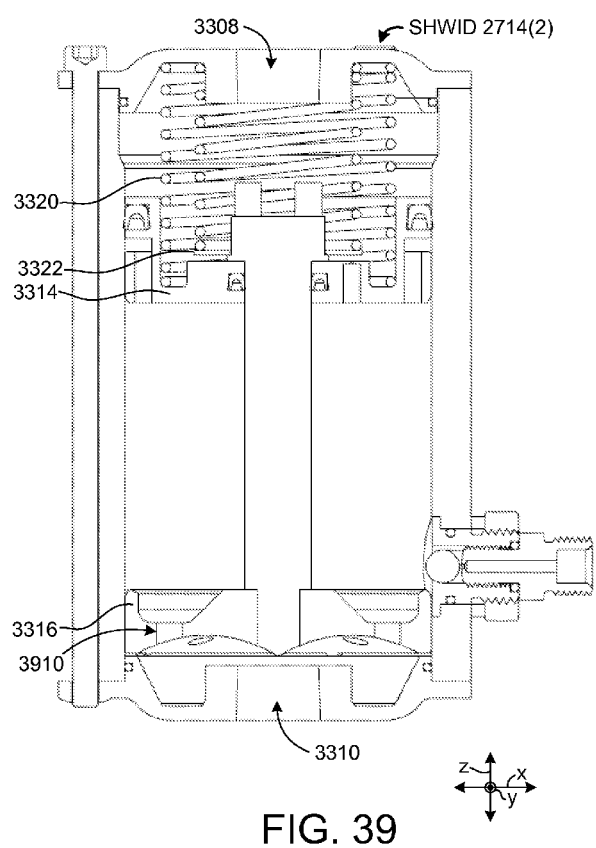
Figure 40:
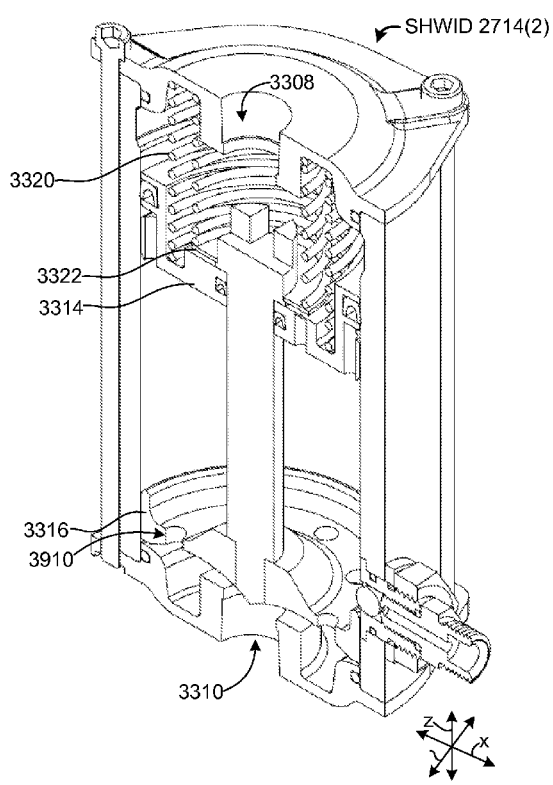

FIGS. 39-40 show the selective hot water isolation device 2714(2) upon hot water flow such as when a user turns on the hot water at fixture (2710(2) FIG. 27). In this scenario, pressure drops at the outlet port 3308. Water flows through the inlet port 3310 and then through holes 3910 (not all of which are designated with specificity) in the bottom piston 3316. This water overcomes the force of top piston spring 3320 and pushes the top piston 3314 upward until the top piston contacts the stem lifter 3322.

Figure 41:
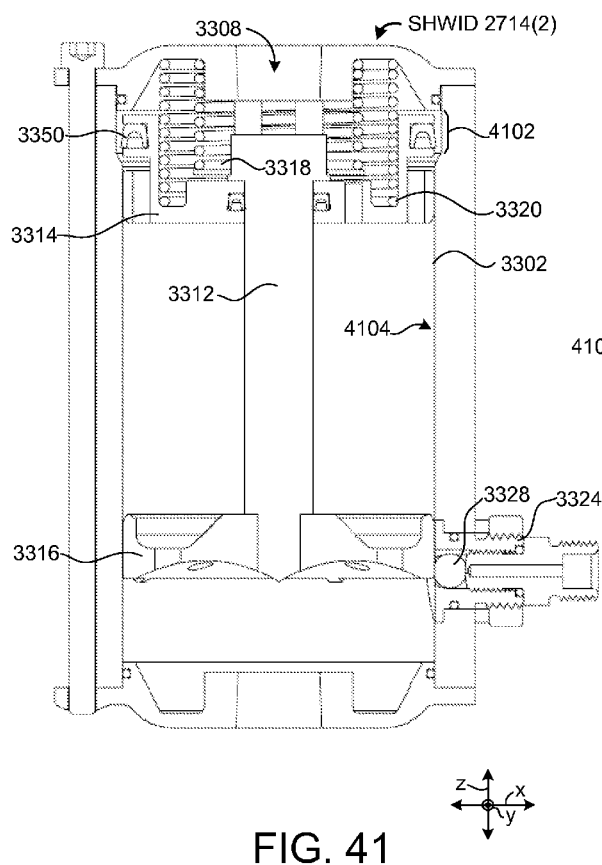
Figure 42:
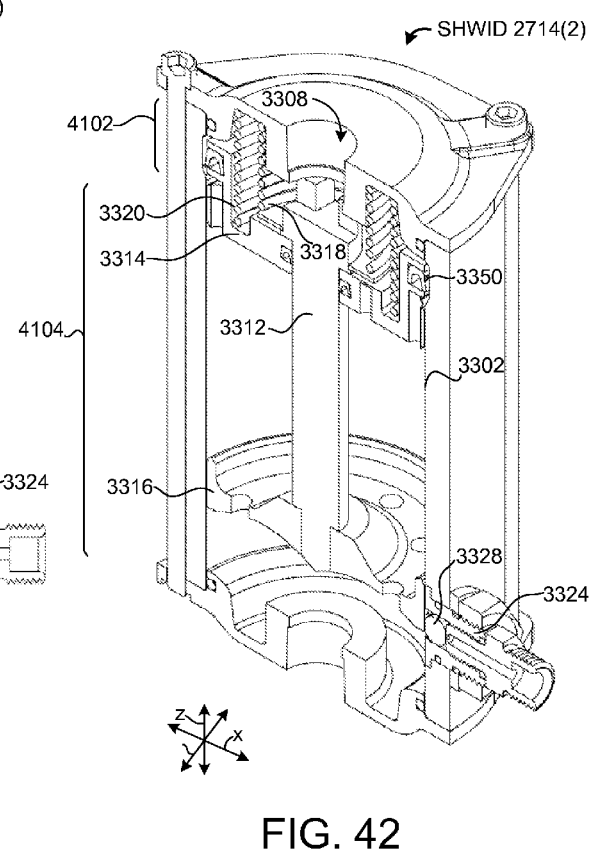

FIGS. 41-42 show the selective hot water isolation device 2714(2) as hot water continues to flow through the selective hot water isolation device 2714(2). The top piston 3314 continues to move upward and thereby moves the stem 3312 upwards. The stem 3312 is attached to the bottom piston 3316 so upward movement of the stem moves the bottom piston upward. The upward movement further compresses the top piston spring 3320 and the bottom piston spring 3318. The bottom piston 3316 contacts the ball 3328 and forces the ball outward (parallel to the x reference axis). The ball 3328 blocks flow into the barrel 3302 from the cross-over port 3324. The barrel seal 3350 of the top piston 3314 passes over an upper portion 4102 of the barrel 3302 that has a larger inside diameter than a remainder 4104 of the barrel. Water can then pass around the outside edge of the top piston and out of the outlet port 3308.

FIGS. 43-44 show the selective hot water isolation device 2714(2) when the hot water flow stops (e.g., the user shuts off the hot water). At this point, the pressure equalizes at the inlet port 3310 and the outlet port 3308. Both of the top piston spring 3320 and the bottom piston spring 3318 act on the pistons and force the top piston 3314 and the bottom piston 3316 to move downward. The pistons move downwardly at a relatively fast rate until the barrel seal 3350 of the top piston contacts the narrower remainder 4104 of the barrel 3302. The bottom piston 3316 continues to apply pressure on the ball 3328 and thereby prevents water from entering the barrel 3302 from the cross-over port 3324. In summary, the selective hot water isolation device 2714(2) prevented cold water from the cold water cross-over from entering the barrel 3302. Now initially after the hot water usage, the cold water cross-over can continue to be blocked by the lower piston 3316. The lower piston controls water flow from the cross-over port. As such, the cross-over water flow does not start (e.g., is delayed) until the lower piston drops below the ball. As discussed below, the cross-over water flow then continues until the upper piston acts on the ball.

Figure 45:
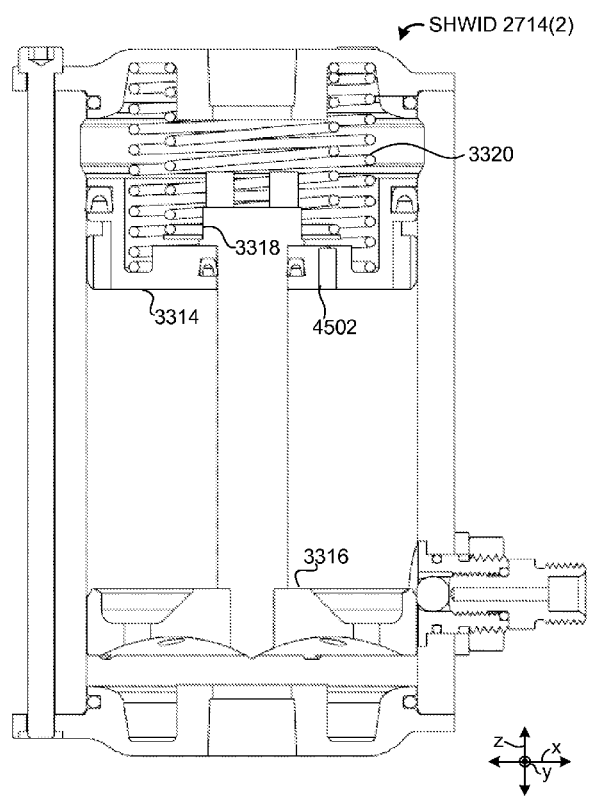
Figure 46:
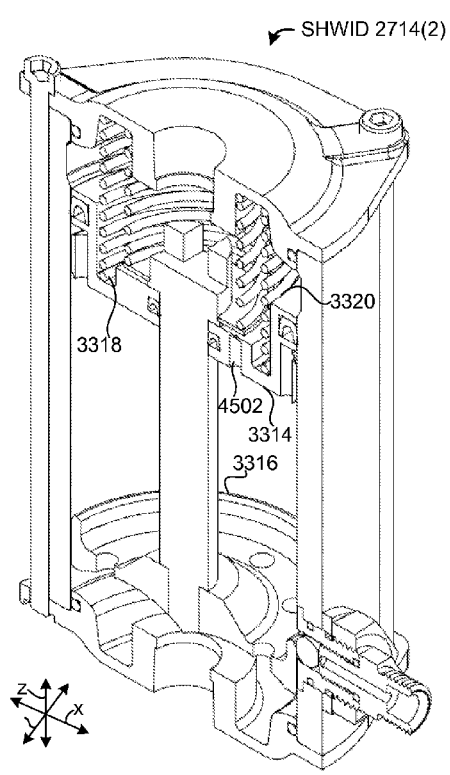

FIGS. 45-46 show the selective hot water isolation device 2714(2) at a later point after hot water usage stopped. In this scenario, the piston springs 3318 and 3320 continue to apply downward pressure to the pistons 3316 and 3314, respectively. The rate of downward movement is regulated by the size of a bleed hole 4502 in the top piston 3314. The bottom piston can only move downward at the rate allowed by the bleed hole 4502. Depending on the dimensions of the selective hot water isolation device 2714(2) the bleed hole 4502 can be quite small and could be blocked by contaminants, such as sand. As such, a filter can be positioned around the bleed hole to reduce the likelihood of a blockage.

Figure 47:
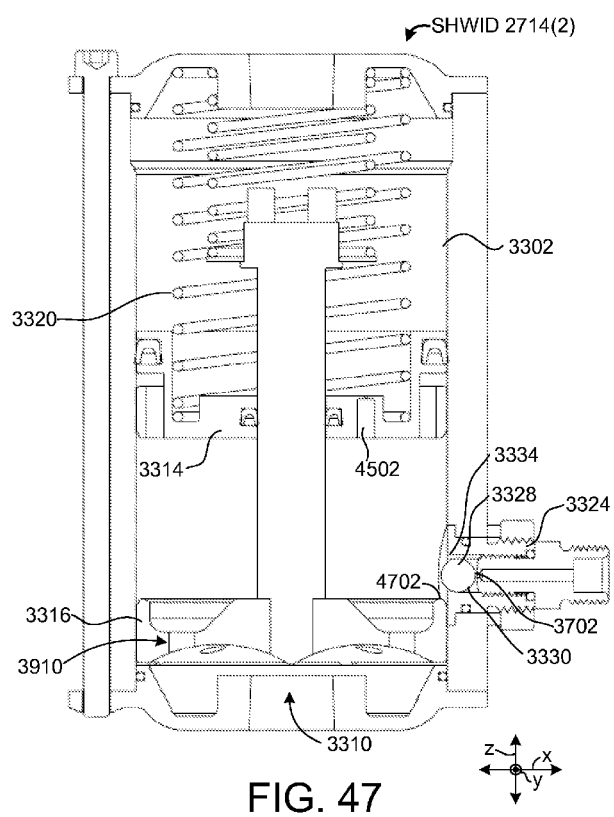
Figure 48:
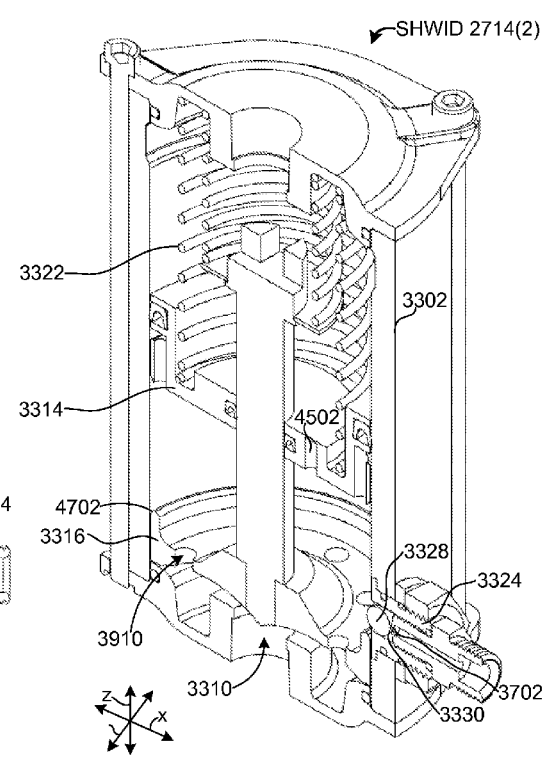

FIGS. 47-48 show the selective hot water isolation device 2714(2) at a later point after the cold water cross-over delay discussed above relative to FIGS. 43-46. In this scenario water return timing is controlled by a timing (upper) surface 4702 of the bottom piston 3316 clearing ball 3328 of the cross-over port 3324. At this point, water is allowed to flow from the cross-over port into the barrel 3302 and then through the holes 3910 in the bottom piston 3316 and out the inlet port 3310. More specifically, since the ball 3328 is not forced against terminus 3702, water pressure from the cross-over line can cause water to flow through the terminus 3702 into space 3330 that houses the ball. The water can flow around the ball by flowing from space 3330 into second passageway 3334 the opposite end of which empties into barrel 3302.

The top piston spring 3320 still acts on the top piston 3314. The travel of the top piston 3314 is regulated by the size of the bleed hole 4502. When the top piston 3314 descends to contact the ball 3328 the cross-over port 3324 is closed. The selective hot water isolation device 2714(2) is now at rest (see FIG. 33).

Figures 49, 50:
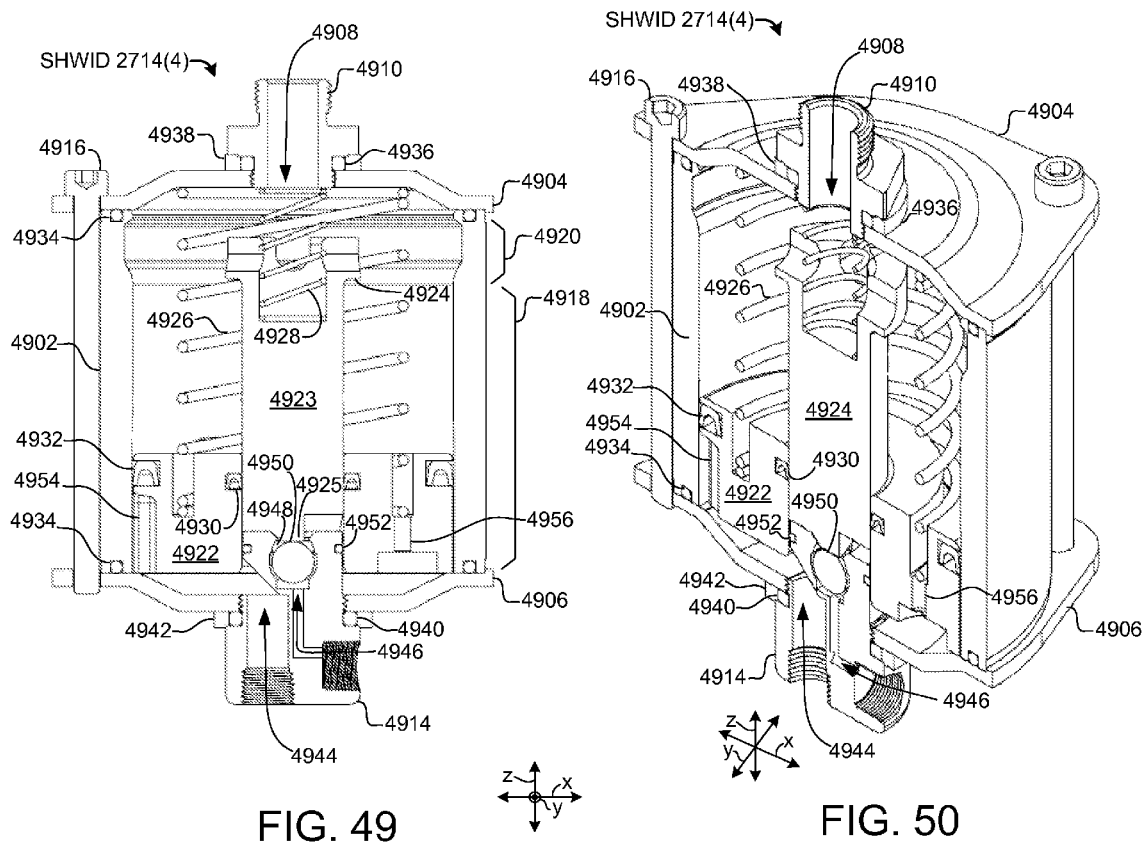
Figure 51:
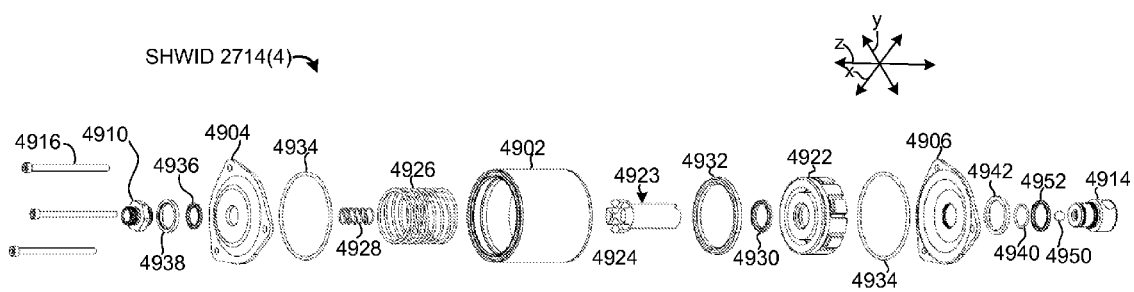
Figure 52:
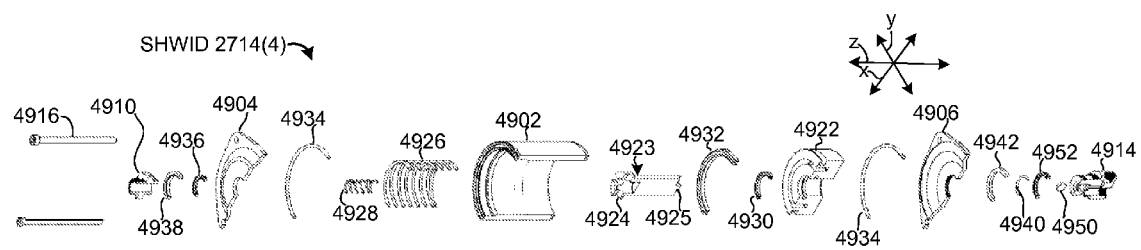
Figure 53:
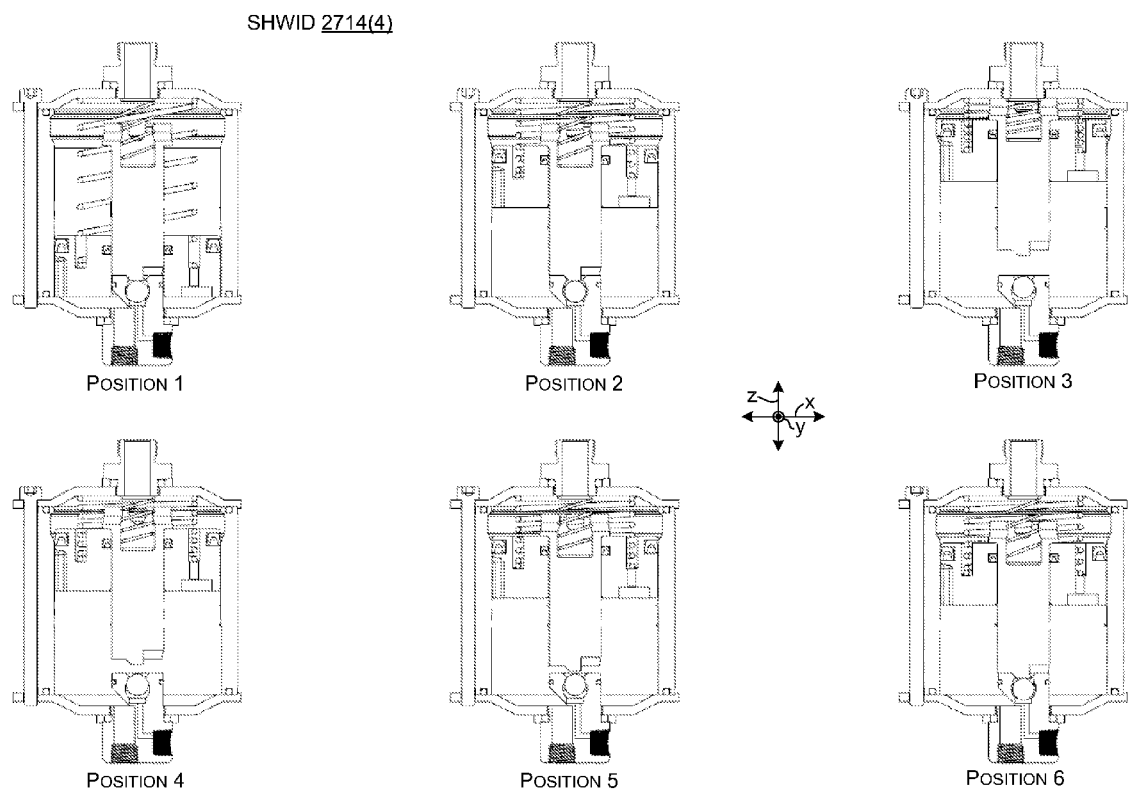

FIGS. 49-67 show another selective hot water isolation device 2714(4) and taken collectively illustrate the operation of the selective hot water isolation device. Further, the reader may have difficulty visualizing all of the components of selective hot water isolation device 2714(4) from a single view so several views are offered concurrently. FIG. 49 is a sectional view of the hot water isolation device, FIG. 50 is a cut-away perspective view. FIG. 51 is an exploded perspective view and FIG. 52 is a cut-away exploded perspective view. FIG. 53 shows six operational positions (e.g., positions 1-6) of selective hot water isolation device 2714(4). These positions are shown and discussed in more detail relative to FIGS. 54-67.

Selective hot water isolation device 2714(4) includes a barrel 4902. First and second end caps 4904 and 4906 are secured at opposing ends of the barrel 4902. First end cap 4904 defines an outlet port 4908. A top fitting 4910 is secured to the first endcap 4904 at the outlet port 4908 and can be positioned toward the fixture. A crossover port or valve 4914 is secured to the second endcap 4906. The barrel 4902 and the end caps 4904 and 4906 can be secured together by one or more bolts 4916, and or by other mechanisms. A majority 4918 of the barrel has a first width and an upper portion 4920 of the piston has a second greater width. Positioned within the barrel 4902 are a piston 4922 and a stem 4923.

The stem includes a stem lifter 4924 and a generally opposing protuberance 4925. A piston spring 4926 acts upon the piston 4922 and a stem spring 4928 acts upon the stem 4923. A stem seal 4930 is positioned between the stem 4923 and the piston 4922. A piston seal 4932 is positioned between the piston and the barrel 4902. Barrel seals 4934 are positioned to seal fluid leakage between the barrel 4902 and the top and bottom caps 4904 and 4906, respectively. A top fitting seal 4936 and a brass washer 4938 are positioned between the top fitting 4910 and the top cap 4904 to seal fluid leakage. Similarly, a bottom fitting seal 4940 and a brass washer 4942 are positioned between the crossover valve 4914 and the bottom cap 4906.

The crossover port 4914 defines first and second fluid passageways 4944 and 4946, respectively. The first fluid passageway 4944 is configured to be connected to the hot water line. In this example, the first fluid passageway is threaded to securely receive the hot water line. The first fluid passageway 4944 extends from the hot water line through the crossover port and terminates under the piston 4922. The second fluid passageway 4946 is configured to be connected to the cold water cross-over line. In this example, the second fluid passageway 4946 is threaded to receive the cold water crossover line. An opposite end of the second fluid passageway terminates in line with the protuberance 4925 of the stem 4923. The second fluid passageway includes a portion 4948 that is sized to receive a ball 4950, such as a resilient rubber ball. The ball 4950 can be contacted by the stem 4923 when the stem is in its downward most position as illustrated in FIG. 49. A crossover seal 4952 is positioned on the crossover valve 4914 to contact the piston 4922. The piston also includes two fluid passageways 4954 and 4956.

Figure 54:
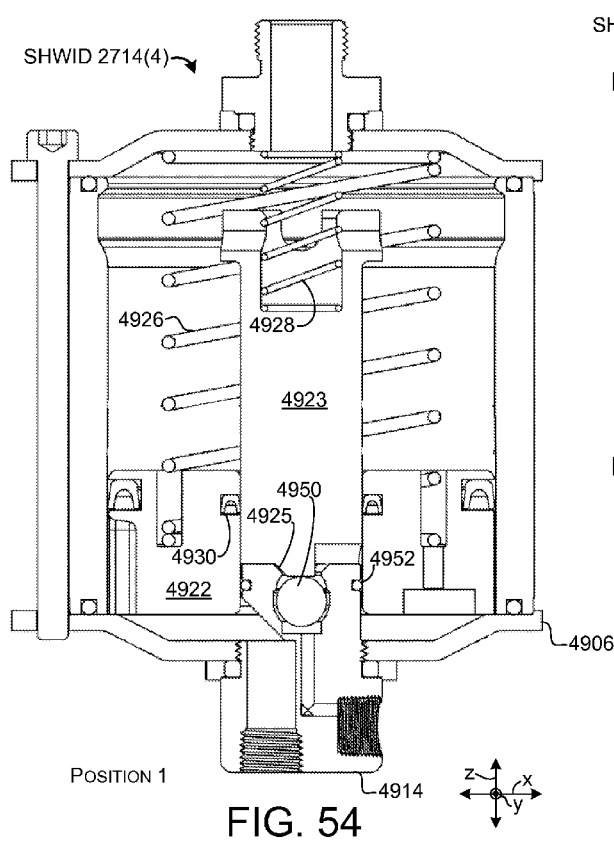
Figure 55:
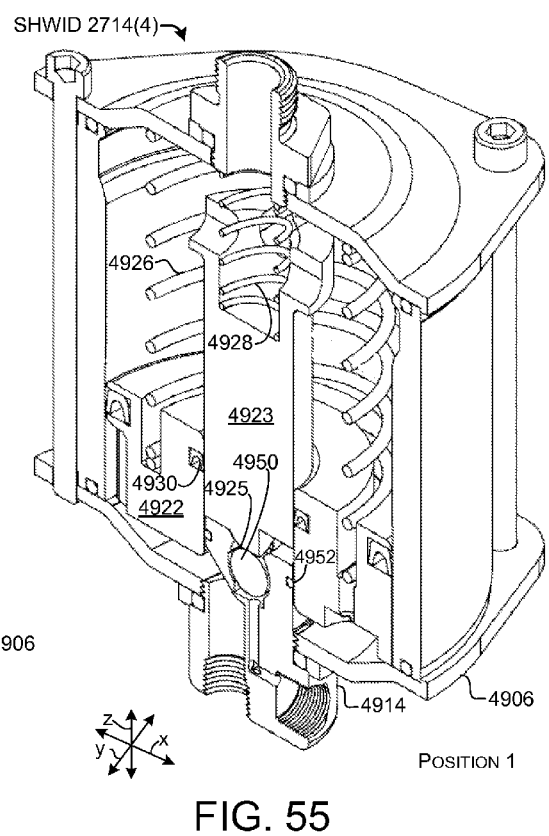

Operational description of selective hot water isolation device 2714(4) begins at Position 1 which is illustrated in FIGS. 53-55. Position 1 can be thought of as a rest position where there is no flow through the hot water line (see discussion relative to FIG. 27). As such, the water pressure is generally uniform throughout the selective hot water isolation device 2714(4) (e.g., on the inlet and outlet sides). In this condition, the piston spring 4926 forces the piston 4922 downward against the second end cap (e.g., bottom cap) 4906. Similarly, the stem spring 4928 forces the stem 4923 downward so that protuberance 4925 contacts the ball 4950. The piston 4922 is contacting the crossover seal 4952 and the stem seal 4930 is sealing between the piston 4922 and the stem 4923. Thus, the cold water is isolated in the second fluid passageway 4946 of the crossover valve 4914.

Figure 56:
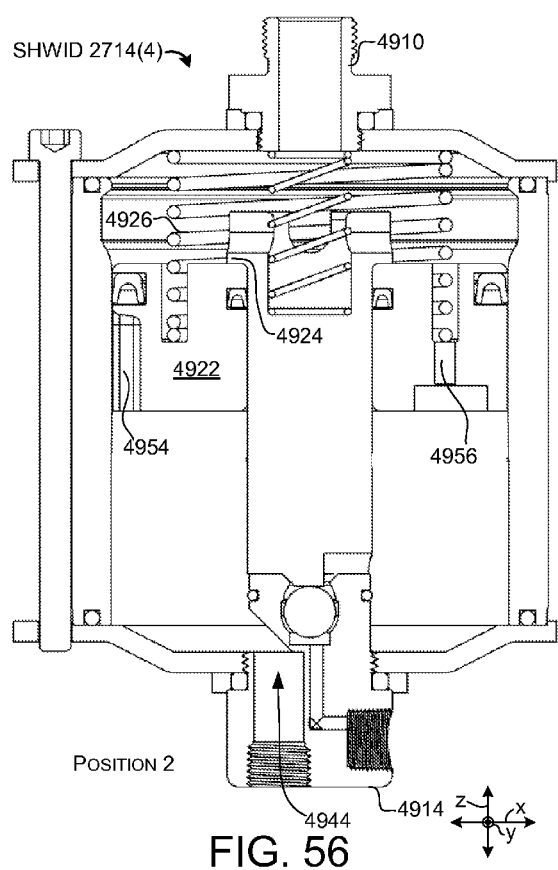
Figure 57:
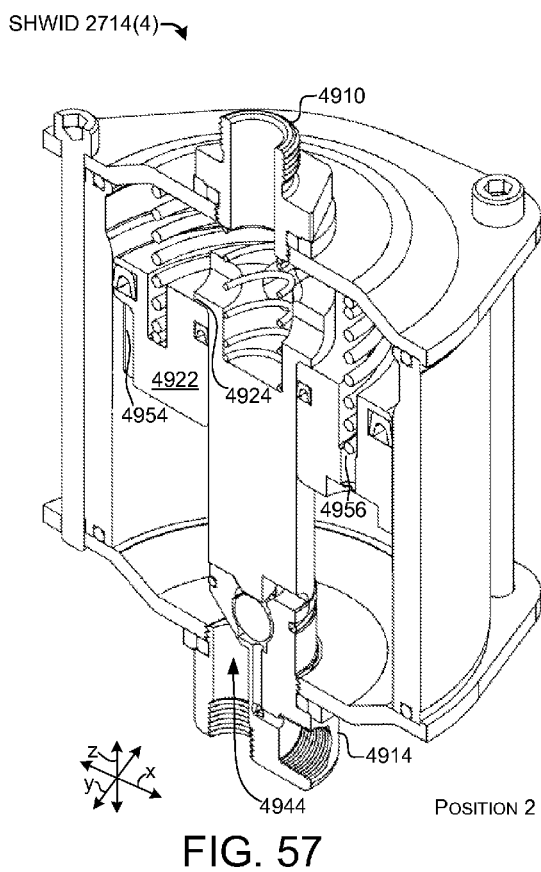
Figure 58:
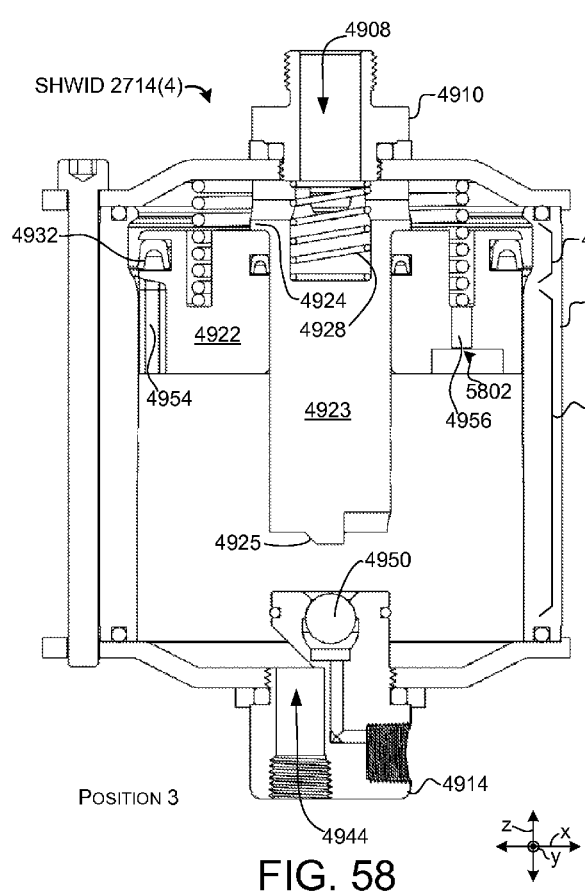
Figure 59:
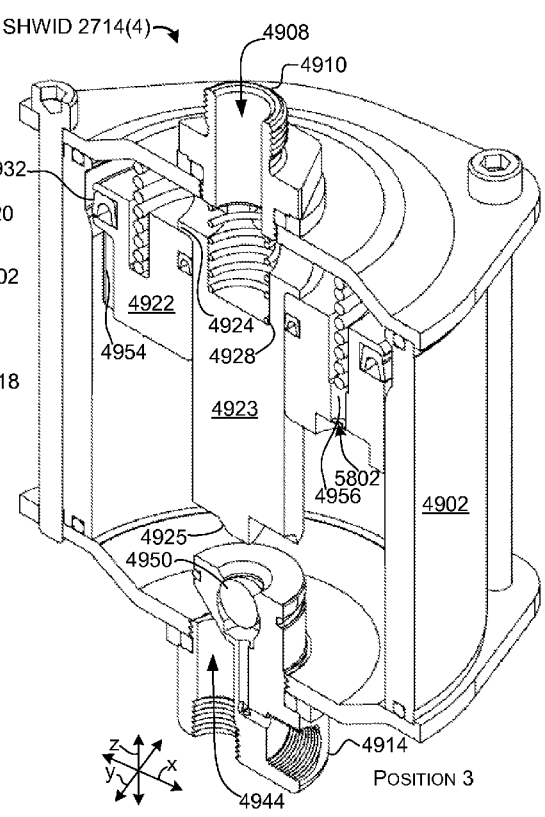
Figure 60:
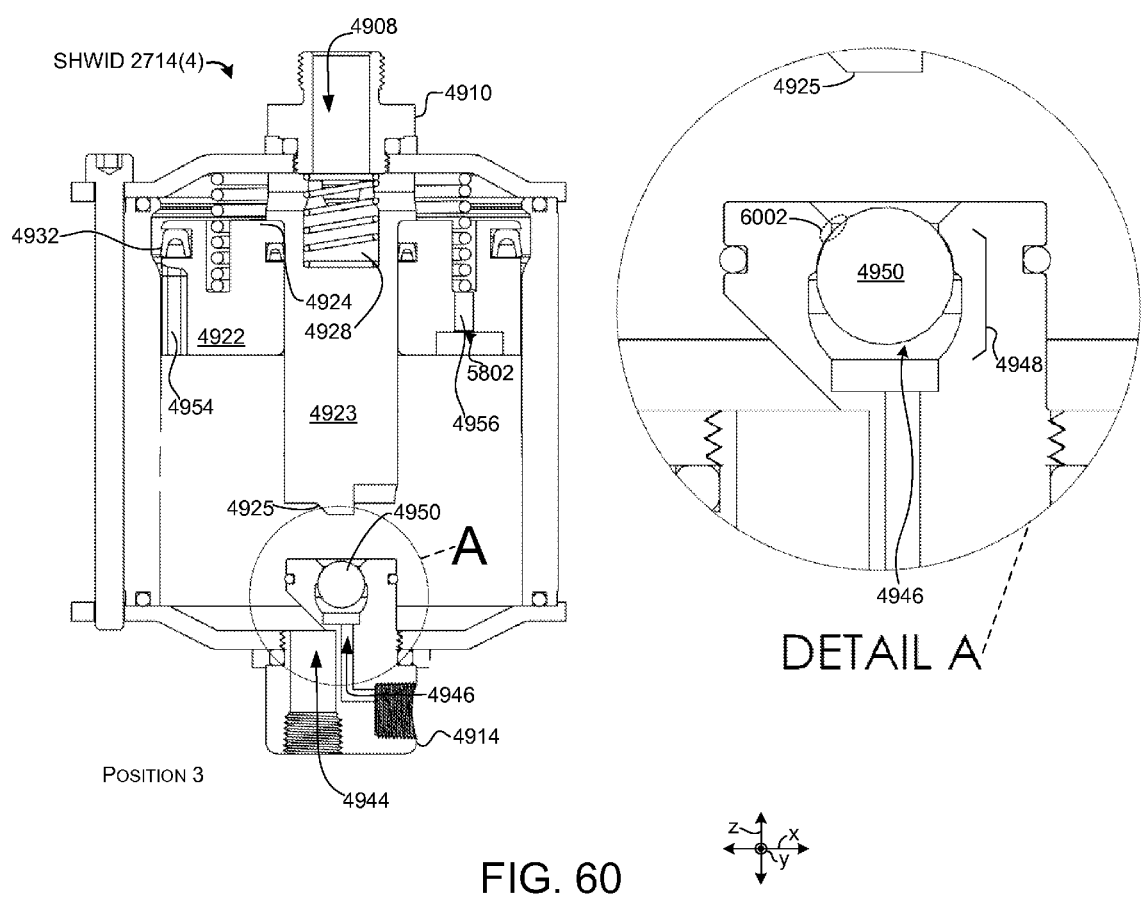

Position 2 can be seen in FIGS. 53 and 56-57. Position 2 occurs when hot water is turned on (such as at an associated fixture positioned downstream of the selective hot water isolation device 2714(4)). The pressure drops at the top fitting 4910 (e.g., outlet port) when the hot water is turned on. This drop in pressure allows water to flow through the first fluid passageway 4944 (connected to the hot water line) of the crossover valve 4914. This water can overcome force exerted by the piston spring 4926 on the piston 4922 and the water can push the piston upward until the piston contacts the stem lifter 4924. Note that during Position 2 a relatively small amount of hot water can pass through the piston via fluid passageway 4956 and essentially no hot water can flow through fluid passageway 4954.

Position 3 can be seen in FIGS. 53 and 58-60. In Position 3 hot water flows through the selective hot water isolation device 2714(4) from the hot water line through the first fluid passageway 4944, into the barrel 4902. From the barrel, the hot water can enter the piston 4922 via fluid passageway 4954. The hot water can then travel around the piston seal 4932 via the cylinder's upper portion 4920, into the top fitting 4910, and the outlet port 4908. During this process, the piston 4922 continues to move upward and, via contact with the stem lifter 4924, the piston pulls the stem 4923 upward and compresses the stem spring 4928. Note that Position 3 (and the other Positions) is illustrated by static Figures when in fact the elements are moving. As such, not every feature can be illustrated. For instance, hot water does not flow freely through the selective hot water isolation device 2714(4) until the piston has moved upward to the point that piston seal 4932 is proximate to upper portion 4920 rather than the majority 4918 of the barrel 4902. Note also that there is some hot water movement through fluid passageway 4956 at Position 3, however, this flow is relatively small compared to the flow through fluid passageway 4954 once the piston seal 4932 is proximate the cylinder's upper portion 4920. The flow through fluid passageway 4956 can be purposely constrained to limit water flow. In this case, the flow rate through fluid passageway 4956 is constrained by a small diameter opening (e.g., bleed hole) 5802 in the fluid passageway 4956. In this case, the diameter is measured parallel to the xy reference plane and extends in the z reference direction. Other constraining mechanisms can be employed to produce similar results.

When the piston 4922 pulls the stem 4923 upward, the stem protuberance 4925 no longer contacts the ball 4950. As such, there is now unequal pressure on either side of the ball 4950. The lower side of the ball (as oriented on the drawing page) has higher pressure applied to it via water pressure from the coldwater crossover line connected to the second fluid passageway 4946. This aspect is more readily appreciated from the enlarged view of the ball 4950 and crossover valve 4914 shown in FIG. 60.

The higher pressure generated by the cold water forces the ball 4950 against the top of the portion 4948 (e.g., cavity, see FIG. 60) of the second fluid passageway 4946 as indicated at 6002. The ball 4950 effectively seals against a diameter at the top 6002 of the portion 4948 and thereby prevents cold water from flowing through or from the second fluid passageway 4946 into the barrel 4902.

Figures 61, 62:
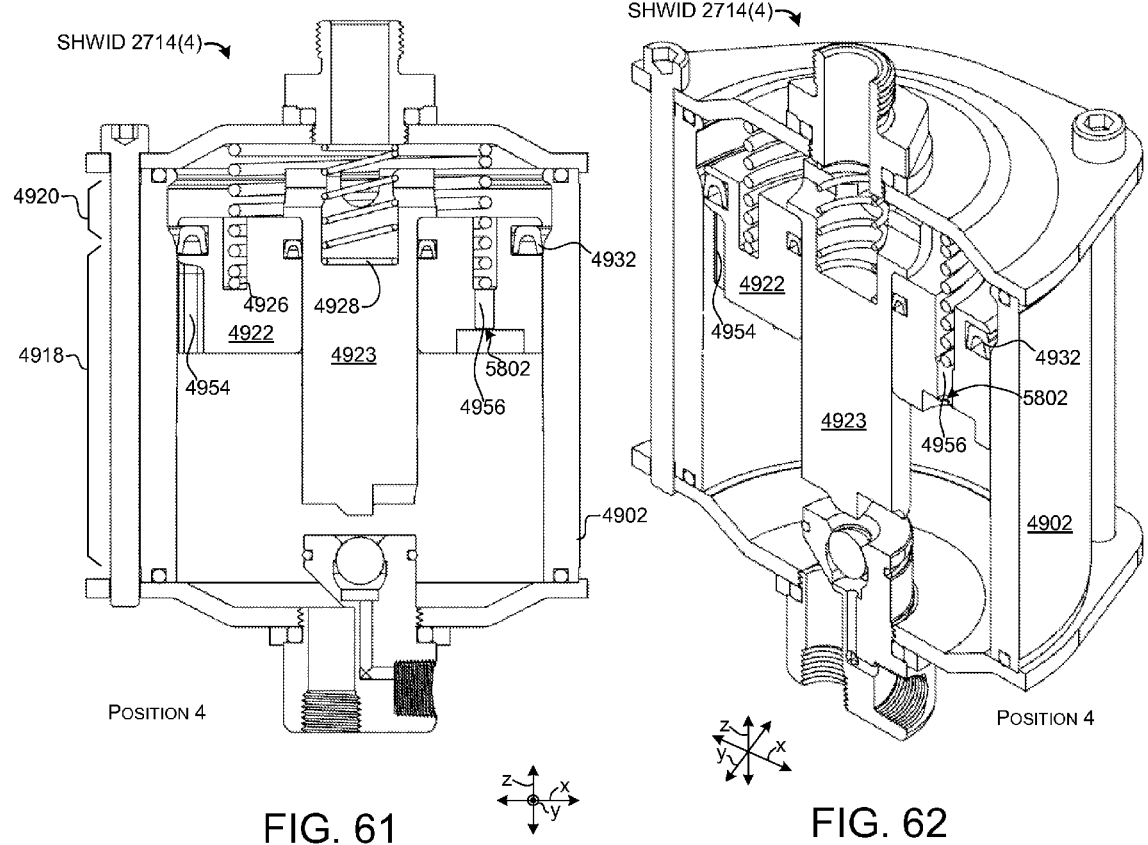

Position 4 can be seen in FIGS. 53 and 61-62. Position 4 occurs when the hot water flow stops, such as when a user closes the hot water tap of an associated fixture. In this case, pressure equalizes in the selective hot water isolation device 2714(4) when the hot water flow stops. As a result, the piston spring 4926 and the stem spring 4928 that were compressed by the pressure differential begin to expand and push the respective piston 4922 and stem 4923 downward. The piston and stem move downward at a relatively fast rate while the piston seal 4932 is proximate the upper portion 4920 of the cylinder since water can flow around the piston seal. Once the piston moves downward such that the piston seal 4932 contacts the majority 4918 of the cylinder the downward movement is slowed since water flow through the piston is limited to fluid passageway 4956. Recall that fluid passageway 4956 is purposely constrained by bleed hole or opening 5802 and thus downward movement of the piston 4922 is limited by the size of opening 5802 relative to the volume of the barrel 4902.

Figure 63:
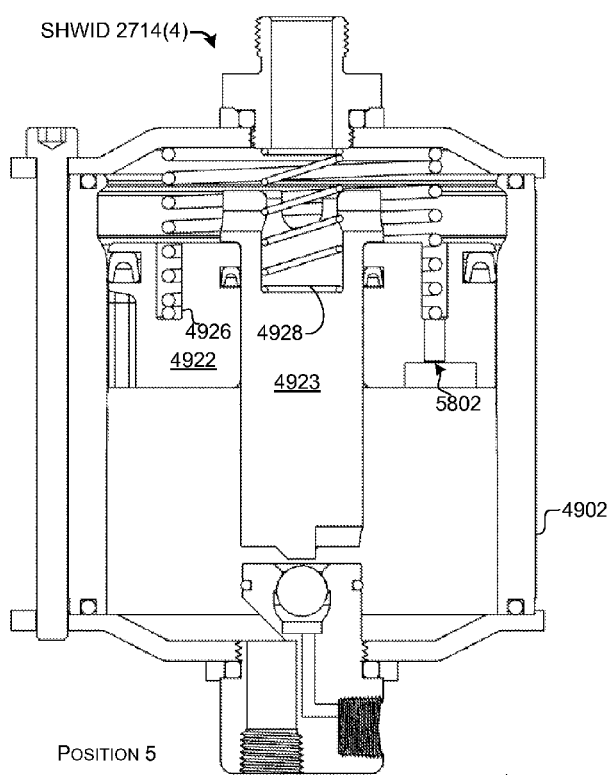
Figure 64:
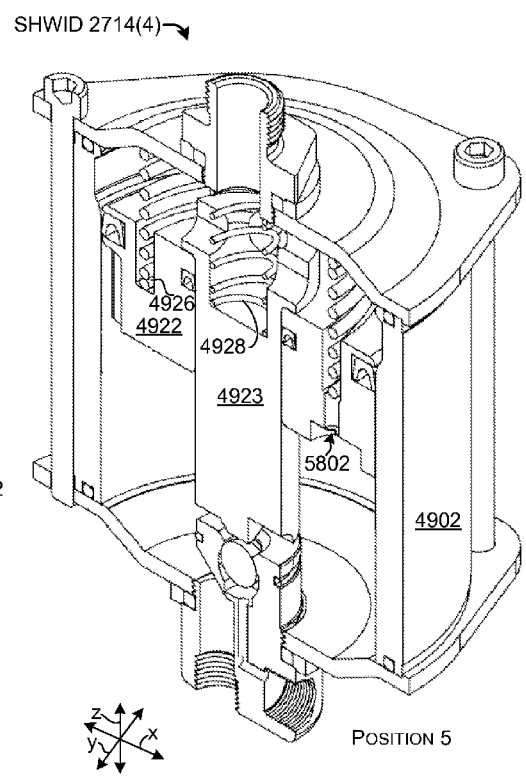
Figure 65:
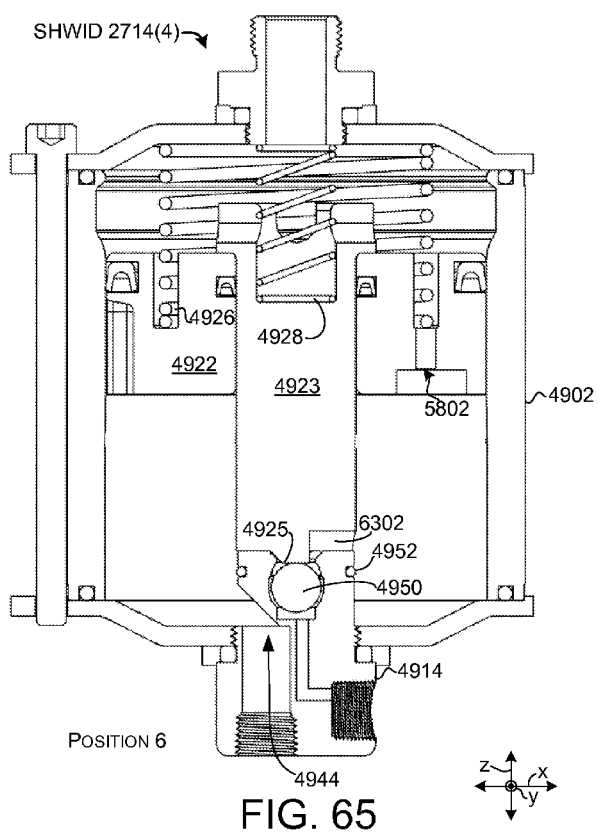
Figure 66:
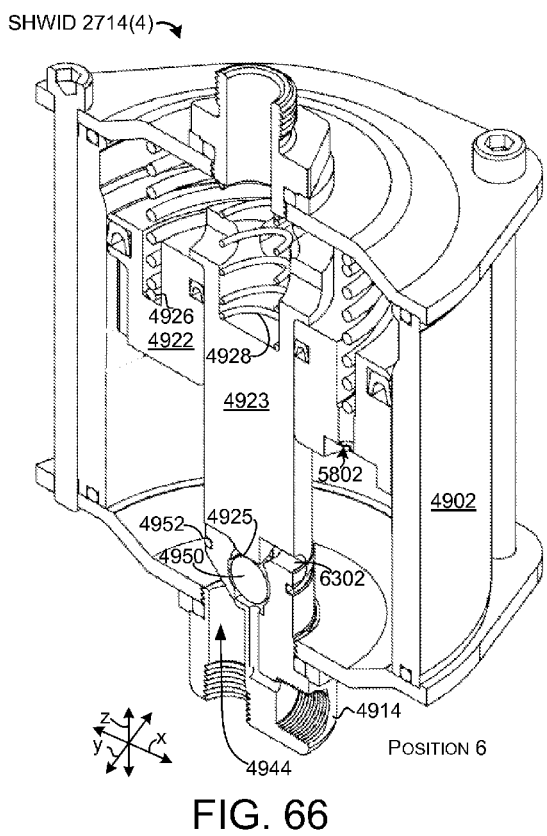
Figure 67:
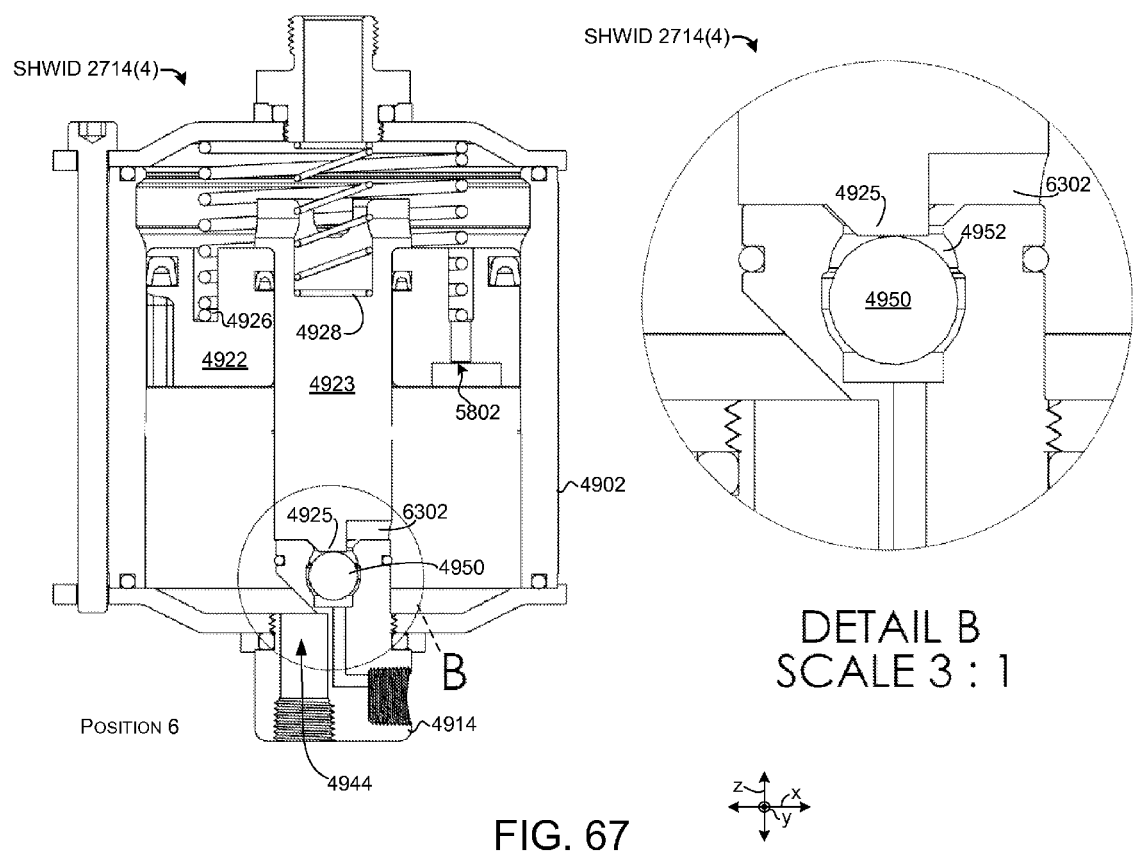

Position 5 can be seen in FIGS. 53 and 63-64. In Position 5 the piston spring 4926 and the stem spring 4928 continue to apply downward pressure on the piston 4922 and stem 4923. The rate of downward movement of the piston and stem is regulated by the size of the bleedhole opening 5802. Stated another way, the piston can move downward at a rate determined by opening 5802. The delay described above relative to Position 5 can be thought of as a delay before cold water crossover starts. This delay is useful in situations where the user is turning the hot water on and off, such as may be encountered when shaving or doing the dishes. The duration of this delay can be predetermined based upon the relationship between the water flow rate through opening 5802, the volume of the barrel 4902, and/or spring forces.

Position 6 can be seen in FIGS. 53 and 65-67. In Position 6 the piston spring 4926 and the stem spring 4928 cause the piston 4922 and stem 4923 to move downward until the stem's protuberance 4925 comes back into contact with ball 4950. The protuberance pushes the ball slightly downward which allows cold water to flow around the ball into the stem and out of a stem slot 6302 into the barrel 4902 and finally the first fluid passageway 4944 and the hot water line. Meanwhile, the piston spring 4926 continues to act on the piston 4922. As explained above, the downward movement of the piston is constrained by opening 5802. After a delay time, which can be predetermined based upon cylinder barrel volume, spring force and area of opening 5802, the piston descends to contact the crossover seal 4952. This event effectively closes or shuts off the crossover valve 4914 (e.g., returns to Position 1). The delay time associated with Position 6 can determine how much cold water is allowed to flow from the cold water line to the hot water line before returning to the steady state of Position 1.

FIGS. 68-87 show another selective hot water isolation device 2714(5) and taken collectively illustrate the operation of the selective hot water isolation device. Selective hot water isolation device 2714(5) is similar to selective hot water isolation devices described above relative to FIGS. 27-67. For sake of brevity components which are substantially similar are not reintroduced here and instead a suffix "A" is used to distinguish components of selective hot water isolation device 2714(5) from those of selective hot water isolation device 2714(4). For instance, in the present implementation, the barrel is referred to as 4902A to distinguish from barrel 4902 of selective hot water isolation device 2714(4).

Figures 68, 69:
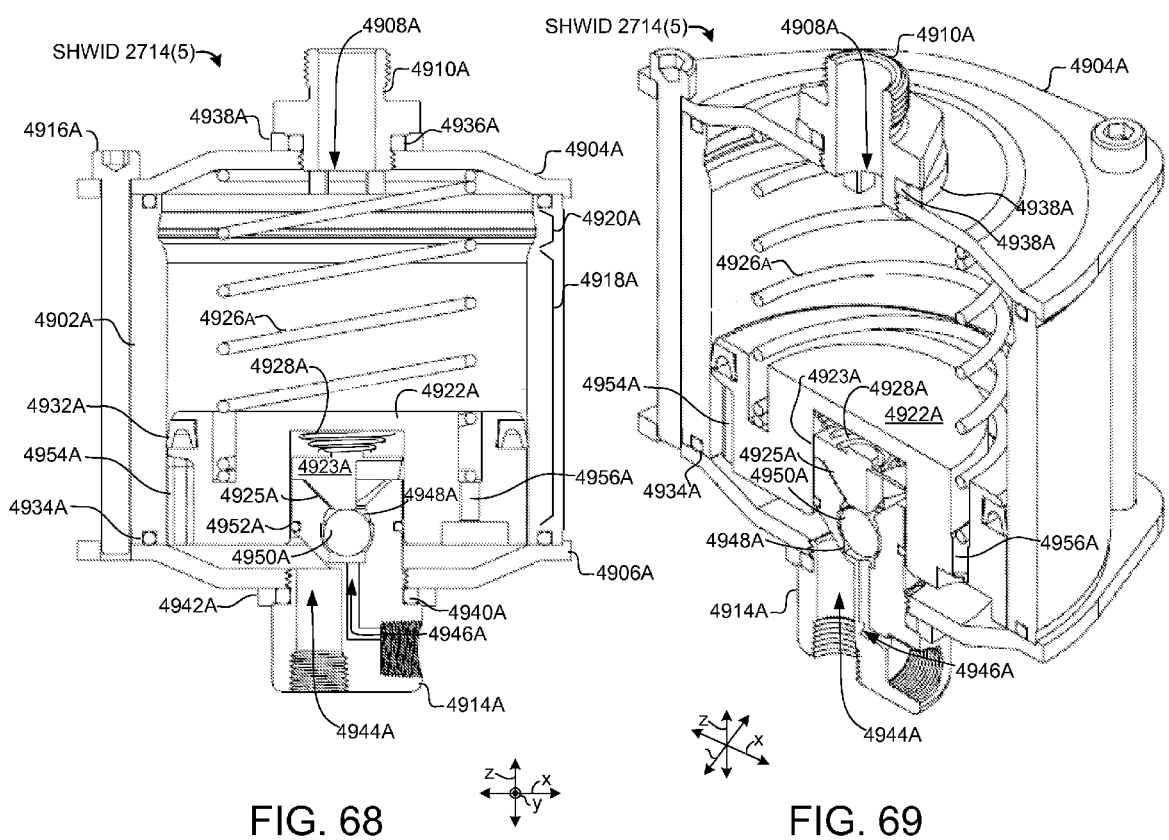
Figure 70:
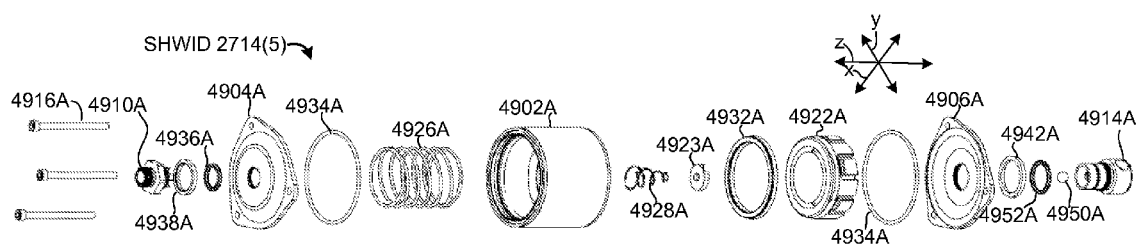
Figure 71:
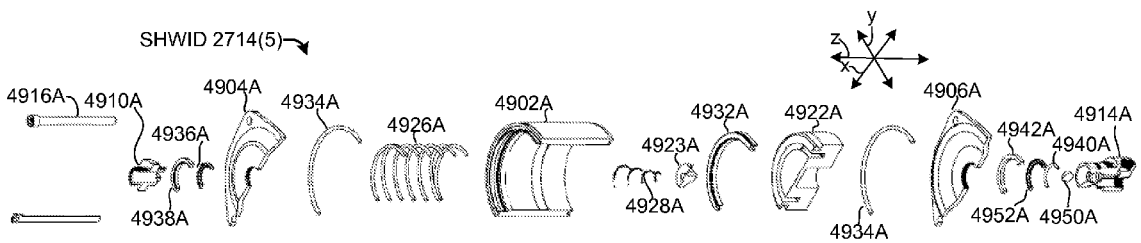
Figure 72:
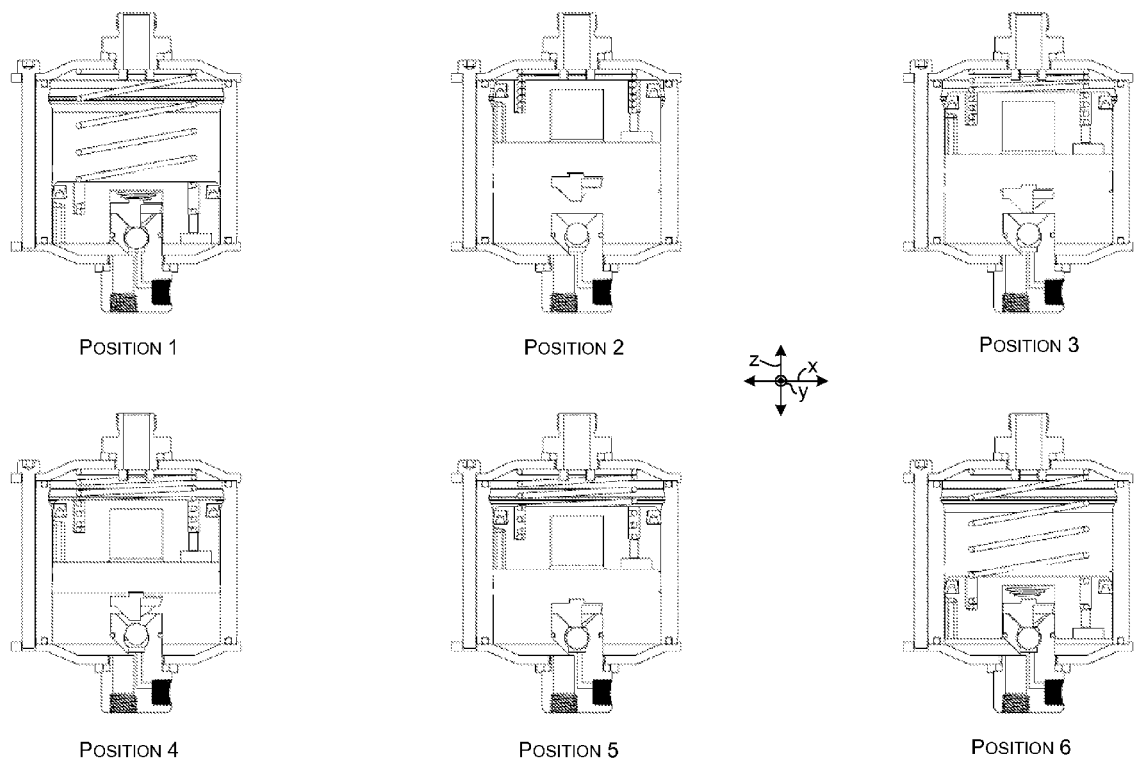
Figure 73:
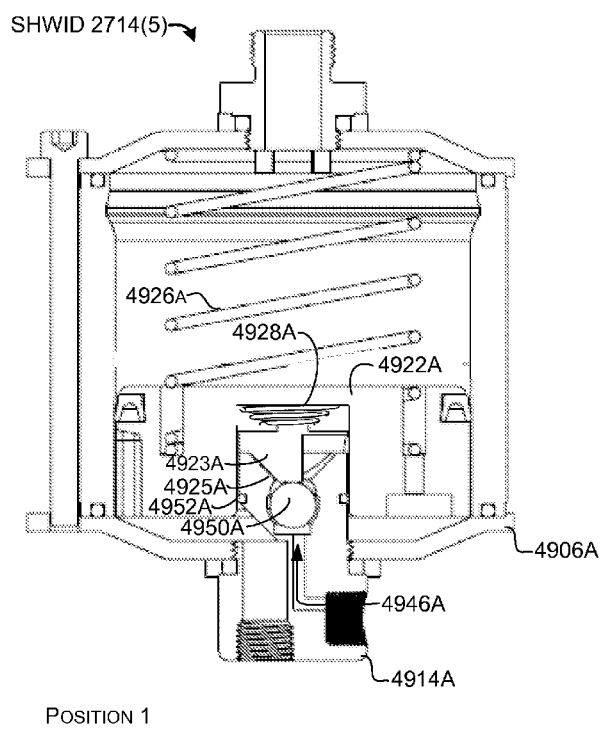
Figure 74:
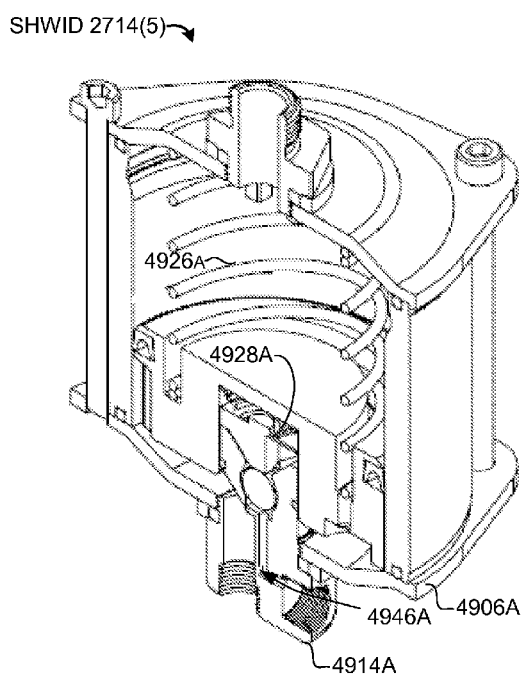
Figure 75:
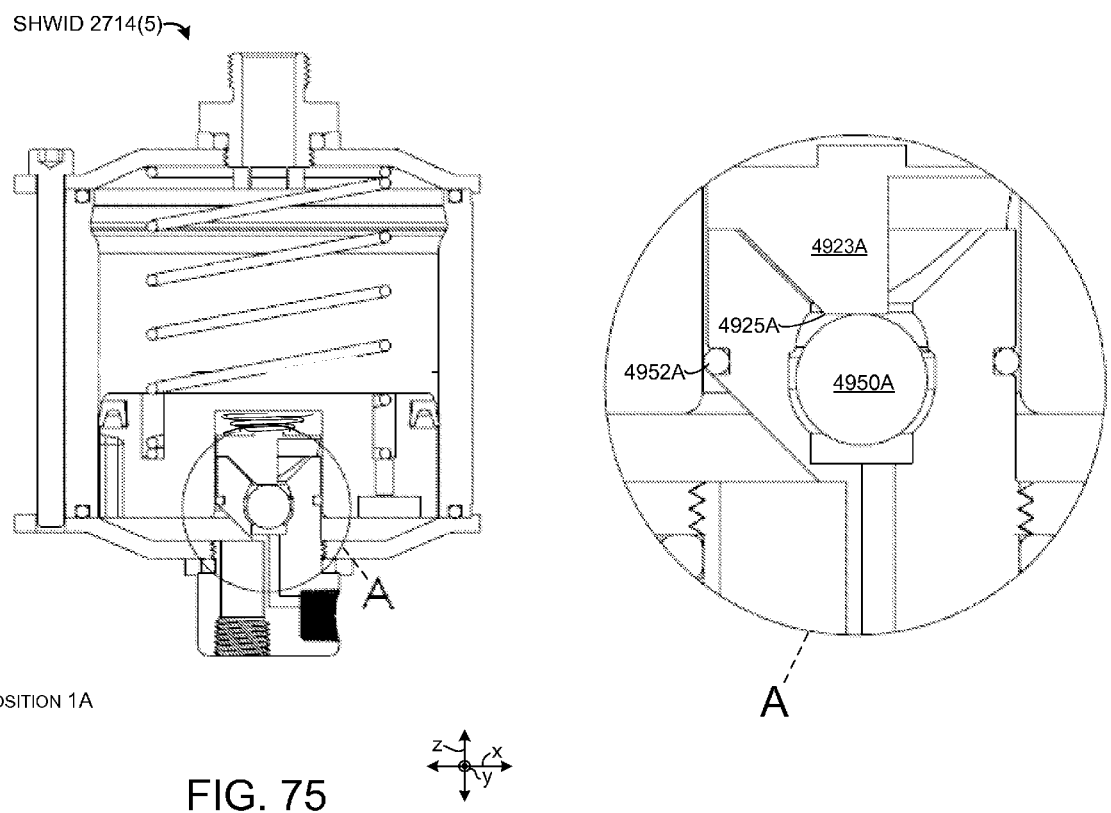
Figure 76:
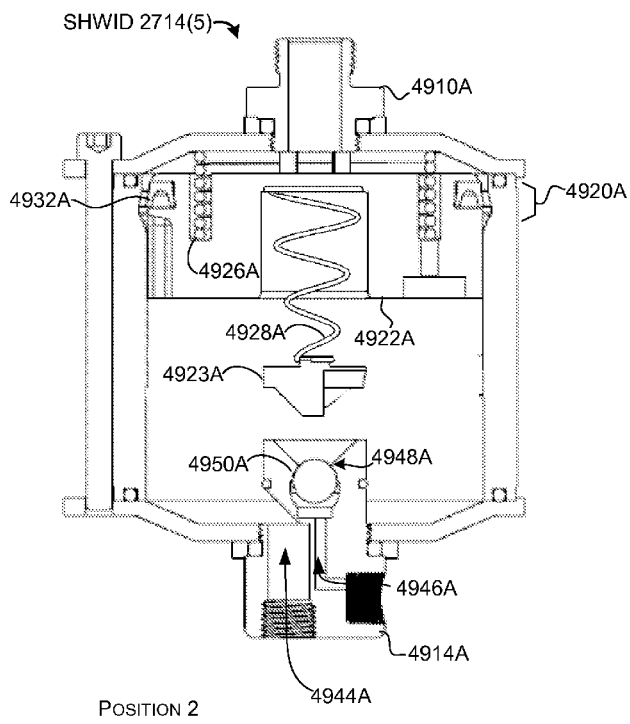
Figure 77:
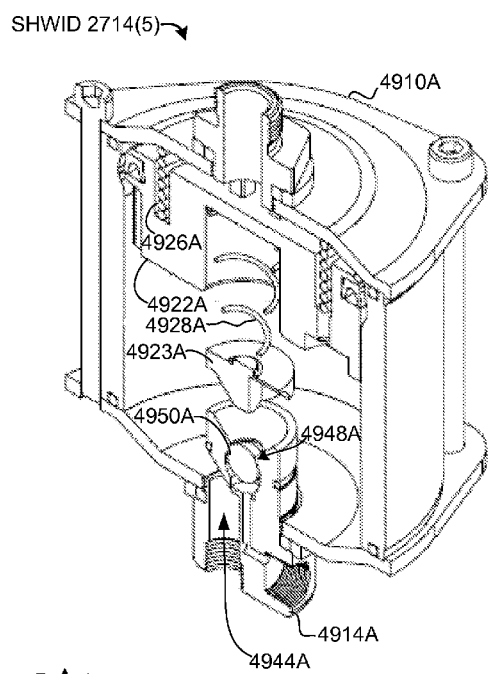
Figure 78:
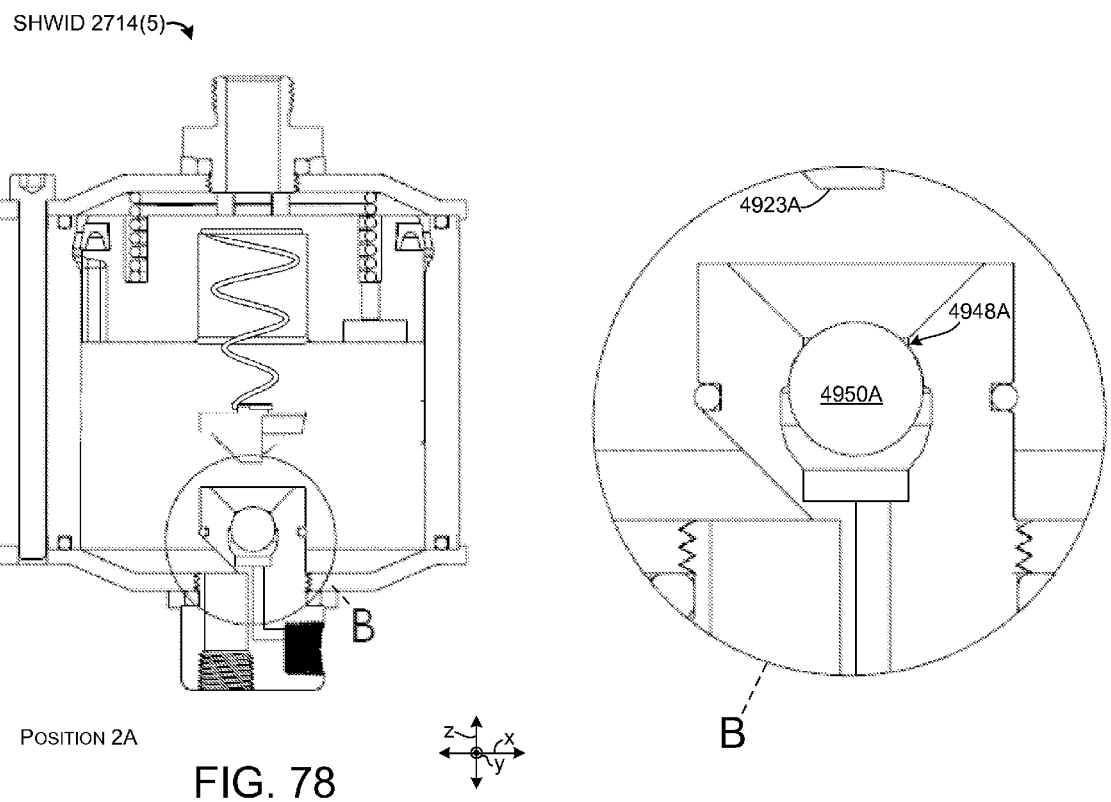

In this implementation, stem 4923A and stem spring 4928A can be thought of as a sub-assembly of piston 4922A. In this case, the stem and stem spring are nested in a recess in the underside of the piston (e.g., facing crossover valve 4914A). As with the implementations described above, several views are offered concurrently to aid in visualization of the components of selective hot water isolation device 2714 (5). FIG. 68 is a sectional view of the hot water isolation device, FIG. 69 is a cut-away perspective view. FIG. 70 is an exploded perspective view and FIG. 71 is a cut-away exploded perspective view. FIG. 72 shows six operational positions (e.g., Positions 1-6) of selective hot water isolation device 2714(5). These positions are shown and discussed in more detail relative to FIGS. 73-87.

Operational description begins at Position 1 which is illustrated in FIGS. 72-75. Position 1 can be thought of as a rest position where there is no flow through the hot water line or the cold water crossover line (see discussion relative to FIG. 27). As such, the water pressure is generally uniform throughout the selective hot water isolation device 2714(5) (e.g., on the inlet and outlet sides). In this condition, the piston spring 4926A forces the piston 4922A downward against the second end cap (e.g., bottom cap) 4906A. Similarly, the stem spring 4928A forces the stem 4923A downward so that protuberance 4925A (e.g., the lower end of the stem) contacts the ball 4950A. The piston 4922A is contacting the crossover seal 4952A. Thus, the cold water is isolated in the second fluid passageway 4946A of the crossover valve 4914A. Position 1A can offer more detail on some aspects of Position 1.

Position 2 can be seen in FIGS. 72 and 76-78. Position 2A can offer more detail on some aspects of Position 2. Position 2 occurs when hot water is turned on (such as at an associated fixture positioned downstream of the selective hot water isolation device 2714(5)). The pressure drops at the top fitting 4910A (e.g., outlet port) when the hot water is turned on. This drop in pressure allows water to flow through the first fluid passageway 4944A (connected to the hot water line) of the crossover valve 4914A. This water can overcome force exerted by the piston spring 4926A on the piston 4922A and the water can push the piston upward and compress the piston spring.

The stem spring 4928A is pulled upward by the piston 4922A and the stem spring pulls the stem 4923A away from ball 4950A. The pressure on the ball is now uneven with the bottom side of the ball experiencing higher pressure from the cold water line (e.g., from second fluid passageway 4946). This higher pressure forces the ball 4950A against the upper portion 4948A that seals cold water as described in the discussion above relative to selective hot water isolation device 2714(4). Significant hot water flow through the selective hot water isolation device 2714(4) begins as the piston moves upward and piston seal 4932A is proximate to wider upper portion 4920A of the barrel. This aspect is discussed in more detail above relative to selective hot water isolation device 2714(4).

Figures 79, 80:
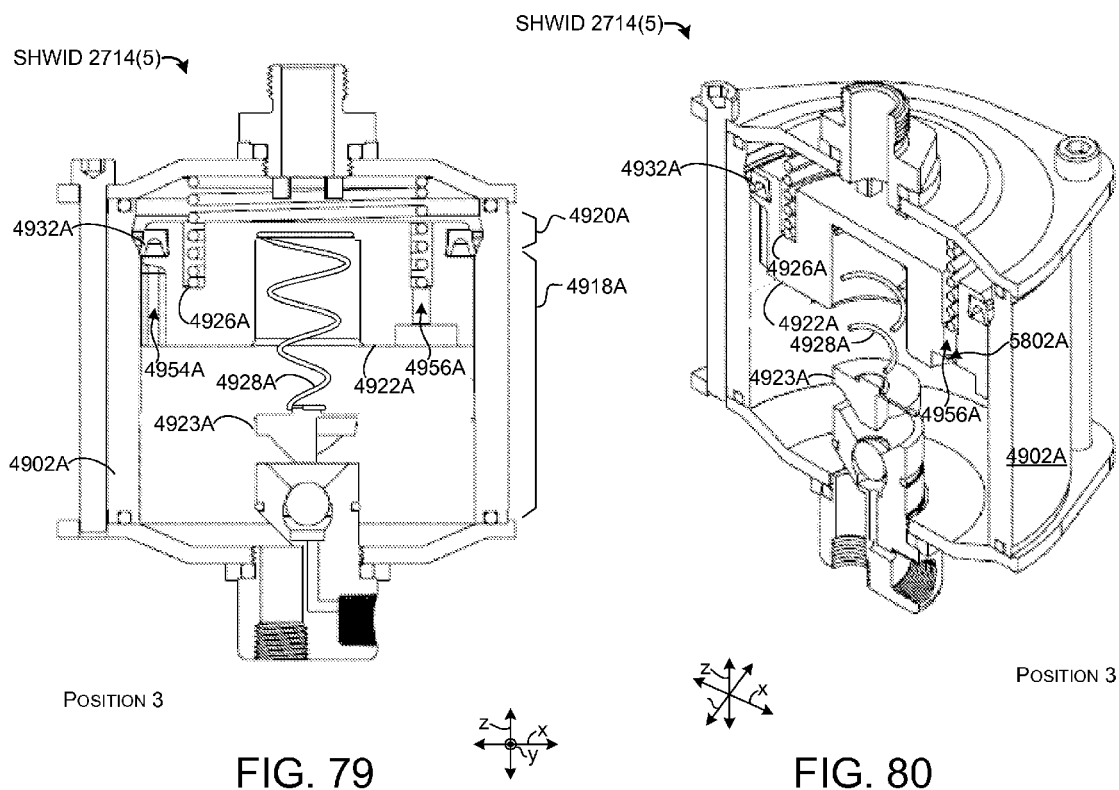
Figure 85:
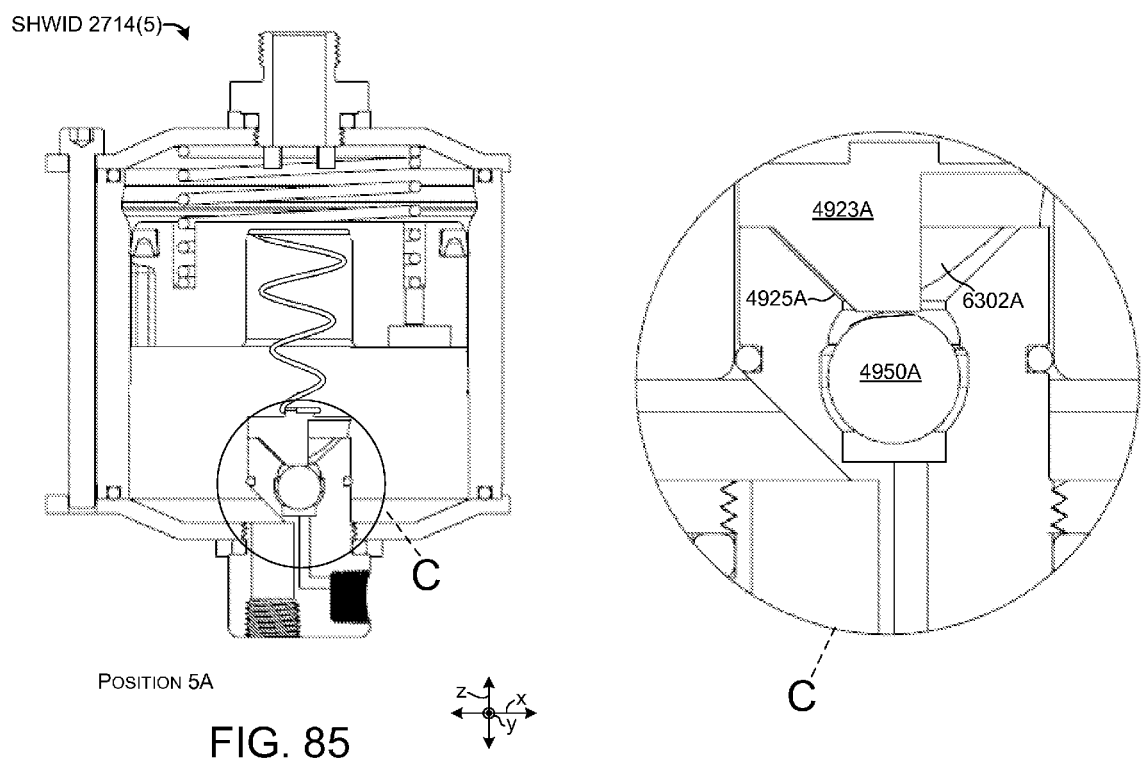

Position 3 can be seen in FIGS. 72 and 79-80. Position 3 occurs when the hot water flow stops, such as when a user closes the hot water tap of an associated fixture. In this case, pressure equalizes in the selective hot water isolation device 2714(5) when the hot water flow stops. As a result, the piston spring 4926A and the stem spring 4928A that were compressed by the pressure differential begin to expand and push the respective piston 4922A and stem 4923A downward. The piston and stem move downward at a relatively fast rate while the piston seal 4932A is proximate the upper portion 4920A of the cylinder since water can flow around the piston seal 4932A and backwards along fluid passageway 4954A. Once the piston moves downward such that the piston seal 4932A contacts the majority 4918A of the cylinder the downward movement is slowed since water flow through the piston is limited to fluid passageway 4956A. Recall that fluid passageway 4956A is purposely constrained by bleed hole opening 5802A and thus downward movement of the piston 4922A is limited by the constraint relative to the volume of the barrel 4902A.

Position 4 can be seen in FIGS. 72 and 81-82. Position 4 shows the piston 4922A and stem 4923A moving slowly downward due to the constrained fluid passageway 4956A. This slow movement creates the delay before cold water crossover commences in Position 5.

Position 5 can be seen in FIGS. 72 and 83-85. Position 5A can offer more detail on some aspects of Position 5. In Position 5 the piston spring 4926A and the stem spring 4928A cause the piston 4922A and stem 4923A to move downward until the stem's protuberance 4925A comes back into contact with ball 4950A. The protuberance pushes the ball slightly downward which allows cold water to flow from the cold water crossover line through fluid passageway 4946A around the ball into the stem and out of a stem slot 6302A into the barrel 4902A and finally the first fluid passageway 4944A and the hot water line.

Meanwhile, the piston spring 4926A continues to act on the piston 4922A. As explained above, the downward movement of the piston is purposely constrained by fluid passageway 4956A.

Figure 86:
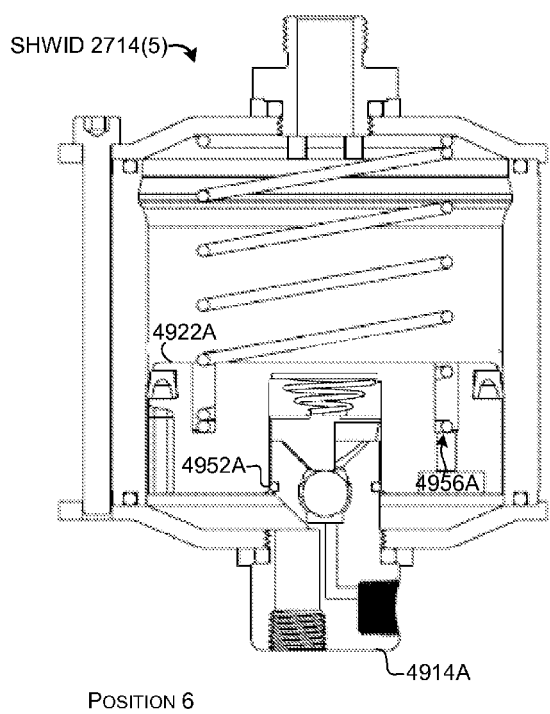
Figure 87:
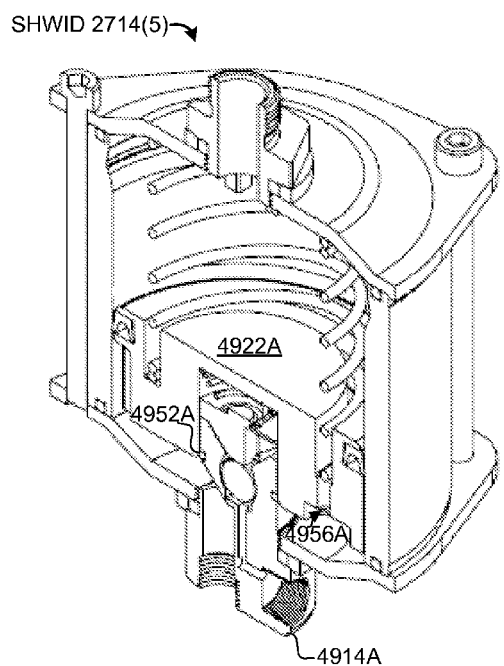

Position 6 can be seen in FIGS. 72 and 86-87. In Position 6 after the delay time mentioned above relative to Position 5 (e.g., cold water crossover flow), the piston 4922A descends to contact the crossover seal 4952A. This event effectively closes or shuts off the crossover valve 4914A. Recall that the delay time can be predetermined based upon barrel volume, spring force and a minimum area of fluid passageway 4956A. The delay time associated with Position 5 can determine how much cold water is allowed to flow from the cold water line to the hot water line before returning to the steady or resting state of Position 6.

Accordingly, when hot water use stops in Position 3, a predetermined delay time can begin. This predetermined delay time is described relative to Position 4. Within this predetermined delay time, hot water use can restart in a normal manner (e.g., with no cold water introduced into the hot water line). Additional hot water use restarts the delay time by returning the selective hot water isolation device 2714(5) to Position 2. At the expiration of the predefined delay time, a cold water crossover window begins. The duration of the cold water crossover window can be established based upon the rate of descent of the piston. The duration of the cold water crossover can be selected to allow a volume of cold water to crossover that matches a volume of water drawn back by a corresponding automatic hot water recovery apparatus (see FIG. 27).

To summarize, examples of four different selective hot water isolation devices are described above. These selective hot water isolation devices do not simply allow cold water cross-over whenever system hot water pressure is lower than system cold water pressure. Individual selective hot water isolation devices can limit cold water cross-over to instances where hot water flowed through a fixture proximate to their location. Further, the selective hot water isolation devices can delay the cold water cross-over for a period of time after hot water usage stops at the fixture. Thus, for example, a user that is intermittently using hot water is not inconvenienced by cold water entering the hot water line. Viewed from another perspective, the selective hot water isolation devices can allow cold water cross-over in a period or window after hot water flow through the selective hot water isolation device. The window can start immediately upon cessation of the hot water flow through the selective hot water isolation device or begin after a delay period.

Viewed from still another perspective, some implementations of the selective hot water isolation devices can block cold water cross-over flow unless one or more conditions occur. For instance, in one configuration, the selective hot water isolation device can block cold water cross-over flow unless a first condition occurs. This first condition can be hot water flow through the selective hot water isolation device. Stopping the hot water flow can be thought of as a second condition (e.g., cold water cross-over flow is blocked until both conditions occur). The occurrence of the second condition (e.g., cessation of hot water flow through the selective hot water isolation device) can cause the selective hot water isolation device to initiate a window in which cold water cross-over flow can occur through the selective hot water isolation device. The window can start immediately after the second condition occurs or after a delay. The window can have a duration defined by the selective hot water isolation device. For instance, a cross-sectional area of bleed hole 4502 relative to a volume of the selective hot water isolation device can define the delay and/or duration.

For ease of explanation, two different selective hot water isolation devices 2714(1) and 2714(2) were both utilized in system 2700. However, in many scenarios all of the selective hot water isolation devices used in a particular system will be identical. Further, while the selective hot water isolation devices are illustrated in system 2700 with an exemplary automatic hot water recovery apparatus, these selective hot water isolation devices can be utilized with other types of automatic hot water recovery apparatuses. Note also that several novel functionalities are described in the above discussion and specific structures are described in great detail for achieving the novel functionalities. Of course, the listing of structures cannot be exhaustive and other structures for accomplishing the novel functions are contemplated.

CONCLUSION

Although specific examples of hot water energy savings are described in language specific to structural features, it is to be understood that the subject matter defined in the appended claims is not intended to be limited to the specific features described. Rather, the specific features are disclosed as exemplary forms of implementing the claimed statutory classes of subject matter.

The invention claimed is:

1. A selective hot water isolation device that is configured to be connected in fluid flowing relation with a first water line and a second water line and where the selective hot water isolation device is configured to delay water cross-over from the second water line into the first water line for a defined duration after cessation of water flow through the first water line, and further wherein the defined duration is defined, at least in part, by a relationship between a volume of the selective hot water isolation device and a dimension of a bleed hole within the selective hot water isolation device.

2. The selective hot water isolation device of claim 1, wherein the first water line comprises a hot water line and the second water line comprises a cold water line and wherein the selective hot water isolation device is further configured to allow the water cross-over for a window of time.

3. The selective hot water isolation device of claim 2, wherein the window of time starts after the defined duration.

4. The selective hot water isolation device of claim 1, wherein the selective hot water isolation device is configured to function as a valve such that the water cross-over occurs subsequent to the water flow through the first water line.

* * * * *